US012745286B2

(12) United States Patent
Huang et al.

(10) Patent No.: US 12,745,286 B2
(45) **Date of Patent: *Sep. 22, 2026**

(54) METHOD AND APPARATUS FOR WIRELESS COMMUNICATION, AND COMMUNICATION DEVICE

(71) Applicant: GUANGDONG OPPO MOBILE TELECOMMUNICATIONS CORP., LTD., Dongguan (CN)

(72) Inventors: Lei Huang, Singapore (SG); Yongyang Du, Dongguan (CN); Liuming Lu, Dongguan (CN); Ronghui Hou, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/239,359

(22) Filed: Jun. 16, 2025

(65) Prior Publication Data

US 2025/0317970 A1 Oct. 9, 2025

Related U.S. Application Data

(63) Continuation of application No. 18/764,055, filed on Jul. 3, 2024, which is a continuation of application No. PCT/CN2022/070363, filed on Jan. 5, 2022.

(51) Int. Cl.

| | |
|---|---|
| ***H04W 74/0816*** | (2024.01) |
| ***H04W 74/08*** | (2024.01) |
| ***H04W 76/19*** | (2018.01) |

(52) U.S. Cl.
CPC ... *H04W 74/0816* (2013.01); *H04W 74/0866* (2013.01); *H04W 76/19* (2018.02)

(58) Field of Classification Search
CPC ......... H04W 74/0816; H04W 74/0866; H04W 76/15; H04W 76/16; H04W 76/19; H04W 84/12
See application file for complete search history.

(56) References Cited

U.S. PATENT DOCUMENTS 11,757,565 B2 * 9/2023 Chu ...................... H04L 1/0003 370/329
12,127,254 B2 * 10/2024 Kwon .................. H04W 48/16
(Continued)

FOREIGN PATENT DOCUMENTS

WO 2021004396 A1 1/2021

OTHER PUBLICATIONS

"Enhanced Multi-Link Single Radio Operation"; Minyoung Park; et al.; Jun. 4, 2020.

(Continued)

*Primary Examiner* — Liton Miah
(74) *Attorney, Agent, or Firm* — BAYES PLLC

(57) ABSTRACT

A non-AP MLD includes: a memory configured to store a computer program; and a processor configured to invoke and execute the computer program stored in the memory. The processor is configured to perform: initiating a first switch procedure of a first link, in a case where a TXOP is initiated or successfully obtained by a first affiliated STA of the non-AP MLD on the first link of EMLSR links. The TXOP is used for the first affiliated STA of the non-AP MLD to transmit an uplink PPDU. A first switch refers to that the non-AP MLD operating in an EMLSR mode switches from a first operation mode to a second operation mode.

20 Claims, 24 Drawing Sheets

In a case where a TXOP is initiated or successfully obtained on a first link of EMLSR links, initiating, by a first affiliated STA of a non-AP MLD, a first switch procedure of the first link, the TXOP being used for the first affiliated STA of the non-AP MLD to transmit an uplink PPDU, where a first switch refers to that the non-AP MLD operating in an EMLSR mode switches from a first operation mode to a second operation mode, the first operation mode refers to performing a listening operation on multiple links of the EMLSR links, and the second operation mode refers to performing a frame exchange operation on one of the EMLSR links and the frame exchange operation has a frame exchange capability of using multiple spatial streams

601

(56) References Cited

U.S. PATENT DOCUMENTS

| | | | | |
|---|---|---|---|---|
| 12,362,873 | B2 * | 7/2025 | Lu | H04L 5/0037 |
| 2022/0029736 | A1 * | 1/2022 | Chu | H04L 1/0025 |
| 2022/0104261 | A1 * | 3/2022 | Kwon | H04W 48/16 |
| 2022/0294583 | A1 * | 9/2022 | Lu | H04W 76/15 |
| 2024/0163948 | A1 * | 5/2024 | Kim | H04W 76/11 |

OTHER PUBLICATIONS

International Search Report and Written Opinion of the International Searching Authority regarding International Patent Application No. PCT/CN2022/070363, dated Aug. 25, 2022. Translation provided by WIPO Translate.

"CR for CIDs related to EMLSR"; IEEE P802. 11 Wireless LANs; doc.: IEEE 802.11-21/1702r2; Oct. 29, 2021.

"CC36 Comment Resolution for EMLSR—Part 2"; IEEE P802.11 Wireless LANs; doc.: IEEE 802. 11-21/2876 IEEE; Aug. 31, 2021.

"IEEE P802.11be™/D1.3Draft Standard for Information technology—Telecommunications and information exchange between systems Local and metropolitan area networks—Specific requirements"; IEEE P802.11be™/D1.3, Nov. 2021.

* cited by examiner

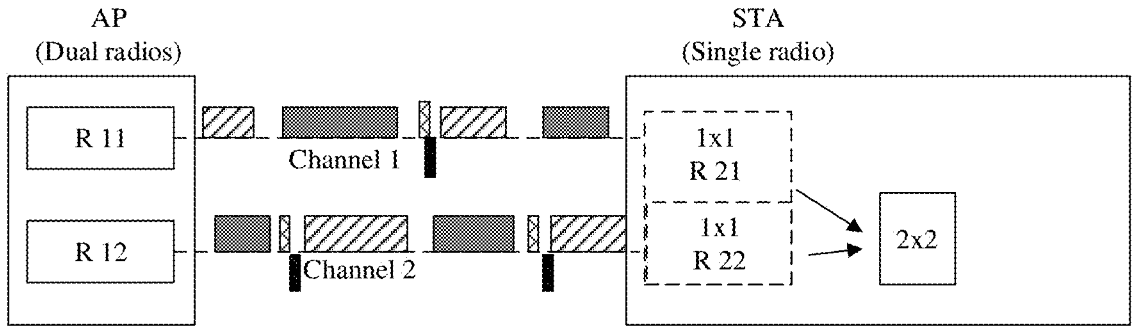
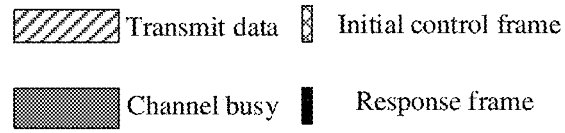
FIG. 3-3
| | B0 | B1 B3 | B4 B6 | B7 | B8 B10 | B11 B14 | B15 | B16 B19 | B20 B23 |
|---|---|---|---|---|---|---|---|---|---|
| | EMLSR Support | EMLSR Padding Delay | EMLSR Transition Delay | EMLMR Support | EMLMR Delay | Transition Timeout | Reserved | EMLMR Rx NSS | EMLMR Tx NSS |
| Bit | 1 | 3 | 3 | 1 | 3 | 4 | 1 | 4 | 4 |
FIG. 4

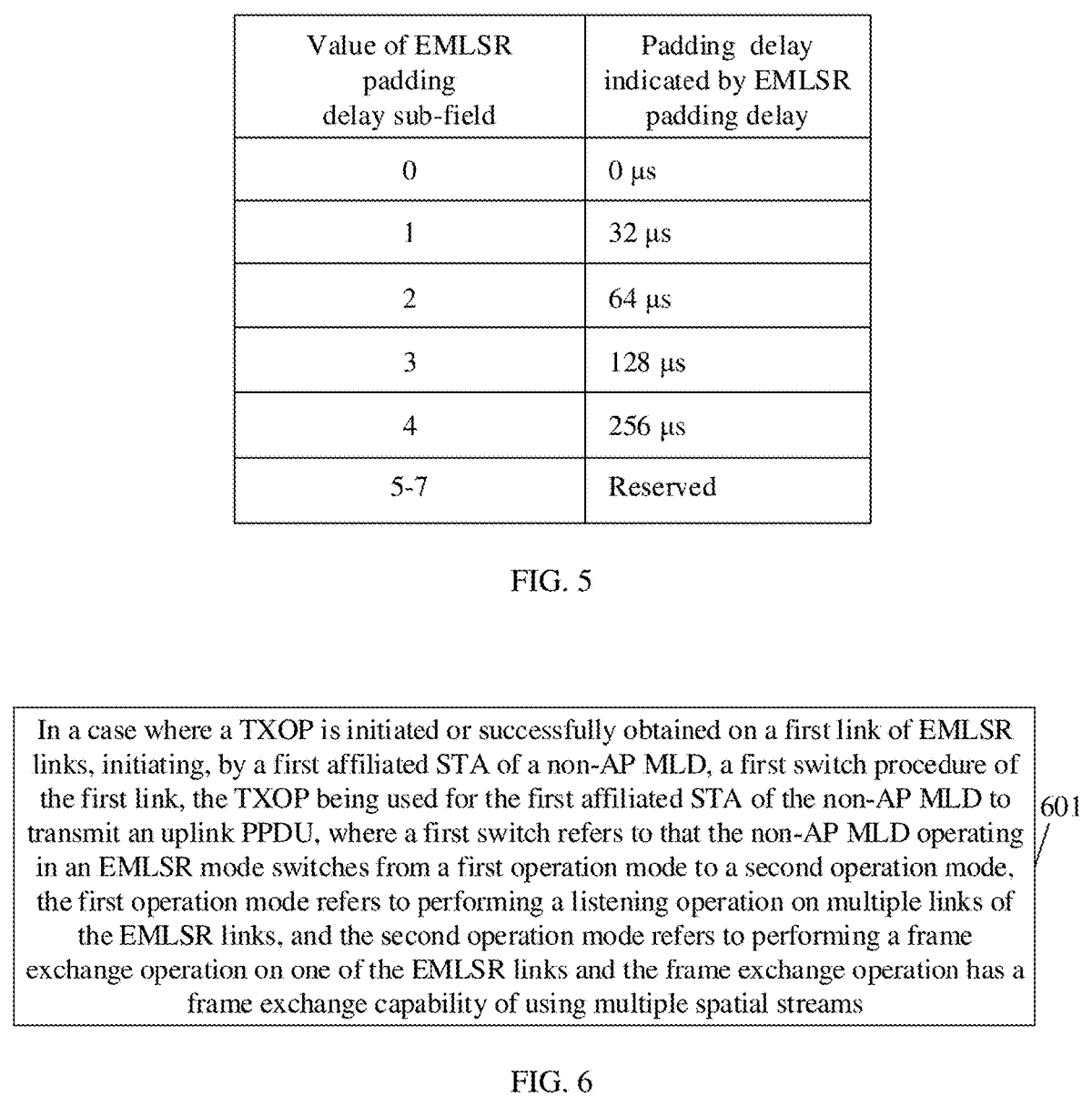

| Value of EMLSR padding delay sub-field | Padding delay indicated by EMLSR padding delay |
| --- | --- |
| 0 | 0 μs |
| 1 | 32 μs |
| 2 | 64 μs |
| 3 | 128 μs |
| 4 | 256 μs |
| 5-7 | Reserved |

FIG. 5

In a case where a TXOP is initiated or successfully obtained on a first link of EMLSR links, initiating, by a first affiliated STA of a non-AP MLD, a first switch procedure of the first link, the TXOP being used for the first affiliated STA of the non-AP MLD to transmit an uplink PPDU, where a first switch refers to that the non-AP MLD operating in an EMLSR mode switches from a first operation mode to a second operation mode, the first operation mode refers to performing a listening operation on multiple links of the EMLSR links, and the second operation mode refers to performing a frame exchange operation on one of the EMLSR links and the frame exchange operation has a frame exchange capability of using multiple spatial streams

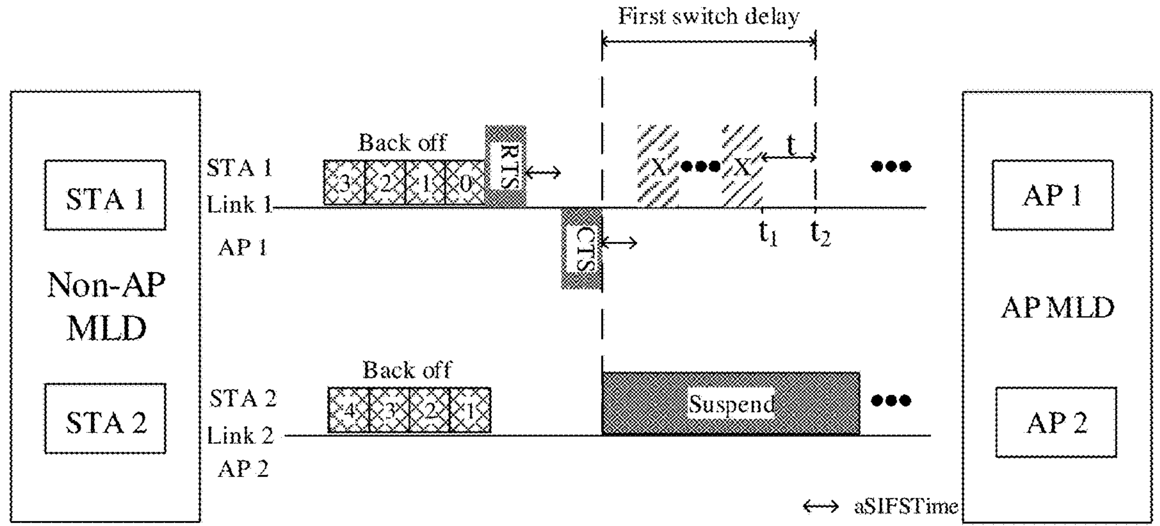

FIG. 7

Determining, by an AP MLD, that a time point when a non-AP MLD completes a second switch is a fifth time point, where the AP MLD is allowed to send an initial control frame on any of EMLSR links after the fifth time point, and the initial control frame is used to initiate downlink PPDU transmission, the second switch refers to that the non-AP MLD operating in an EMLSR mode switches from a second operation mode to a first operation mode, the second operation mode refers to performing a frame exchange operation on one of the EMLSR links and the frame exchange operation has a frame exchange capability of using multiple spatial streams, and the first operation mode refers to performing a listening operation on multiple links of the EMLSR links

In response to determining that transmission of a second PPDU within a TXOP fails, performing, by the non-AP MLD, an error recovery operation and/or a second switch, where the TXOP is a TXOP obtained by a first affiliated STA of the non-AP MLD on a first link of EMLSR links, the TXOP is used for the first STA of the non-AP MLD to transmit an uplink PPDU, and the second PPDU is a non-initial PPDU; the second switch refers to that the non-AP MLD operating in an EMLSR mode switches from a second operation mode to a first operation mode, the second operation mode refers to performing a frame exchange operation on one of the EMLSR links and the frame exchange operation has a frame exchange capability of using multiple spatial streams, and the first operation mode refers to performing a listening operation on multiple links of the EMLSR links

METHOD AND APPARATUS FOR WIRELESS COMMUNICATION, AND COMMUNICATION DEVICE

CROSS-REFERENCE TO RELATED APPLICATIONS

This application is a Continuation Application of U.S. application Ser. No. 18/764,055 filed on Jul. 3, 2024, which is a continuation of International Application No. PCT/CN2022/070363 filed on Jan. 5, 2022, both of which are incorporated herein by reference in their entireties.

TECHNICAL FIELD

The embodiments of the present application relate to the field of mobile communication technology, and in particular, to a method and an apparatus for wireless communication, and a communication device.

BACKGROUND

In a traditional single-radio operation, a non-access point multi-link device (non-AP MLD) can only perform a listening operation and a frame exchange operation on one link at the same time. To increase data transmission throughput and reduce data transmission latency, an enhanced multi-link single radio (EMLSR) operation is introduced. In the EMLSR operation, a non-AP MLD may perform listening operations on multiple links simultaneously, but may only use one link for data reception. However, current relevant specifications for the EMLSR operation have not yet been perfected.

SUMMARY

A method for wireless communication provided by the embodiments of the present application includes:

in a case where a transmission opportunity (TXOP) is initiated or successfully obtained on a first link of enhanced multi-link single radio (EMLSR) links, initiating, by a first affiliated station (STA) of a non-access point multi-link device (non-AP MLD), a first switch procedure of the first link; the TXOP being used for the first affiliated STA of the non-AP MLD to transmit an uplink physical layer protocol data unit (PPDU); the first affiliated STA being a STA affiliated with the non-AP MLD, and a link where the first affiliated STA is located is the first link;

where a first switch refers to that the non-AP MLD operating in an EMLSR mode switches from a first operation mode to a second operation mode, the first operation mode refers to performing a listening operation on multiple links of the EMLSR links, and the second operation mode refers to performing a frame exchange operation on one of the EMLSR links and the frame exchange operation has a frame exchange capability of using multiple spatial streams.

A method for wireless communication provided by the embodiments of the present application includes:

determining, by an access point multi-link device (AP MLD), that a time point when a non-AP MLD completes a second switch is a fifth time point, where the AP MLD is allowed to send an initial control frame on any of EMLSR links after the fifth time point, and the initial control frame is used to initiate downlink PPDU transmission;

where the second switch refers to that the non-AP MLD operating in an EMLSR mode switches from a second operation mode to a first operation mode, the second operation mode refers to performing a frame exchange operation on one of the EMLSR links and the frame exchange operation has a frame exchange capability of using multiple spatial streams, and the first operation mode refers to performing a listening operation on multiple links of the EMLSR links.

A method for wireless communication provided by the embodiments of the present application includes:

in response to determining that transmission of a second PPDU within a TXOP fails, performing, by a non-AP MLD, an error recovery operation and/or a second switch; where the TXOP is a TXOP obtained by a first affiliated STA of the non-AP MLD on a first link of EMLSR links, the TXOP is used for the first STA of the non-AP MLD to transmit an uplink PPDU, and the second PPDU is a non-initial PPDU; the first affiliated STA being a STA affiliated with the non-AP MLD, and a link where the first affiliated STA is located is the first link;

where the second switch refers to that the non-AP MLD operating in an EMLSR mode switches from a second operation mode to a first operation mode, the second operation mode refers to performing a frame exchange operation on one of the EMLSR links and the frame exchange operation has a frame exchange capability of using multiple spatial streams, and the first operation mode refers to performing a listening operation on multiple links of the EMLSR links.

A apparatus for wireless communication provided by the embodiments of the present application is applied to a non-AP MLD and includes:

a first processing unit, configured to initiate a first switch procedure of a first link in a case where a TXOP is initiated or successfully obtained on the first link of EMLSR links through a first affiliated STA, the TXOP being used for the first affiliated STA of the non-AP MLD to transmit an uplink PPDU; the first affiliated STA being a STA affiliated with the non-AP MLD, and a link where the first affiliated STA is located is the first link;

where a first switch refers to that the non-AP MLD operating in an EMLSR mode switches from a first operation mode to a second operation mode, the first operation mode refers to performing a listening operation on multiple links of the EMLSR links, and the second operation mode refers to performing a frame exchange operation on one of the EMLSR links and the frame exchange operation has a frame exchange capability of using multiple spatial streams.

A apparatus for wireless communication provided by the embodiments of the present application is applied to an AP MLD and includes:

a second processing unit, configured to determine that a time point when a non-AP MLD completes a second switch is a fifth time point, where the AP MLD is allowed to send an initial control frame on any of EMLSR links after the fifth time point, and the initial control frame is used to initiate downlink PPDU transmission;

where the second switch refers to that the non-AP MLD operating in an EMLSR mode switches from a second operation mode to a first operation mode, the second operation mode refers to performing a frame exchange operation on one of the EMLSR links and the frame exchange operation has a frame exchange capability of using multiple spatial streams, and the first operation mode refers to performing a listening operation on multiple links of the EMLSR links.

A apparatus for wireless communication provided by the embodiments of the present application is applied to a non-AP MLD and includes:

a third processing unit, configured to perform an error recovery operation and/or a second switch in response to determining that transmission of a second PPDU within a TXOP fails; where the TXOP is a TXOP obtained by a first affiliated STA of the non-AP MLD on a first link of EMLSR links, the TXOP is used for the first STA of the non-AP MLD to transmit an uplink PPDU, and the second PPDU is a non-initial PPDU; the first affiliated STA being a STA affiliated with the non-AP MLD, and a link where the first affiliated STA is located is the first link;

where the second switch refers to that the non-AP MLD operating in an EMLSR mode switches from a second operation mode to a first operation mode, the second operation mode refers to performing a frame exchange operation on one of the EMLSR links and the frame exchange operation has a frame exchange capability of using multiple spatial streams, and the first operation mode refers to performing a listening operation on multiple links of the EMLSR links.

A communication device provided by the embodiments of the present application includes a memory and a processor. The memory is configured to store a computer program. The processor is configured to invoke and execute the computer program stored in the memory to perform the above-mentioned methods for wireless communication.

A chip provided by the embodiments of the present application is used to implement the above-mentioned methods for wireless communication. Specifically, the chip includes a processor, which is configured to invoke and execute a computer program from a memory to cause a device equipped with the chip to perform the above-mentioned methods for wireless communication.

A non-transitory computer-readable storage medium provided by the embodiments of the present application is configured to store a computer program that causes a computer to perform the above-mentioned methods for wireless communication.

A computer program product provided by the embodiments of the present application includes computer program instructions, and the computer program instructions cause a computer to perform the above-mentioned methods for wireless communication.

A computer program provided by the embodiments of the present application, when executed on a computer, causes the computer to perform the above-mentioned methods for wireless communication.

BRIEF DESCRIPTION OF THE DRAWINGS

The drawings described herein are used to facilitate further understanding of the present application and constitute a part of the present application. The illustrative embodiments of the present application and their descriptions are used to explain the present application and do not constitute improper limitations on the present application. In the attached figures:

FIG. 2-1 is a schematic diagram showing an application scenario of the embodiments of the present application;

FIG. 2-2 is a schematic diagram showing an application scenario of the embodiments of the present application;

FIG. 3-1 is a first schematic diagram showing optional data transmission between a STA and an AP according to the embodiments of the present application;

FIG. 3-2 is a second schematic diagram showing optional data transmission between a STA and an AP according to the embodiments of the present application;

FIG. 3-3 is a schematic diagram showing optional data transmission between a STA and an AP in which an EMLSR operation is introduced according to the embodiments of the present application;

FIG. 4 is a format diagram showing an optional EML capability subfield according to the embodiments of the present application;

FIG. 5 is a schematic diagram showing coding of an optional EMSLR padding delay subfield according to the embodiments of the present application;

FIG. 6 is a first schematic flowchart of an optional method for wireless communication provided by the embodiments of the present application;

FIG. 7 is a first schematic diagram showing optional communication operations between a non-AP MLD and an AP MLD according to the embodiments of the present application;

FIG. 8 is a second schematic flowchart of an optional method for wireless communication provided by the embodiments of the present application;

FIG. 9 is a third schematic flowchart of an optional method for wireless communication provided by the embodiments of the present application;

DETAILED DESCRIPTION

Technical solutions in the embodiments of the present application will be described below with reference to the accompanying drawings in the embodiments of the present application. It is apparent that the embodiments described are some rather than all of the embodiments of the present application. Based on the embodiments of the present application, all other embodiments obtained by a person of ordinary skill in the art without creative efforts fall within the protection scope of the present application.

Technical solutions of the embodiments of the present application may be applied to various communication systems, such as a wireless local area network (WLAN), wireless fidelity (Wi-Fi), or other communication systems. The frequency bands supported by WLAN may include but are not limited to: low frequency bands (e.g., 2.4 GHz, 5 GHz, 6 GHz) and high frequency bands (e.g., 60 GHz).

Figure 1:
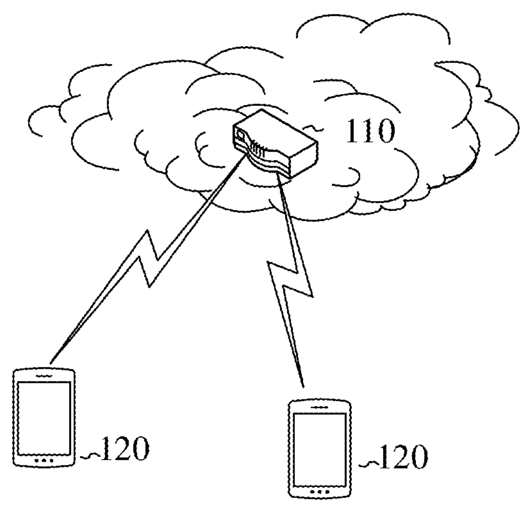
FIG. 1 is a diagram of architecture of a communication system to which the embodiments of the present application is applicable.

FIG. 1 is a schematic diagram of a communication system to which the embodiments of the present application is applicable.

As shown in FIG. 1, the communication system 100 may include an AP 110 and STAs 120 accessing a network through the AP 110. In some scenarios, the AP 110 may be referred to as an AP STA, that is, in a sense, the AP 110 is also a STA. In some scenarios, a STA 120 may be referred to as a non-AP STA. In some scenarios, a STA 120 may include an AP STA and a non-AP STA. Communication based on the communication system 100 may include: communication between the AP 110 and a STA 120, or communication between STAs 120, or communication between a STA 120 and a peer STA. The peer STA may refer to a device that communicates with the peer-side of the STA 120, for example, the peer STA may be an AP or a non-AP STA.

The AP 110 may be used as a bridge connecting a wired network and a wireless network. Its main function is to connect various wireless network clients together and then connect the wireless network to Ethernet. The AP 110 may be a terminal device (such as a mobile phone) or a network device (such as a router) equipped with a WiFi chip.

It should be noted that a role of a STA 120 in the communication system is not fixed, in other words, the role of the STA 120 in the communication system may be switched between an AP and a STA. For example, in some scenarios, when a mobile phone is connected to a router, the mobile phone is the STA; and when the mobile phone serves as a hotspot for other mobile phones, the mobile phone acts as the AP.

In some embodiments, the AP 110 and the STAs 120 may be devices used in Internet of vehicles, Internet of things (IoT) nodes and sensors in the IoT, smart cameras in smart home, smart remote controls, smart water meters, smart electricity meters, and sensors in smart city, etc.

In some embodiments, the AP 110 may be a device supporting 802.11be standard. The AP may also be a device that supports various current and future 802.11 family of WLAN standards, such as 802.11ax, 802.11ac, 802.11n, 802.11g, 802.11b, and 802.11a. In some embodiments, the STA 120 may support 802.11be standard. The STA may also support various current and future 802.11 family of WLAN standards, such as 802.11ax, 802.11ac, 802.11n, 802.11g, 802.11b and 802.11a.

In some embodiments, the AP 110 and/or the STA 120 may be deployed on land, including indoor or outdoor, handheld, wearable or vehicle-mounted; alternatively, the AP 110 and/or the STA 120 may be deployed on water (e.g., on a ship); alternatively, the AP 110 and/or the STA 120 may also be deployed aerially (e.g., on an airplane, on a balloon, on a satellite).

In some embodiments, the STA 120 may support the WLAN/WiFi technology, which may be a mobile phone, a pad, a computer with wireless transceiving function, a virtual reality (VR) device, an augmented reality (AR) device, a vehicle-mounted communication device, a wireless device in industrial control, a set-top box, a wireless device in self driving, a wireless terminal device in remote medical, a wireless device in smart grid, a wireless device in transportation safety, a wireless device in smart city, a wireless device in smart home, a vehicle-mounted communication device, a wireless communication chip/application-specific integrated circuit (ASIC)/system on chip (SoC), or the like.

For example, the STA 120 may be a wearable device. The wearable device may also be referred to as a wearable smart device, which is a general term of wearable devices developed by intelligent design on daily wear by applying wearable technology, such as glasses, gloves, a watch, clothing and shoes. The wearable device is a portable device that is worn directly on a body, or integrated into clothes or accessory of a user. The wearable device not only is a hardware device, but also implements powerful functions through software support as well as data interaction or cloud interaction. Generalized wearable smart devices include devices which are fully functional, have large sizes, and may implement all or partial functions without relying on smart phones, such as a smart watch or smart glasses, and devices which focus on a certain kind of application functions only and need to be used in conjunction with other devices such as smart phones, such as various smart bracelets and smart jewelries for monitoring physical signs.

It should be understood that FIG. 1 is merely an example of the present application and should not be construed as a limitation to the present application. For example, FIG. 1 only shows one AP and two STAs as an example. In some embodiments, the communication system 100 may include multiple APs and STAs in other quantities, which is not limited in the embodiments of the present application.

Figures 1, 2:
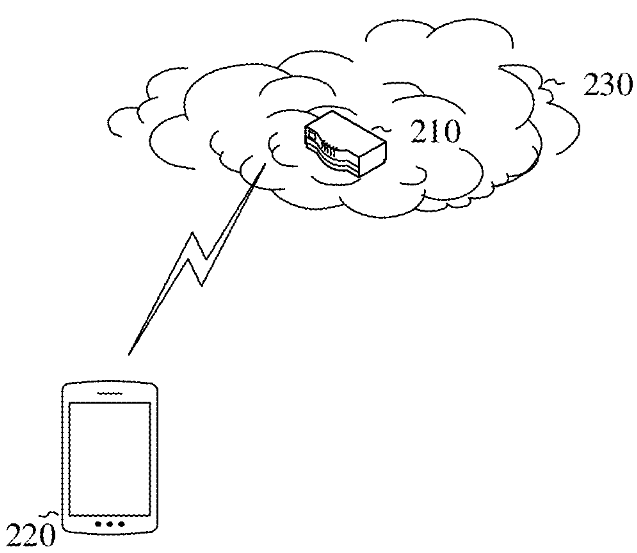
Figure 2:
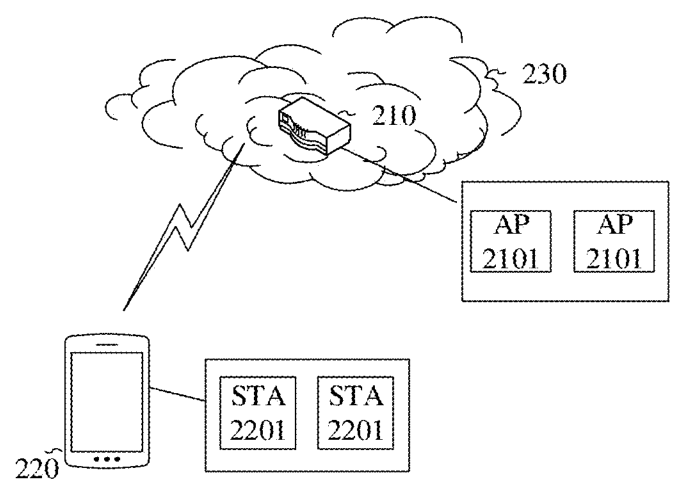

FIG. 2-1 is a schematic diagram showing the application scenarios of the embodiments of the present application.

As shown in FIG. 2-1, a communication system 200 may include an AP MLD 210 and a non-AP MLD 220. The AP MLD 210 is an electronic device that can form a wireless local area network 230 based on transmitted signals, such as a router, a mobile phone with a hotspot function, or the like. The non-AP MLD 220 is an electronic device accessing the wireless local area network 230 formed by the AP MLD 210, such as a mobile phone, a smart washing machine, an air conditioner, or an electronic lock. The non-AP MLD 220 communicates with the AP MLD 210 via the wireless local area network 230. The AP MLD 210 may be a soft AP MLD, a mobile AP MLD, or the like.

As shown in FIG. 2-2, in the communication system shown in FIG. 2-1, the AP MLD 210 has at least two affiliated APs 2101, and the non-AP MLD 220 has at least two affiliated stations (STAs) 2201. Each AP is connected to different STAs of the non-AP MLD 220 via different links. An AP affiliated (or associated) with an AP MLD may also be referred to as an affiliated AP of the AP MLD, and a STA affiliated (or associated) with a non-AP MLD may also be referred to as an affiliated STA of the non-AP MLD.

In the embodiments of the present application, the AP MLD 210 and the non-AP MLD 220 may be terminal devices. A terminal device may refer to an access terminal, a user equipment (UE), a user unit, a user station, a mobile station, a mobile platform, a remote station, a remote terminal, a mobile device, a user terminal, a terminal, a wireless communication device, a user agent or a user device. The access terminal may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal device in the 5th generation (5G) network, a terminal device in a future evolved public land mobile network (PLMN), or the like.

The communication system 200 shown in FIG. 2-1 may further include a network device, which may be an access network device that communicates with the terminal device. The access network device may provide communication coverage for a specific geographical area and communicate with terminal devices located in a coverage area.

FIG. 2-1 shows an AP MLD and a non-AP MLD as an example. Optionally, the wireless communication system 200 may include multiple non-AP MLDs accessing the wireless local area network 230, which is not limited in the embodiments of the present application.

It should be noted that FIGS. 1, 2-1 and 2-2 are only illustrative examples of systems to which the present application is applicable. Of course, the methods according to the embodiments of the present application may be applied to other systems. Furthermore, the terms "system" and "network" are often used interchangeably herein. The term "and/or" herein refers to an association relationship describing associated objects only, which indicates that there may be three kinds of relationships. For example, "A and/or B" may indicate three cases that: A exists alone, both A and B exist, and B exists alone. In addition, the symbol "/" herein generally indicates that associated objects before and after this symbol have an "or" relationship. It should be understood that "indication" involved in the embodiments of the present application may be a direct indication, may be an indirect indication, or may represent an association relationship. As an example, that A indicates B may mean that A indicates B directly, for example, B can be acquired through A; or it may mean that A indicates B indirectly, for example, A indicates C, and B can be acquired through C; or it may mean that there is an association between A and B. It should be appreciated that the term "correspond" mentioned in the embodiments of the present application may mean that there is a directly corresponding or an indirectly corresponding relationship between two parties, or mean that there is an association between two parties, or mean a relationship such as indicating and being indicated, or configuring and being configured. It should be appreciated that "pre-defined" or "pre-defined rule" mentioned in the embodiments of the present application may be achieved by pre-storing a corresponding code, a table, or other modes that may be used to indicate related information in a device (e.g., including the terminal device and the network device), and its specific implementation is not limited in the present application. For example, pre-defined may refer to being defined in a protocol. It should be understood that, in the embodiments of the present application, the "protocol" may refer to a standard protocol in the communication field, for example, may include an LTE protocol, an NR protocol, and a related protocol applied in a future communication system, which are not limited in the present application.

In order to facilitate understanding of the technical solutions of the embodiments of the present application, related technologies of the embodiments of the present application will be described in the following. The following related technologies, as optional solutions, can be arbitrarily combined with the technical solutions of the embodiments of the present application, and these combined solutions all fall within the protection scope of the embodiments of the present application.

The relevant terms involved in the embodiments of the present application will be explained in the following:

aSIFSTime denotes a short interframe space (SIFS) duration;

aSlotTime denotes a slot time duration;

aPIFSTime denotes a priority interframe space duration;

aRxPHYStartDealy denotes a physical layer start receiving delay;

TXNAV timer denotes a transmit network allocation vector timer.

Herein, aSIFSTime, aSlotTime, and aPIFSTime are three time-interval units in different lengths. The relationship between the three is that aPIFSTime equals to the sum of aSIFSTime and aSlotTime, that is, aPIFSTime=aSIFSTime+aSlotTime.

aRxPHYStartDealy refers to a period from reception of a PPDU by a device's antenna to issue of the physical (PHY) layer start receiving indication (PHY.RXSTART.indication) primitive by the physical layer of the device. The physical layer start receiving indication primitive is indicated by the physical layer to the local media access control (MAC) layer, which is used to indicate that the physical layer has received a PPDU.

TXNAV timer is a separate timer that is initialized with duration in a Duration/ID field of the last successfully transmitted frame (except the power save-poll (PS-Poll) frame) from a holder of TXOP. The TXNAV timer starts counting down from an end of transmission of a PPDU containing this frame. Each frame contains a Duration/ID field, which indicates the time period needed for subsequent transmission. For example, if a frame A is transmitted between a STA and an AP, and the frame A is successfully transmitted, the TXNAV is updated to duration TXNAV1 of a Duration/ID field in the frame A. Subsequently, if a frame B is transmitted between the STA and the AP, and the frame B is successfully transmitted, the TXNAV is then updated to duration TXNAV2 of a Duration/ID field in the frame B.

Figures 1, 3:
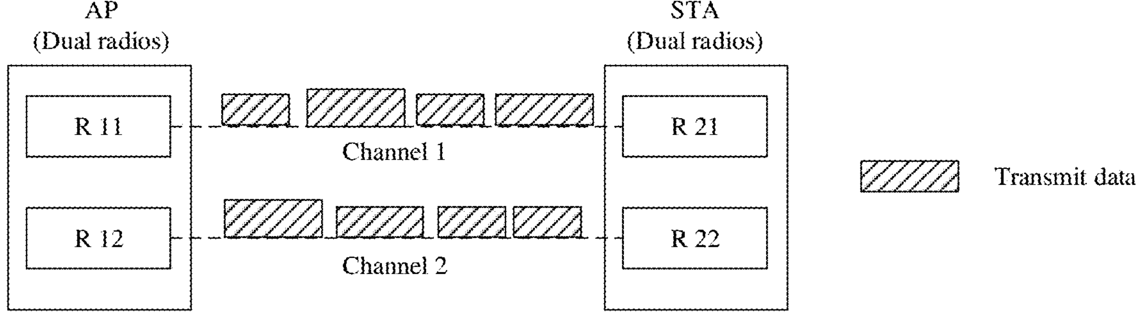
Figures 2, 3:
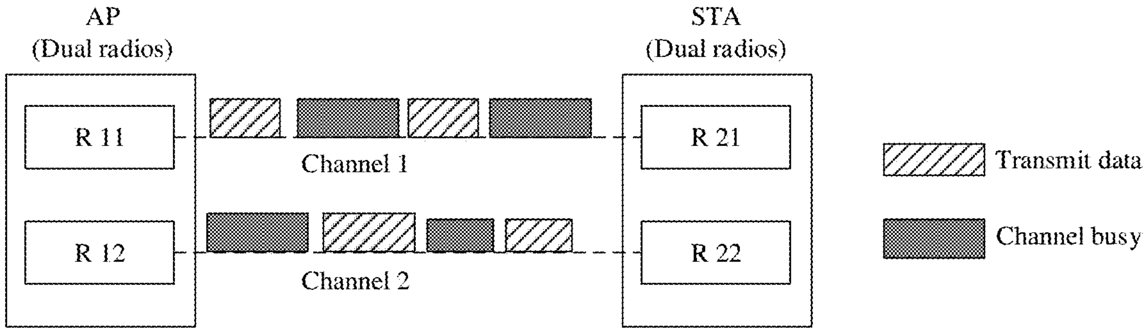

FIG. 3-1 shows data transmission between a STA and an AP that both have dual radios under ideal conditions. The AP has two radio modules, R 11 and R 12, and the STA also has two radio modules, R 21 and R 22. There are two channels between the AP and the STA, channel 1 and channel 2. Channel 1 and channel 2 are in idle state and may be used for data transmission. As the network becomes busy, as shown in FIG. 3-2, channel 1 and channel 2 are in a busy state in some time periods, and data transmission is not allowed in the busy state, resulting in data transmission on only one channel at the same time, which is actually equivalent to a single-link operation (that is, a STA can only transmit data on one link at the same time).

For the scenarios where the STA can only transmit data on one link at the same time, an EMLSR operation has been proposed for a single radio non-AP MLD (which can only transmit data on one link at the same time). As shown in FIG. 3-3, for the single radio non-AP MLD (i.e., the STA in FIG. 3-3), its 2×2 radio module is configured into two 1×1 radio modules, which are applied to channel 1 and channel 2 respectively, so as to listen on both channels simultaneously. Before transmitting downlink data on an idle channel in channel 1 and channel 2, the AP MLD (i.e., the AP in FIG. 3-3) transmits an initial control frame. After listening that a control frame is received on a certain channel, the non-AP MLD replies with a response frame and switches to the 2×2 radio module on the channel on which the initial control frame is received to receive data. Here, a channel may also be referred to as a link.

It should be noted that a non-AP MLD switching from a listening mode on multiple links to a transmission mode on a certain link belongs to spatial multiplexing. For example, if an antenna of a device has N×N capability, it means that the device has N spatial streams. Switching from the listening mode on multiple links to the transmission mode on a certain link means switching all the spatial streams on the multiple links to the certain link, so that the certain link can use the N spatial streams for data reception.

It is clear that the traditional single radio non-AP MLD can only perform the listening operation and the frame exchange (that is, data transmission) operation on one link at the same time. However, after an EMLSR mode is enabled, the non-AP MLD may listen on multiple links at the same time. As long as there is data to be sent on any one of the links, the non-AP MLD is able to receive data on this link. This manner increases the link data transmission throughput and reduces the data transmission delay.

The related art specifies the EMLSR operation, which is described below.

A non-AP MLD may operate in the EMLSR mode on a specific subset of an enabled link set. Links in this subset are called EMLSR links. The non-AP MLD implements the listening operation on an EMLSR link by keeping its affiliated STA in a wake-up state. The listening operation herein includes performing a clear channel assessment (CCA) and/or receiving an initial control frame sent by an AP MLD.

An affiliated AP of the AP MLD initiates frame exchange with the non-AP MLD on a link (referred to as link A for ease of description) in the EMLSR links. Here, the AP MLD may transmit an initial control frame to the non-AP MLD to initiate frame exchange with the non-AP MLD. The initial control frame herein may be a multi user-request to send (MU-RTS) frame or a buffer status report poll (BSRP) frame. After receiving the initial control frame, the non-AP MLD in the EMLSR mode may perform a frame exchange operation on link A on which the initial control frame is received, and shall not perform the frame exchange operation on other links of the EMLSR links except link A until the frame exchange on link A is completed. In addition, affected by spatial stream capability, operation mode, and link switch delay, the non-AP MLD may receive downlink PPDUs transmitted using multiple spatial streams after an interval of aSIFSTime duration starting at an end of transmission of a response frame corresponding to the initial control frame. During frame exchange, the AP MLD shall not send a frame to the non-AP MLD on any link other than link A in the EMLSR links. After frame exchange is complete, the non-AP MLD immediately switches back to a listening operation on an enabled link.

The above solutions involve the listening operation and the single-link frame exchange operation in the EMLSR operation. The following is a clear explanation of the listening operation and the single-link frame exchange operation in the EMLSR operation.

Listening operation: a non-AP MLD listens on an EMLSR link by keeping an affiliated STA working on the EMLSR link in a wake-up state. The listening operation herein includes performing CCA and receiving an initial control frame sent by an AP MLD.

Single-link frame exchange operation: an AP MLD may perform frame exchange with a non-AP MLD on one of EMLSR links using more than one spatial stream, and during frame exchange, the AP MLD shall not transmit a frame to the non-AP MLD on other links in the EMLSR links. Alternatively, the non-AP MLD may perform frame exchange with the AP MLD on one of the EMLSR links using more than one spatial stream, and during the frame exchange, the non-AP MLD shall not transmit a frame to the AP MLD on other links in the EMLSR links. The single-link frame exchange operation herein may be a single-link multiple-spatial-stream frame exchange operation.

For ease of description, several related concepts are introduced below.

First switch: a non-AP MLD operating in the EMLSR mode switches from a listening operation mode to a single-link frame exchange operation mode.

Second switch: a non-AP MLD operating in the EMLSR mode switches from the single-link frame exchange operation mode to the listening operation mode.

First switch delay: time used for the non-AP MLD to perform the first switch. The time is greater than or equal to time required for the non-AP MLD to start the first switch until it completes the first switch, which means that the non-AP MLD may complete the first switch in advance within the first switch delay. Here, the first switch delay is related to a padding delay. Optionally, the first switch delay equals to the sum of the padding delay, a duration for transmitting a response frame corresponding to an initial control frame, and aSIFSTime×2, that is, first switch delay=padding delay+duration of transmitting a response frame corresponding to an initial control frame+aSIFSTime×2. Here, the padding delay is indicated by the non-AP MLD to the AP MLD through an EMLSR padding delay subfield in an enhanced multi-link (EML) capability field of a basic variant multilink element.

Second switch delay: time from start of the second switch to completion of the second switch. Here, the second switch delay is related to a transition delay. Optionally, the second switch delay equals to the transition delay. Here, the transition delay is indicated by the non-AP MLD to the AP MLD through an EMLSR transition delay subfield in the EML capability field of the basic variant multilink element.

As an example, an EML capability field is carried in a basic variant multilink element, as shown in FIG. 4. An EMLSR padding delay subfield indicates a padding delay that acts on a MAC layer padding duration of a padding field of an initial control frame and is the minimum MAC layer padding duration that is required to complete the first switch and requested by a non-AP MLD to an AP MLD. The padding delay may be regarded as the AP MLD extending transmission time of the initial control frame to reserve a certain time for the non-AP MLD to perform the first switch. A specific encoding of the EMLSR padding delay subfield is shown in FIG. 5. Here, according to spatial stream capability, operation mode and link switch delay, the non-AP MLD may use more than one spatial stream to receive, on a link on which an initial control frame is received, downlink PPDUs after an interval of aSIFSTime duration starting at an end of transmission of a response frame corresponding to the initial control frame. It can be seen that the padding delay is only a part of the first switch delay. Therefore, the first switch delay for the non-AP MLD to perform the first switch equals to the sum of the padding delay, duration for transmitting the response frame corresponding to the initial control frame, and aSIFSTime×2. An EMLSR transition delay subfield indicates a transition delay, which is a delay required for the non-AP MLD to start the second switch until it completes the second switch. The non-AP MLD indicates the padding delay and the transition delay to the AP MLD in advance before entering the EMLSR mode.

The related art specifies when a non-AP MLD performs the second switch.

1) The non-AP MLD completes the second switch within a second switch delay after frame exchange is completed. If any of the following conditions is met, the frame exchange is considered to be completed.

Condition 1): MAC layer of an affiliated STA of the non-AP MLD does not receive a physical layer start receiving indication (PHY-RXSTART.indication) primitive within a timeout period after a time point T1. Here, the time point T1 may be a time point when the non-AP MLD completes transmission of a response frame of a downlink PPDU (applicable to a case where a downlink PPDU requires an immediate response). Alternatively, the time point T1 may be a time point when the non-AP MLD completes reception of a downlink PPDU (applicable to a case where a downlink PPDU does not require the immediate response). The downlink PPDU refers to a latest downlink PPDU received by the affiliated STA of the non-AP MLD from an affiliated AP of an AP MLD. Here, the timeout period equals to the sum of aSIFSTime, aSlotTime and aRxPHYStartDelay, that is, timeout period=aSIFSTime+aSlotTime+aRxPHYStartDelay.

Condition 2): MAC layer of an affiliated STA of the non-AP MLD receives the physical layer start receiving indication (PHY-RXSTART.indication) primitive within a timeout period after a time point T1, but the affiliated STA of the non-AP MLD does not detect a valid PPDU corresponding to the PHY-RXSTART.indication primitive. Here, the time point T1 may be a time point when the non-AP MLD completes transmission of a response frame of a downlink PPDU (applicable to a case where a downlink PPDU requires an immediate response). Alternatively, the time point T1 may be a time point when the non-AP MLD completes reception of a downlink PPDU (applicable to a case where a downlink PPDU does not require the immediate response). The downlink PPDU refers to a latest downlink PPDU received by the affiliated STA of the non-AP MLD from an affiliated AP of an AP MLD. Here, the timeout period equals to the sum of aSIFSTime, aSlotTime and aRxPHYStartDelay, that is, timeout period=aSIFSTime+aSlotTime+aRxPHYStartDelay.

2) In a case where an affiliated STA of the non-AP MLD has initialized a TXOP, the non-AP MLD completes the second switch within the second switch delay after an end of the TXOP.

Currently, in the relevant standards for the EMLSR operation, relevant procedures are formulated for downlink transmissions initiated by an AP MLD, but relevant procedures are not formulated for an uplink transmission initiated by a non-AP MLD. To this end, technical solutions of the embodiments of the present application are proposed. Considering that, for uplink transmissions, the non-AP MLD does not need to send an initial control frame to initialize frame exchange with the AP MLD, a reliable mechanism for the non-AP MLD to initialize uplink transmissions in the EMLSR mode is proposed in the technical solutions of the embodiments of the present application, which improves relevant standards for the EMLSR operation.

To facilitate understanding of the technical solutions of the embodiments of the present application, the technical solutions of the present application are described in detail below through specific embodiments. The above-mentioned related technologies, as optional solutions, can be arbitrarily combined with the technical solutions of the embodiments of the present application, and these combined solutions all fall within the protection scope of the embodiments of the present application. The embodiments of the present application include at least part of the following contents.

For ease of description, relevant terms involved in the technical solutions of the embodiments of the present application are explained below.

First operation mode: the first operation mode refers to performing a listening operation on multiple links in EMLSR links. Here, the first operation mode may also be referred to as a listening operation mode. For a non-AP MLD in the first operation mode, the non-AP MLD may listen on an EMLSR link by making an affiliated STA operating on the EMLSR link in a wake-up state. Here, the listening operation includes performing CCA and receiving an initial control frame sent by an AP MLD.

Second operation mode: the second operation mode refers to performing a frame exchange operation on one of EMLSR links and the frame exchange operation has a frame exchange capability of using multiple spatial streams. Here, the frame exchange operation in the second operation mode includes a frame exchange operation of one or more spatial streams. Here, the second operation mode may also be referred to as a single-link frame exchange operation mode (e.g., a single-link multi-spatial-stream frame exchange operation mode). For a non-AP MLD in the second operation mode, the non-AP MLD may perform frame exchange with an AP MLD on one of the EMLSR links using one or more than one spatial streams. During the frame exchange, the non-AP MLD may not transmit frames to the AP MLD on other links in the EMLSR links, nor may it perform listening operations on other links in the EMLSR links.

First switch: the first switch refers to that a non-AP MLD operating in the EMLSR mode switches from the first operation mode to the second operation mode. In other words, the first switch refers to that the non-AP MLD operating in the EMLSR mode switches from the listening operation mode to the single-link frame exchange operation mode.

Second switch: the second switch refers to that a non-AP MLD operating in the EMLSR mode switches from the single-link frame exchange operation to the listening operation. In other words, the second switch refers to that the non-AP MLD operating in the EMLSR mode switches from the single-link frame exchange operation mode to the listening operation mode.

First switch delay: the time used for the non-AP MLD to perform the first switch. The time is greater than or equal to the time required for the non-AP MLD to start the first switch until it completes the first switch, which means that the non-AP MLD may complete the first switch in advance within the first switch delay. Here, the first switch delay is related to the padding delay. Optionally, the first switch delay equals to the sum of the padding delay, a duration for transmitting a response frame corresponding to an initial control frame, and aSIFSTime×2. Here, the padding delay is indicated by the non-AP MLD to the AP MLD through an EMLSR padding delay subfield in an EML capability field of a basic variant multilink element.

Second switch delay: the time from the start of the second switch to the completion of the second switch. Here, the second switch delay is related to a transition delay. Optionally, the second switch delay equals to the transition delay. Here, the transition delay is indicated by the non-AP MLD to the AP MLD through an EMLSR transition delay subfield of the EML capability field of the basic variant multilink element. It can be understood that the second switch delay is a transition delay used for the second switch that is indicated by the non-AP MLD to the AP MLD.

FIG. 6 is a first schematic flowchart of an optional method for wireless communication provided by the embodiments of the present application. As shown in FIG. 6, the method for wireless communication includes the following step:

Step 601: in a case where a TXOP is initiated or successfully obtained on a first link of EMLSR links, initiating, by a first affiliated STA of a non-AP MLD, a first switch procedure of the first link, the TXOP being used for the first affiliated STA of the non-AP MLD to transmit an uplink PPDU, where a first switch refers to that the non-AP MLD operating in an EMLSR mode switches from a first operation mode to a second operation mode, the first operation mode refers to performing a listening operation on multiple links of the EMLSR links, and the second operation mode refers to performing a frame exchange operation on one of the EMLSR links and the frame exchange operation has a frame exchange capability of using multiple spatial streams.

In the embodiments of the present application, it is clarified how to perform the first switch in a case where the non-AP MLD initializes an uplink PPDU transmission in the EMLSR mode. Specifically, in a case where the first affiliated STA of the non-AP MLD initiates or successfully obtains the TXOP on the first link of the EMLSR links, a first switch procedure (hereinafter referred to as Rule 1) of a first link is initiated. Here, the first affiliated STA is a STA affiliated to the non-AP MLD, and a link where the first affiliated STA is on is the first link.

As to Rule 1, in some optional implementations, when the first affiliated STA of the non-AP MLD initiates or successfully obtains a TXOP on the first link of the EMLSR links, a first switch procedure of the first link is initiated. In some optional implementations, the first switch procedure of the first link is initiated after a specific interval starting at a time point when the first affiliated STA of the non-AP MLD initiates or successfully obtains the TXOP on the first link of the EMLSR links. Here, the TXOP is used for the first affiliated STA of the non-AP MLD to transmit an uplink PPDU.

It should be noted that the EMLSR links in the embodiments of the present application refers to links enabled by the non-AP MLD and operating in the EMLSR mode. The descriptions of the EMLSR link may be understood with reference to the aforementioned related solutions. As an example, the EMLSR links enabled by the non-AP MLD includes a first link and a second link, and the first switch procedure of the first link is initiated in the case where the first affiliated STA of the non-AP MLD initiates or successfully obtains a TXOP on the first link of the EMLSR links.

In some optional implementations, the first affiliated STA of the non-AP MLD sending the initial PPDU on the first link may be regarded as the first affiliated STA of the non-AP MLD initiating a TXOP on the first link. Here, "initiate" may also be expressed as "initialize".

In some optional implementations, a time point when the TXOP is successfully obtained may be determined by the first affiliated STA of the non-AP MLD through any of the following manners:

Manner 1: the first affiliated STA of the non-AP MLD sends the initial PPDU on the first link; if the initial PPDU requires an immediate response, the first affiliated STA of the non-AP MLD determines that the time point when the TXOP is successfully obtained is: a time point when a response frame corresponding to the initial PPDU is received.

Manner 2: the first affiliated STA of the non-AP MLD sends the initial PPDU on the first link; if the initial PPDU does not require an immediate response, the first affiliated STA of the non-AP MLD determines that the time point when the TXOP is successfully obtained is: a time point when transmission of the initial PPDU is started or a time point when transmission of the initial PPDU is completed.

In some optional implementations, the first affiliated STA of the non-AP MLD completes the first switch procedure within a first switch delay after initiating or successfully obtaining the TXOP, and the time required from a start to an end of the first switch procedure is greater than or equal to a padding delay (hereinafter referred to as Rule 2). Here, the padding delay is a padding delay used for the first switch indicated by the non-AP MLD to the AP MLD.

Here, the Rule 2 (that is, the time required from the start to the end of the first switch procedure is greater than or equal to the padding delay) is a consistency restriction on the padding delay in a downlink first switch and an uplink first switch in the EMLSR mode. In a downlink case of the EMLSR mode, the padding delay is a padding delay used for the first switch and indicated by the non-AP MLD to the AP MLD. The AP MLD subsequently performs MAC padding on an initial control frame according to the padding delay. In order to maintain consistency of the meaning of the padding delay in an uplink case and a downlink case, in the uplink case of the EMLSR mode, it is necessary to ensure that time required for the non-AP MLD operating in the EMLSR mode to start the first switch until it completes the first switch within the first switch delay is greater than or equal to the padding delay. It should be noted that the Rule 2 does not restrict whether the non-AP MLD uses a single spatial stream or multiple spatial streams to perform frame exchange within the first switch delay after completing the first switch.

In some optional embodiments, the first affiliated STA of the non-AP MLD sends a specific frame sequence during the first switch (which may also be understood as within the first switch delay). The specific frame sequence is used to occupy a channel on the first link (hereinafter referred to as Rule 3), thereby preventing a channel on the first link from being preempted by other devices.

In some optional implementations, during the first switch, the first affiliated STA of the non-AP MLD sends a specific frame from a first time point, and continues sending the specific frame in a case where a first condition is met or stops sending the specific frame in a case where a second condition is met. Further, optionally, after sending the specific frame, the first affiliated STA of the non-AP MLD sends an uplink PPDU to a first affiliated AP of the AP MLD on the first link. Here, optionally, a time point to send the uplink PPDU is a time point spaced apart from a time point when the first affiliated STA of the non-AP MLD last sent the specific frame by an interval of aSIFSTime duration.

Here, optionally, the specific frame sequence includes a null data packet announcement (NDPA) frame and at least one null data packet (NDP) frame; alternatively, the specific frame sequence includes at least one clear to send to self (CTS-to-self) frame; alternatively, the specific frame sequence includes at least one quality of service null (QoS-null) frame; alternatively, the specific frame sequence includes at least one data frame. The descriptions herein are only examples of the specific frame sequence, and the type of the specific frame sequence is not limited in the present application.

Here, the first time point is determined based on a time point when the first affiliated STA of the non-AP MLD initiates or successfully obtains the TXOP. Optionally, the time point when the first affiliated STA of the non-AP MLD initiates or successfully obtains the TXOP is a second time point, and the first time point is a time point after the second time point and spaced apart from the second time point by an interval of aSIFSTime duration.

Here, the time point when the first affiliated STA of the non-AP MLD initiates or successfully obtains the TXOP is a second time point, a time point after the second time point and spaced apart from the second time point by an interval of a first switch delay is a third time point, and a time point when the first affiliated STA of the non-AP MLD last sent a specific frame is a fourth time point. The first condition is related to the third time point and the fourth time point, and the second condition is related to the third time point and the fourth time point. Optionally, the first condition is that the third time minus the fourth time is greater than aSIFSTime duration; the second condition is that the third time point minus the fourth time point is less than or equal to 0, or the third time point minus the fourth time point is greater than 0 and less than or equal to aSIFSTime duration.

As an example, as shown in FIG. 7, once an affiliated STA 1 of a non-AP MLD backs off to 0, the affiliated STA 1 immediately sends a request to send (RTS) frame. The reception of a clear to send (CTS) frame from an AP MLD is considered as successfully obtaining of a TXOP. A time point when the TXOP is successfully obtained is a start time of the first switch delay, and an end time of the first switch delay is $t_2$. After an interval of aSIFSTime duration starting at an end of the reception of the CTS frame, the affiliated STA 1 of the non-AP MLD sends a specific frame sequence to occupy a channel on link 1. A time point when the affiliated STA 1 of the non-AP MLD last sent the specific frame is $t_1$, so let $t=t_2-t_1$. There are:

Case 1): if/is less than or equal to 0 (i.e., $t \leq 0$), then the affiliated STA 1 of the non-AP MLD stops sending the specific frame. Further, after an interval of aSIFSTime duration starting at $t_1$, the affiliated STA 1 of the non-AP MLD sends an uplink PPDU to an affiliated AP 1 of the AP MLD.

Case 2): if t is greater than 0 and less than or equal to aSIFSTime (i.e., $t>0$ and $t \leq$aSIFSTime), the affiliated STA 1 of the non-AP MLD stops sending the specific frame. Further, after an interval of aSIFSTime duration starting at $t_1$, the affiliated STA 1 of the non-AP MLD sends an uplink PPDU to an affiliated AP 1 of the AP MLD.

Case 3): if t is greater than aSIFSTime (i.e., $t>$aSIFSTime), then the affiliated STA 1 of the non-AP MLD continues to send the specific frame until Case 1) or Case 2) occurs.

It should be noted that channel preemption performed by the affiliated STA 1 of the non-AP MLD should be optimized by sending as few specific frames as possible to complete preemption procedure, but this is not required by the present application.

In some optional embodiments, in response to determining that transmission of a second PPDU within the TXOP fails, the non-AP MLD performs an error recovery operation and/or a second switch (hereinafter referred to as a non-AP MLD side solution in Rule 5). The second PPDU is a non-initial PPDU. The second switch refers to that the non-AP MLD operating in the EMLSR mode switches from the second operation mode to the first operation mode. The following will describe how to implement the error recovery operation and/or the second switch in different situations in the case where the transmission of the second PPDU within the TXOP fails.

Case I): in response to determining that the transmission of the second PPDU within the TXOP fails, the non-AP MLD performs PIFS recovery and/or backoff, in a case where the non-AP MLD is allowed to perform the second switch only after a TXOP ends, and performs the second switch after the TXOP ends.

Case II): in response to determining that the transmission of the second PPDU within the TXOP fails, the non-AP MLD performs the error recovery operation and/or the second switch in a specific manner, in a case where the non-AP MLD is allowed to perform the second switch within a TXOP.

In some optional implementations, for the above Case II), there may be the following options.

Option II-1): in response to determining that the transmission of the second PPDU within the TXOP fails, the non-AP MLD immediately performs the second switch and performs backoff after the TXNAV timer expires. Here, the non-AP MLD is not allowed to continue transmitting an uplink PPDU within the TXOP after the second switch is completed.

Option II-2): in response to determining that the transmission of the second PPDU within the TXOP fails, the non-AP MLD performs the error recovery operation; where if the error recovery operation is an error recovery operation of performing backoff when a TXNAV timer is expired, the second switch is performed when the TXNAV timer expires;

if the error recovery operation is an error recovery operation of performing PIFS recovery, after waiting for aPIFStime after a first timeout period expires, the second PPDU is retransmitted, and the second switch is not performed;

if the error recovery operation is an error recovery operation of performing backoff, after the first timeout period expires, a backoff procedure is performed, and the second switch is not performed.

Here, the first timeout period starts at a time point when the non-AP MLD completes the transmission of the second PPDU.

Here, optionally, the first timeout period includes aSIFSTime duration, a slot time aSlotTime duration and a physical layer start receiving delay. As an example, the first timeout period equals to the sum of aSIFSTime, aSlotTime, and aRxPHYStartDelay, that is, first timeout period=aSIFSTime+aSlotTime+aRxPHYStartDelay.

Option II-3): in response to determining that the transmission of the second PPDU within the TXOP fails, the non-AP MLD performs the second switch. The non-AP MLD performs an error recovery operation of performing backoff on a plurality of EMLSR links after completing the second switch. Further, optionally, if a second affiliated STA of the non-AP MLD backs off to 0 and initiates or successfully obtains a TXOP on a second link, a first switch procedure of the second link is initiated. Here, the second affiliated STA is a STA (different from the first affiliated STA) affiliated to the non-AP MLD, and a link where the second affiliated STA is on is the second link.

For any of the above Case I) and Case II), the determination of second PPDU transmission failure within the TXOP by the non-AP MLD may be implemented through the following modes.

Mode A): if a MAC layer of the first affiliated STA of the non-AP MLD does not receive a physical layer start receiving indication primitive within a first timeout period after a ninth time point, it is determined that the transmission of the second PPDU fails.

Here, optionally, the ninth time point is a time point when the first affiliated STA of the non-AP MLD completes the transmission of the second PPDU.

Here, optionally, the first timeout period includes aSIFSTime duration, a slot time aSlotTime duration and a physical layer start receiving delay. As an example, the first timeout period equals to the sum of aSIFSTime, aSlotTime, and aRxPHYStartDelay, that is, first timeout period=aSIFSTime+aSlotTime+aRxPHYStartDelay.

Here, optionally, the qualified PPDU includes at least one of the following: an individually addressed frame, where a receiving address of the individually addressed frame is a MAC address of the first affiliated STA of the non-AP MLD; a trigger frame, where the trigger frame includes a user information field addressed to the first affiliated STA of the non-AP MLD; a CTS-to-self frame, where a receiving address of the CTS-to-self frame is a MAC address of a first affiliated AP of the AP MLD; a Multi-STA BlockACK frame, where the Multi-STA BlockACK frame includes a Per AID TID information field addressed to the first affiliated STA of the non-AP MLD; or an NDPA frame, where the NDPA frame includes a STA information field addressed to the first affiliated STA of the non-AP MLD.

Mode B): if a MAC layer of the first affiliated STA of the non-AP MLD receives a physical layer start receiving indication primitive within the first timeout period after the ninth time point but does not receive a qualified PPDU corresponding to the physical layer start receiving indication primitive within the first timeout period after the ninth time point, it is determined that the transmission of the second PPDU fails.

Here, optionally, the ninth time point is a time point when the first affiliated STA of the non-AP MLD completes the transmission of the second PPDU.

Here, optionally, the first timeout period includes aSIFSTime duration, a slot time aSlotTime duration and a physical layer start receiving delay. As an example, the first timeout period equals to the sum of aSIFSTime, aSlotTime, and aRxPHYStartDelay, that is, first timeout period=aSIFSTime+aSlotTime+aRxPHYStartDelay.

Here, optionally, the qualified PPDU includes at least one of the following: an individually addressed frame, where a receiving address of the individually addressed frame is a MAC address of the first affiliated STA of the non-AP MLD; a trigger frame, where the trigger frame includes a user information field addressed to the first affiliated STA of the non-AP MLD; a CTS-to-self frame, where a receiving address of the CTS-to-self frame is a MAC address of a first affiliated AP of the AP MLD; a Multi-STA BlockACK frame, where the Multi-STA BlockACK frame includes a Per AID TID information field addressed to the first affiliated STA of the non-AP MLD; an NDPA frame, where the NDPA frame includes a STA information field addressed to the first affiliated STA of the non-AP MLD.

FIG. 8 is a second schematic flowchart of an optional method for wireless communication provided by the embodiments of the present application. As shown in FIG. 8, the method for wireless communication includes the following step:

Step 801: determining, by an AP MLD, that a time point when a non-AP MLD completes a second switch is a fifth time point, where the AP MLD is allowed to send an initial control frame on any of EMLSR links after the fifth time point, and the initial control frame is used to initiate downlink PPDU transmission. The second switch refers to that the non-AP MLD operating in an EMLSR mode switches from a second operation mode to a first operation mode, the second operation mode refers to performing a frame exchange operation on one of the EMLSR links and the frame exchange operation has a frame exchange capability of using multiple spatial streams, and the first operation mode refers to performing a listening operation on multiple links of the EMLSR links.

In the embodiments of the present application, it is clarified how the AP MLD determines the time point when the non-AP MLD completes the second switch. Specifically, the AP MLD determines a sixth time point, and determines a time point after the sixth time point and spaced apart from the sixth time point by an interval of a second switch delay as the fifth time point for the non-AP MLD to complete the second switch. After the fifth time point, the AP MLD is allowed to send an initial control frame on any of the EMLSR links, and the initial control frame is used to initiate downlink PPDU transmission.

With reference to different solutions, how the AP MLD determines the sixth time point will be described in the following.

Solution 1 (Hereinafter Referred to as Rule 4)

Solution 1-1): if a MAC layer of a first affiliated AP of the AP MLD does not receive a physical layer start receiving indication primitive within a first timeout period after a seventh time point, it is determined that an end time of the first timeout period is the sixth time point.

Here, the latest uplink PPDU received by the first affiliated AP of the AP MLD from a first affiliated STA of the non-AP MLD is a first PPDU. If the first PPDU requires an immediate response, the seventh time point is a time point when the first affiliated AP of the AP MLD completes transmission of a response frame corresponding to the first PPDU. If the first PPDU does not require an immediate response, the seventh time point is a time point when the first affiliated AP of the AP MLD completes reception of the first PPDU.

Solution 1-2): if the MAC layer of the first affiliated AP of the AP MLD receives a physical layer start receiving indication primitive within the first timeout period after the seventh time point but does not receive a qualified PPDU corresponding to the physical layer start receiving indication primitive within the first timeout period after the seventh time point, it is determined that the end time of the first timeout period is the sixth time point.

Here, a latest uplink PPDU received by the first affiliated AP of the AP MLD from a first affiliated STA of the non-AP MLD is a first PPDU. If the first PPDU requires an immediate response, the seventh time point is a time point when the first affiliated AP of the AP MLD completes transmission of a response frame corresponding to the first PPDU. If the first PPDU does not require an immediate response, the seventh time point is a time point when the first affiliated AP of the AP MLD completes reception of the first PPDU.

Here, optionally, the qualified PPDU includes at least one of the following: an individually addressed frame, where a receiving address of the individually addressed frame is a MAC address of the first affiliated AP of the AP MLD; a CTS-to-self frame, where a receiving address of the CTS-to-self frame is a MAC address of the first affiliated AP of the AP MLD; or an NDPA frame, where the NDPA frame includes a STA information field addressed to the first affiliated AP of the AP MLD.

Solution 2 Hereinafter Referred to as an AP MLD Side Solution in Rule 5)

Case I): in response to determining that transmission of a second PPDU within a TXOP fails, determining, by the AP MLD, that an end time of the TXOP is the sixth time point, in a case where the non-AP MLD is allowed to perform the second switch only after a TXOP ends. The TXOP is a TXOP obtained by the first affiliated STA of the non-AP MLD on a first link of the EMLSR links, and the TXOP is used for the first STA of the non-AP MLD to transmit an uplink PPDU. The second PPDU is a non-initial PPDU.

Case II): in response to determining that transmission of a second PPDU within a TXOP fails, determining, by the AP MLD, that an end time of a first timeout period is the sixth time point, in a case where the non-AP MLD is allowed to perform the second switch within a TXOP. The TXOP is a TXOP obtained by the first affiliated STA of the non-AP MLD on a first link of the EMLSR links, and the TXOP is used for the first STA of the non-AP MLD to transmit an uplink PPDU. The second PPDU is a non-initial PPDU.

In some optional implementations, for the above Case II), there may be the following options.

Option II-1): in response to determining that the second PPDU transmission within the TXOP fails, the AP MLD waits for a second timeout period; and if the AP MLD receives a physical layer start receiving indication primitive within the second timeout period and receives a qualified PPDU corresponding to the physical layer start receiving indication primitive, the AP MLD determines by that the non-AP MLD has performed PIFS recovery and has not performed the second switch, and the AP MLD sends an initial control frame to the non-AP MLD after an interval of the second switch delay starting at an end of the TXOP; or if the AP MLD does not receive a physical layer start receiving indication primitive within the second timeout period and does not receive a valid PPDU within remaining time of the TXOP, the AP MLD determines that the non-AP MLD has performed an error recovery operation of performing backoff when a TXNAV timer is expired, and the AP MLD sends an initial control frame to the non-AP MLD after the TXOP ends; or if the AP MLD does not receive a physical layer start receiving indication primitive within the second timeout period and receives a valid PPDU within the remaining time of the TXOP, the AP MLD determines that the non-AP MLD has performed an error recovery operation of backoff, and the AP MLD sends an initial control frame to the non-AP MLD after an interval of the second switch delay starting at the end of the TXOP.

Here, optionally, the second timeout period includes aSIFSTime duration and aSlotTime duration. As an example, the second timeout period equals to the sum of aSIFSTime and aSlotTime, that is, second timeout period=aSIFSTime+aSlotTime.

Here, optionally, the qualified PPDU includes at least one of the following: an individually addressed frame, where a receiving address of the individually addressed frame is a MAC address of the first affiliated AP of the AP MLD; a CTS-to-self frame, where a receiving address of the CTS-to-self frame is the MAC address of the first affiliated AP of the AP MLD; or an NDPA frame, where the NDPA frame includes a STA information field addressed to the first affiliated AP of the AP MLD.

Option II-2): the first affiliated AP of the AP MLD waits for a first timeout period after completing transmission of a response frame of the second PPDU; and if the AP MLD receives a physical layer start receiving indication primitive within the first timeout period and receives a qualified PPDU corresponding to the physical layer start receiving indication primitive, the AP MLD determines that the non-AP MLD has performed PIFS recovery and has not performed the second switch; and the AP MLD sends an initial control frame to the non-AP MLD after an interval of the second switch delay starting at an end of the TXOP; or if the AP MLD does not receive a physical layer start receiving indication primitive within the first timeout period and does not receive a valid PPDU in remaining time of the TXOP, the AP MLD determines that the non-AP MLD has performed an error recovery operation of performing backoff when a TXNAV timer is expired; and the AP MLD sends an initial control frame to the non-AP MLD after the TXOP ends; or if the AP MLD does not receive a physical layer start receiving indication primitive within the first timeout period and receives a valid PPDU in the remaining time of the TXOP, the AP MLD determines that the non-AP MLD has performed an error recovery operation of backoff; and the AP MLD sends an initial control frame to the non-AP MLD after an interval of the second switch delay starting at the end of the TXOP.

Here, optionally, the qualified PPDU includes at least one of the following: an individually addressed frame, where a receiving address of the individually addressed frame is a MAC address of the first affiliated AP of the AP MLD; a CTS-to-self frame, where a receiving address of the CTS-to-self frame is a MAC address of the first affiliated AP of the AP MLD; or an NDPA frame, where the NDPA frame includes a STA information field addressed to the first affiliated AP of the AP MLD.

For any of the above Case I) and Case II), the determination of second PPDU transmission failure within the TXOP by the AP MLD may be implemented through the following modes.

Mode A): if a MAC layer of the first affiliated AP of the AP MLD does not receive a physical layer start receiving indication primitive within a first timeout period after an eighth time point, it is determined that the transmission of the second PPDU fails.

Here, optionally, if the second PPDU requires an immediate response, the eighth time point is a time point when the first affiliated AP of the AP MLD completes transmission of a response frame corresponding to the second PPDU; if the second PPDU does not require an immediate response, the eighth time point is a time point when the first affiliated AP of the AP MLD completes reception of the second PPDU.

Here, optionally, the first timeout period includes aSIFSTime duration, aSlotTime duration, and a physical layer start receiving delay. As an example, the first timeout period equals to the sum of aSIFSTime, aSlotTime, and aRxPHYStartDelay, that is, first timeout period=aSIFSTime+aSlotTime+aRxPHYStartDelay.

Mode B): if the MAC layer of the first affiliated AP of the AP MLD receives a physical layer start receiving indication primitive within the first timeout period after the eighth time point but does not receive a qualified PPDU corresponding to the physical layer start receiving indication primitive within the first timeout period after the eighth time point, it is determined that the transmission of the second PPDU fails.

Here, optionally, if the second PPDU requires an immediate response, the eighth time point is a time point when the first affiliated AP of the AP MLD completes transmission of a response frame corresponding to the second PPDU; if the second PPDU does not require an immediate response, the eighth time point is a time point when the first affiliated AP of the AP MLD completes reception of the second PPDU.

Here, optionally, the first timeout period includes aSIFSTime duration, aSlotTime duration, and a physical layer start receiving delay. As an example, the first timeout period equals to the sum of aSIFSTime, aSlotTime, and aRxPHYStartDelay, that is, first timeout period=aSIFSTime+aSlotTime+aRxPHYStartDelay.

Here, optionally, the qualified PPDU includes at least one of the following: an individually addressed frame, where a receiving address of the individually addressed frame is a MAC address of the first affiliated AP of the AP MLD; a CTS-to-self frame, where a receiving address of the CTS-to-self frame is a MAC address of the first affiliated AP of the AP MLD; or an NDPA frame, where the NDPA frame includes a STA information field addressed to the first affiliated AP of the AP MLD.

FIG. 9 is a third schematic flowchart of an optional method for wireless communication provided by the embodiments of the present application. As shown in FIG. 9, the method for wireless communication includes the following step:

Step 901: in response to determining that transmission of a second PPDU within a TXOP fails, performing, by the non-AP MLD, an error recovery operation and/or a second switch, where the TXOP is a TXOP obtained by a first affiliated STA of the non-AP MLD on a first link of EMLSR links, the TXOP is used for the first STA of the non-AP MLD to transmit an uplink PPDU, and the second PPDU is a non-initial PPDU. The second switch refers to that the non-AP MLD operating in an EMLSR mode switches from a second operation mode to a first operation mode, the second operation mode refers to performing a frame exchange operation on one of the EMLSR links and the frame exchange operation has a frame exchange capability of using multiple spatial streams, and the first operation mode refers to performing a listening operation on multiple links of the EMLSR links.

In the embodiments of the present application, in response to determining that transmission of a second PPDU within a TXOP fails, the non-AP MLD performs an error recovery operation and/or a second switch (hereinafter referred to as a non-AP MLD side solution in Rule 5). The second PPDU is a non-initial PPDU. The second switch refers to that the non-AP MLD operating in an EMLSR mode switches from the second operation mode to the first operation mode. The following will describe how to implement the error recovery operation and/or the second switch in different situations in the case where the transmission of the second PPDU within the TXOP fails.

Case I): in response to determining that the transmission of the second PPDU within the TXOP fails, the non-AP MLD performs PIFS recovery and/or backoff, in a case where the non-AP MLD is allowed to perform the second switch only after a TXOP ends, and performs the second switch after the TXOP ends.

Case II): in response to determining that the transmission of the second PPDU within the TXOP fails, the non-AP MLD performs the error recovery operation and/or the second switch in a specific manner, in a case where the non-AP MLD is allowed to perform the second switch within a TXOP.

In some optional implementations, for the above Case II), there may be the following options.

Option II-1): in response to determining that the transmission of the second PPDU within the TXOP fails, the non-AP MLD immediately performs the second switch and performs backoff after the TXNAV timer expires. Here, the non-AP MLD is not allowed to continue transmitting an uplink PPDU within the TXOP after the second switch is completed.

Option II-2): in response to determining that the transmission of the second PPDU within the TXOP fails, the non-AP MLD performs the error recovery operation; where if the error recovery operation is an error recovery operation of performing backoff when a TXNAV timer is expired, the second switch is performed when the TXNAV timer expires;

if the error recovery operation is an error recovery operation of performing PIFS recovery, after waiting for aPIFStime after a first timeout period expires, the second PPDU is retransmitted, and the second switch is not performed;

if the error recovery operation is an error recovery operation of performing backoff, after the first timeout period expires, a backoff procedure is performed, and the second switch is not performed.

Here, the first timeout period starts at a time point when the non-AP MLD completes the transmission of the second PPDU.

Here, optionally, the first timeout period includes aSIFSTime duration, a slot time aSlotTime duration and a physical layer start receiving delay. As an example, the first timeout period equals to the sum of aSIFSTime, aSlotTime, and aRxPHYStartDelay, that is, first timeout period=aSIFSTime+aSlotTime+aRxPHYStartDelay.

Option II-3): in response to determining that the transmission of the second PPDU within the TXOP fails, the non-AP MLD performs the second switch. The non-AP MLD performs an error recovery operation of performing backoff on a plurality of EMLSR links after completing the second switch. Further, optionally, if a second affiliated STA of the non-AP MLD backs off to 0 and initiates or successfully obtains a TXOP on a second link, a first switch procedure of the second link is initiated. Here, the second affiliated STA is a STA (different from the first affiliated STA) affiliated to the non-AP MLD, and a link where the second affiliated STA is on is the second link.

For any of the above Case I) and Case II), the determination of second PPDU transmission failure within the TXOP by the non-AP MLD may be implemented through the following modes.

Mode A): if a MAC layer of the first affiliated STA of the non-AP MLD does not receive a physical layer start receiving indication primitive within a first timeout period after a ninth time point, it is determined that the transmission of the second PPDU fails.

Here, optionally, the ninth time point is a time point when the first affiliated STA of the non-AP MLD completes the transmission of the second PPDU.

Here, optionally, the first timeout period includes aSIFSTime duration, a slot time aSlotTime duration and a physical layer start receiving delay. As an example, the first timeout period equals to the sum of aSIFSTime, aSlotTime, and aRxPHYStartDelay, that is, first timeout period=aSIFSTime+aSlotTime+aRxPHYStartDelay.

Here, optionally, the qualified PPDU includes at least one of the following: an individually addressed frame, where a receiving address of the individually addressed frame is a MAC address of the first affiliated STA of the non-AP MLD; a trigger frame, where the trigger frame includes a user information field addressed to the first affiliated STA of the non-AP MLD; a CTS-to-self frame, where a receiving address of the CTS-to-self frame is a MAC address of a first affiliated AP of the AP MLD; a Multi-STA BlockACK frame, where the Multi-STA BlockACK frame includes a Per AID TID information field addressed to the first affiliated STA of the non-AP MLD; or an NDPA frame, where the NDPA frame includes a STA information field addressed to the first affiliated STA of the non-AP MLD.

Mode B): if a MAC layer of the first affiliated STA of the non-AP MLD receives a physical layer start receiving indication primitive within the first timeout period after the ninth time point but does not receive a qualified PPDU corresponding to the physical layer start receiving indication primitive within the first timeout period after the ninth time point, it is determined that the transmission of the second PPDU fails.

Here, optionally, the ninth time point is a time point when the first affiliated STA of the non-AP MLD completes the transmission of the second PPDU.

Here, optionally, the first timeout period includes aSIFSTime duration, a slot time aSlotTime duration and a physical layer start receiving delay. As an example, the first timeout period equals to the sum of aSIFSTime, aSlotTime, and aRxPHYStartDelay, that is, first timeout period=aSIFSTime+aSlotTime+aRxPHYStartDelay.

Here, optionally, the qualified PPDU includes at least one of the following: an individually addressed frame, where a receiving address of the individually addressed frame is a MAC address of the first affiliated STA of the non-AP MLD; a trigger frame, where the trigger frame includes a user information field addressed to the first affiliated STA of the non-AP MLD; a CTS-to-self frame, where a receiving address of the CTS-to-self frame is a MAC address of a first affiliated AP of the AP MLD; a Multi-STA BlockACK frame, where the Multi-STA BlockACK frame includes a Per AID TID information field addressed to the first affiliated STA of the non-AP MLD; an NDPA frame, where the NDPA frame includes a STA information field addressed to the first affiliated STA of the non-AP MLD.

The relevant solutions of Rule 4 described in the foregoing embodiments are further described in detail below.

A MAC layer of a first affiliated AP of an AP MLD determines that a time point when a first case occurs is a sixth time point, and after an interval of a second switch delay starting at the sixth time point, the non-AP MLD may be considered to have completed a second switch and is in a first operation mode. After that, the AP MLD is allowed to send an initial control frame on any of EMLSR links to initiate downlink PPDU transmission. Rule 4 defines when the AP MLD may transmit the initial control frame to the non-AP MLD after the non-AP MLD completes uplink PPDU transmission in an EMLSR mode. The first case may be any of the following cases.

Case 1): a MAC layer of the first affiliated AP of the AP MLD does not receive a physical layer start receiving indication primitive within a first timeout period after a seventh time point. Here, the seventh time point is a time point when the first affiliated AP of the AP MLD completes transmission of a response frame corresponding to the first PPDU (applicable to a case where the first PPDU requires an immediate response); alternatively, the seventh time point is a time point when the first affiliated AP of the AP MLD completes reception of the first PPDU (applicable to a case where the first PPDU does not require an immediate response). Here, the first PPDU is the latest uplink PPDU received by the first affiliated AP of the AP MLD from a first affiliated STA of the non-AP MLD.

Figure 10:
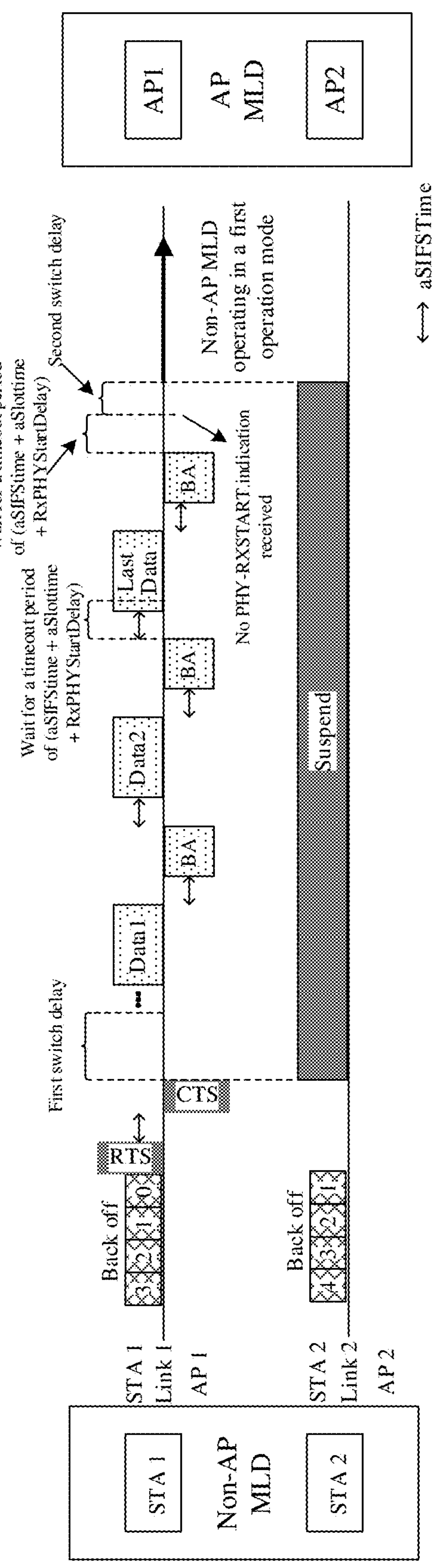
FIG. 10 is a second schematic diagram showing optional communication operations between a non-AP MLD and an AP MLD according to the embodiments of the present application.

As an example, as shown in FIG. 10, after an affiliated STA 1 of an AP MLD receives the last data frame (i.e., an uplink PPDU) and sends a response frame (i.e., a block acknowledgment (BA) frame) corresponding to the last data frame, if a physical layer start receiving indication primitive is not received within a timeout period of aSIFSTime+aSlotTime+aRxPHYStartDelay (i.e., a first timeout period), the AP MLD waits for the second switch delay after the timeout period ends. At this time, the non-AP MLD may be considered to have completed the second switch and is in the first operation mode. Further, the AP MLD may send the initial control frame to the non-AP MLD on any of the EMLSR links to initialize downlink PPDU transmission.

Case 2): the MAC layer of the first affiliated AP of the AP MLD receives a physical layer start receiving indication primitive within the first timeout period after the seventh time point but does not receive a qualified PPDU corresponding to the physical layer start receiving indication primitive within the first timeout period after the seventh time point (or, in other words, a PPDU corresponding to the physical layer start receiving indication primitive does not include the qualified PPDU). Here, the seventh time point is a time point when the first affiliated AP of the AP MLD completes transmission of a response frame corresponding to the first PPDU (applicable to a case where the first PPDU requires an immediate response); alternatively, the seventh time point is a time point when the first affiliated AP of the AP MLD completes reception of the first PPDU (applicable to a case where the first PPDU does not require an immediate response). Here, the first PPDU is the latest uplink PPDU received by the first affiliated AP of the AP MLD from a first affiliated STA of the non-AP MLD.

Here, optionally, the qualified PPDU includes at least one of the following: an individually addressed frame, where a receiving address of the individually addressed frame is a MAC address of the first affiliated AP of the AP MLD; a CTS-to-self frame, where a receiving address of the CTS-to-self frame is the MAC address of the first affiliated AP of the AP MLD; or an NDPA frame, where the NDPA frame includes a STA information field addressed to the first affiliated AP of the AP MLD.

Figure 11:
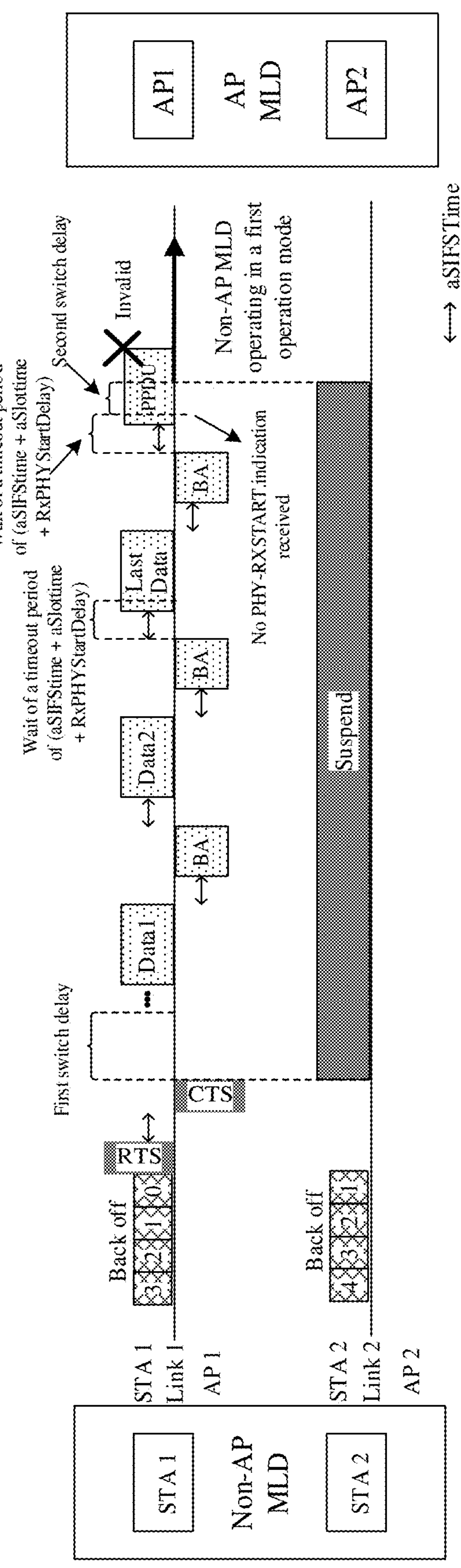
FIG. 11 is a third schematic diagram showing optional communication operations between a non-AP MLD and an AP MLD according to the embodiments of the present application.

As an example, as shown in FIG. 11, after an affiliated STA 1 of an AP MLD receives the last data frame (i.e., an uplink PPDU) and sends a response frame (i.e., a BA frame) corresponding to the last data frame, within a timeout period of aSIFSTime+aSlotTime+aRxPHYStartDelay (i.e., a first timeout period), if a physical layer start receiving indication primitive is received but a qualified PPDU corresponding to the physical layer start receiving indication primitive is not received (or, in other words, a PPDU corresponding to the physical layer start receiving indication primitive does not include the qualified PPDU), the AP MLD waits for a second switch delay after the first timeout period ends. At this time, the non-AP MLD may be considered to have completed the second switch and is in the first operation mode. Further, the AP MLD may send the initial control frame to the non-AP MLD on any of the EMLSR links to initialize downlink PPDU transmission.

The following will describe the non-AP MLD side solution in Rule 5 and the AP MLD side solution in Rule 5 in detail.

In a case where a non-AP MLD fails to transmit a non-initial PPDU within a TXOP initiated or successfully obtained by the non-AP MLD, used by the non-AP MLD and an AP MLD include the following cases.

Case I): if the non-AP MLD is allowed to perform the second switch only after the obtained TXOP thereof ends, the non-AP MLD is allowed to perform PIFS recovery and/or backoff in a case where the non-AP MLD fails to transmit a non-initial PPDU within the TXOP. This is due to considerations regarding channel utilization, during a period of waiting for a TXNAV timer to expire, channels may not be used, which reduces resource utilization.

In this case, the processing methods of the non-AP MLD and the AP MLD are as follows:

For the non-AP MLD: the non-AP MLD performs the second switch at an end of the current TXOP and completes the second switch within a second switch delay.

For the AP MLD: after the current TXOP ends, the AP MLD waits for the second switch delay, after which the AP MLD may consider that non-AP MLD has completed the second switch.

Case II): if the non-AP MLD is allowed to perform the second switch within the obtained TXOP thereof, in a case where the non-AP MLD fails to transmit a non-initial PPDU within the obtained TXOP thereof, it has the following error recovery options.

Option II-1): once transmission of the non-initial PPDU fails, the non-AP MLD immediately performs the second switch. After the second switch is completed, the non-AP MLD is not allowed to continue transmitting uplink PPDUs in the remaining time of the current TXOP. Due to this restriction, the only error recovery operation that the non-AP MLD may adopt is to wait for a TXNAV to expire to perform backoff after that. In this case, behaviors of the non-AP MLD and AP MLD are as follows.

For the non-AP MLD: within a timeout period of aSIFSTime+aSlotTime+aRxPHYStartDelay (i.e., a first timeout period) after transmission of the latest uplink PPDU is completed, if a MAC layer of a first affiliated STA of the non-AP MLD does not receive a physical layer start receiving indication primitive, or receives the physical layer start receiving indication primitive but does not receive a qualified PPDU corresponding to the physical layer start receiving indication primitive (or, in other words, a PPDU corresponding to the physical layer start receiving indication primitive does not include the qualified PPDU), the non-AP MLD determines that uplink PPDU transmission fails and immediately performs the second switch. The only error recovery operation that the non-AP MLD may adopt is to wait for a TXNAV to expire to perform backoff after that. After completing the second switch, the non-AP MLD may not continue sending data within the current TXOP. Here, optionally, the qualified PPDU includes at least one of the following: an individually addressed frame, where the receiving address of the individually addressed frame is a MAC address of the first affiliated STA of the non-AP MLD; a trigger frame, where the trigger frame includes a user information field addressed to the first affiliated STA of the non-AP MLD; a CTS-to-self frame, where a receiving address of the CTS-to-self frame is a MAC address of a first affiliated AP of the AP MLD; a Multi-STA BlockACK frame, where the Multi-STA BlockACK frame includes a Per AID TID information field addressed to the first affiliated STA of the non-AP MLD; or an NDPA frame, where the NDPA frame includes a STA information field addressed to the first affiliated STA of the non-AP MLD.

For the AP MLD: within a timeout period of aSIFSTime+aSlotTime+aRxPHYStartDelay (i.e., a first timeout period) after a first affiliated AP of AP MLD receives the last symbol of an erroneous uplink PPDU, or within a timeout period of aSIFSTime+aSlotTime+aRxPHYStartDelay (i.e., the first timeout period) after the first affiliated AP of AP MLD transmits a response frame in response to an uplink PPDU from the non-AP MLD, a MAC layer of the first affiliated AP of AP MLD does not receive a physical layer start receiving indication primitive, or receives the physical layer start receiving indication primitive but does not receive a qualified PPDU corresponding to the physical layer start receiving indication primitive (or, in other words, a PPDU corresponding to the physical layer start receiving indication primitive does not include the qualified PPDU), the AP MLD determines that uplink PPDU transmission fails. After waiting for a second switch delay from the time point when the first timeout period expires, the AP MLD may determine that the non-AP MLD has completed the second switch. After the current TXOP ends, the AP MLD does not need to wait for a second switch delay before attempting to send an initial control frame to the non-AP MLD on one of the EMLSR links to initialize downlink PPDU transmission. Here, optionally, the qualified PPDU includes at least one of the following: an individually addressed frame, where a receiving address of the individually addressed frame is a MAC address of the first affiliated AP of the AP MLD; a CTS-to-self frame, where a receiving address of the CTS-to-self frame is the MAC address of the first affiliated AP of the AP MLD; or an NDPA frame, where the NDPA frame includes a STA information field addressed to the first affiliated AP of the AP MLD.

Option II-2): different actions are taken for different error recovery operations. If an error recovery operation of performing backoff when a TXNAV timer is expired, the non-AP MLD immediately performs the second switch when determining that the uplink PPDU transmission fails; if an error recovery operation of performing PIFS recovery and direct backoff is performed, the non-AP MLD may not immediately perform the second switch. In this case, behaviors of the non-AP MLD and the AP MLD are as follows:

Case 1:

For the non-AP MLD: if a MAC layer of a first affiliated STA of the non-AP MLD does not receive a physical layer start receiving indication primitive within a timeout period of aSIFSTime+aSlotTime+aRxPHYStartDelay (i.e., a first timeout period) after transmission of the latest uplink PPDU is completed, the non-AP MLD determines that the uplink PPDU transmission fails and performs the error recovery operation. If an error recovery operation of performing backoff when the TXNAV timer is expired is adopted, the second switch is performed immediately when the first timeout period expires, and after a second switch delay, the second switch is completed. If an error recovery operation of performing PIFS recovery is performed, a PIFS recovery procedure is performed when the first timeout period expires, and the second switch is not performed. If an error recovery operation of direct backoff is performed, a backoff procedure is performed when the first timeout period expires, and the second switch is not performed.

For the AP MLD: within a timeout period of aSIFSTime+aSlotTime+aRxPHYStartDelay (i.e., a first timeout period) after receiving the last symbol of an erroneous uplink PPDU, a MAC layer of a first affiliated AP of the AP MLD does not receive a physical layer start receiving indication primitive, or receives the physical layer start receiving indication primitive but does not receive a qualified PPDU corresponding to the physical layer start receiving indication primitive (or, in other words, a PPDU corresponding to the physical layer start receiving indication primitive does not include the qualified PPDU), the AP MLD determines that the non-AP MLD transmits an uplink PPDU fails. The AP MLD waits for a timeout period of aSIFSTime+aSlotTime (i.e., a second timeout period), and if the AP MLD receives a physical layer start receiving indication primitive and a qualified PPDU corresponding to the physical layer start receiving indication primitive within the timeout period of aSIFSTime+aSlotTime (i.e., the second timeout period), the AP MLD determines that the non-AP MLD has performed an error recovery operation of performing PIFS and has not performed the second switch. The AP MLD needs to wait for a second switch delay after the current TXOP ends before attempting to send an initial control frame to the non-AP MLD to initialize downlink PPDU transmission. If the AP MLD does not receive a physical layer start receiving indication primitive within the timeout period of aSIFSTime+aSlotTime (i.e., the second timeout period) and does not receive a valid PPDU within the remaining time of the TXOP, the AP MLD determines that the non-AP MLD has performed an error recovery operation of performing backoff when the TXNAV timer is expired, and the AP MLD does not need to wait for a second switch delay after the current TXOP ends before attempting to send the initial control frame to the non-AP MLD to initialize the downlink PPDU transmission. If the AP MLD does not receive a physical layer start receiving indication primitive within the timeout period of aSIFSTime+aSlotTime (i.e., the second timeout period) and receives a valid PPDU within the remaining time of the TXOP, the AP MLD determines that the non-AP MLD has performed an error recovery operation of direct backoff, and the AP MLD needs to wait for a second switch delay after the current TXOP ends before attempting to send the initial control frame to the non-AP MLD to initialize the downlink PPDU transmission. Here, optionally, the qualified PPDU includes at least one of the following: an individually addressed frame, where a receiving address of the individually addressed frame is a MAC address of the first affiliated AP of the AP MLD; a CTS-to-self frame, where a receiving address of the CTS-to-self frame is the MAC address of the first affiliated AP of the AP MLD; or an NDPA frame, where the NDPA frame includes a STA information field addressed to the first affiliated AP of the AP MLD.

Case 2:

For the non-AP MLD: within a timeout period of aSIFSTime+aSlotTime+aRxPHYStartDelay (i.e., a first timeout period) after transmission of the latest uplink PPDU is completed, if a MAC layer of a first affiliated STA of the non-AP MLD receives a physical layer start receiving indication primitive but does not receive a qualified PPDU corresponding to the physical layer start receiving indication primitive (or, in other words, a PPDU corresponding to the physical layer start receiving indication primitive does not include the qualified PPDU), the non-AP MLD determines that the transmission fails and performs error recovery. If an error recovery operation of performing backoff when the TXNAV timer is expired is adopted, the second switch is performed immediately when the first timeout period expires, and after a second switch delay, the second switch is completed. If an error recovery operation of performing PIFS recovery is performed, a PIFS recovery procedure is performed when the first timeout period expires, and the second switch is not performed. If an error recovery operation of direct backoff is performed, a backoff procedure is performed when the first timeout period expires, and the second switch is not performed. Here, optionally, the qualified PPDU includes at least one of the following: an individually addressed frame, where the receiving address of the individually addressed frame is a MAC address of the first affiliated STA of the non-AP MLD; a trigger frame, where the trigger frame includes a user information field addressed to the first affiliated STA of the non-AP MLD; a CTS-to-self frame, where a receiving address of the CTS-to-self frame is a MAC address of a first affiliated AP of the AP MLD; a Multi-STA BlockACK frame, where the Multi-STA BlockACK frame includes a Per AID TID information field addressed to the first affiliated STA of the non-AP MLD; or an NDPA frame, where the NDPA frame includes a STA information field addressed to the first affiliated STA of the non-AP MLD.

For the AP MLD: after transmitting a response frame, if a MAC layer of a first affiliated AP of the AP MLD receives a physical layer start receiving indication primitive and a qualified PPDU corresponding to the physical layer start receiving indication primitive within a timeout period of aSIFSTime+aSlotTime+aRxPHYStartDelay (i.e., a first timeout period), the AP MLD determines that the non-AP MLD has performed a PIFS error recovery operation and has not performed a second switch. After the current TXOP ends, the AP MLD needs to wait for a second switch delay before attempting to send an initial control frame to the non-AP MLD to initialize downlink PPDU transmission. After transmitting the response frame, if the MAC layer of the first affiliated AP of the AP MLD does not receive a physical layer start receiving indication primitive within the timeout period of aSIFSTime+aSlotTime+aRxPHYStartDelay (i.e., the first timeout period) and a qualified PPDU corresponding to the physical layer start receiving indication primitive within the remaining time of the TXOP, the AP MLD determines that the non-AP MLD has performed an error recovery operation of performing backoff when the TXNAV timer is expired, and the AP MLD does not need to wait for a second switch delay after the current TXOP ends before attempting to send the initial control frame to the non-AP MLD to initialize the downlink PPDU transmission. After transmitting the response frame, if the MAC layer of the first affiliated AP of the AP MLD does not receive a physical layer start receiving indication primitive within the timeout period of aSIFSTime+aSlotTime+aRxPHYStartDelay (i.e., the first timeout period) but receives a qualified PPDU corresponding to the physical layer start receiving indication primitive within the remaining time of the TXOP, the AP MLD determines that the non-AP MLD has performed an error recovery operation of direct backoff, and the AP MLD needs to wait for a second switch delay after the current TXOP ends before attempting to send the initial control frame to the non-AP MLD to initialize the downlink PPDU transmission.

In addition, in a case where uplink PPDU transmission of the non-AP MLD fails, the embodiments of the present application further provide a solution for performing an error recovery operation of direct backoff.

Specifically, when an uplink PPDU transmission failure, the non-AP MLD immediately performs a second switch. After completing link switch, the non-AP MLD performs the recovery operation of direct backoff on a corresponding EMLSR link after completing the second switch or when performing the second switch. If any affiliated STA of the non-AP MLD operating on the EMLSR link successfully obtains a TXOP, the non-AP MLD performs a first switch on the link, and performs a channel occupation procedure during the first switch complies with the foregoing description,. After completing the first switch, the non-AP MLD sends data in a multi-spatial stream manner on the current link. In this case, behaviors of the non-AP MLD and the AP MLD are as follows.

For the non-AP MLD: within a timeout period of aSIFSTime+aSlotTime+aRxPHYStartDelay (i.e., a first timeout period) after transmission of the latest uplink PPDU is completed, if a MAC layer of a first affiliated STA of the non-AP MLD does not receive a physical layer start receiving indication primitive, or receives a physical layer start receiving indication primitive but does not receive a qualified PPDU corresponding to the physical layer start receiving indication primitive (or, in other words, a PPDU corresponding to the physical layer start receiving indication primitive does not include the qualified PPDU), the non-AP MLD determines that a transmission failure occurs and immediately performs a second switch. After completing the second switch, the non-AP MLD performs an error recovery operation of direct backoff on an EMLSR link. If any affiliated STA of the non-AP MLD operating on the EMLSR link successfully obtains a TXOP after backs off to 0, the non-AP MLD performs a first switch on the link and follows the previous description. Here, optionally, the qualified PPDU includes at least one of the following: an individually addressed frame, where the receiving address of the individually addressed frame is a MAC address of the first affiliated STA of the non-AP MLD; a trigger frame, where the trigger frame includes a user information field addressed to the first affiliated STA of the non-AP MLD; a CTS-to-self frame, where a receiving address of the CTS-to-self frame is a MAC address of a first affiliated AP of the AP MLD; a Multi-STA BlockACK frame, where the Multi-STA BlockACK frame includes a Per AID TID information field addressed to the first affiliated STA of the non-AP MLD; or an NDPA frame, where the NDPA frame includes a STA information field addressed to the first affiliated STA of the non-AP MLD.

For the AP MLD: within a timeout period of aSIFSTime+aSlotTime+aRxPHYStartDelay (i.e., a first timeout period) after a first affiliated AP of AP MLD receives the last symbol of an erroneous PPDU, or within a timeout period of aSIFSTime+aSlotTime+aRxPHYStartDelay (i.e., the first timeout period) after the first affiliated AP of AP MLD transmits a response frame in response to an uplink PPDU from the non-AP MLD, a MAC layer of the first affiliated AP of AP MLD does not receive a physical layer start receiving indication primitive, or receives the physical layer start receiving indication primitive but does not receive a qualified PPDU corresponding to the physical layer start receiving indication primitive (or, in other words, a PPDU corresponding to the physical layer start receiving indication primitive does not include the qualified PPDU), the AP MLD determines that an uplink PPDU occurs a transmission failure. After the current TXOP expires, the AP MLD waits for a second switch delay, after which the AP MLD may determine that the non-AP MLD has completed the second switch, and may attempt to send an initial control frame to the non-AP MLD on one of the EMLSR links to initialize downlink PPDU transmission. Here, optionally, the qualified PPDU includes at least one of the following: an individually addressed frame, where a receiving address of the individually addressed frame is a MAC address of the first affiliated AP of the AP MLD; a CTS-to-self frame, where a receiving address of the CTS-to-self frame is the MAC address of the first affiliated AP of the AP MLD; or an NDPA frame, where the NDPA frame includes a STA information field addressed to the first affiliated AP of the AP MLD.

It should be noted that, in the technical solutions of the embodiments of the present application, for the non-AP MLD, receiving the physical layer start receiving indication primitive but not receiving the qualified PPDU corresponding to the received physical layer start receiving indication primitive may be understood as receiving the physical layer start receiving indication primitive but not receiving a valid PPDU. Here, the valid PPDU includes at least one of the following: an individually addressed frame, where the receiving address of the individually addressed frame is a MAC address of the first affiliated STA of the non-AP MLD; a trigger frame, where the trigger frame includes a user information field addressed to the first affiliated STA of the non-AP MLD; a CTS-to-self frame, where a receiving address of the CTS-to-self frame is a MAC address of a first affiliated AP of the AP MLD; a Multi-STA BlockACK frame, where the Multi-STA BlockACK frame includes a Per AID TID information field addressed to the first affiliated STA of the non-AP MLD; or an NDPA frame, where the NDPA frame includes a STA information field addressed to the first affiliated STA of the non-AP MLD.

It should be noted that, in the technical solutions of the embodiments of the present application, for the AP MLD, receiving the physical layer start receiving indication primitive but not receiving the qualified PPDU corresponding to the received physical layer start receiving indication primitive may be understood as receiving the physical layer start receiving indication primitive but not receiving a valid PPDU. Here, the valid PPDU includes at least one of the following: an individually addressed frame, where a receiving address of the individually addressed frame is a MAC address of the first affiliated AP of the AP MLD; a CTS-to-self frame, where a receiving address of the CTS-to-self frame is the MAC address of the first affiliated AP of the AP MLD; or an NDPA frame, where the NDPA frame includes a STA information field addressed to the first affiliated AP of the AP MLD.

Figure 12:
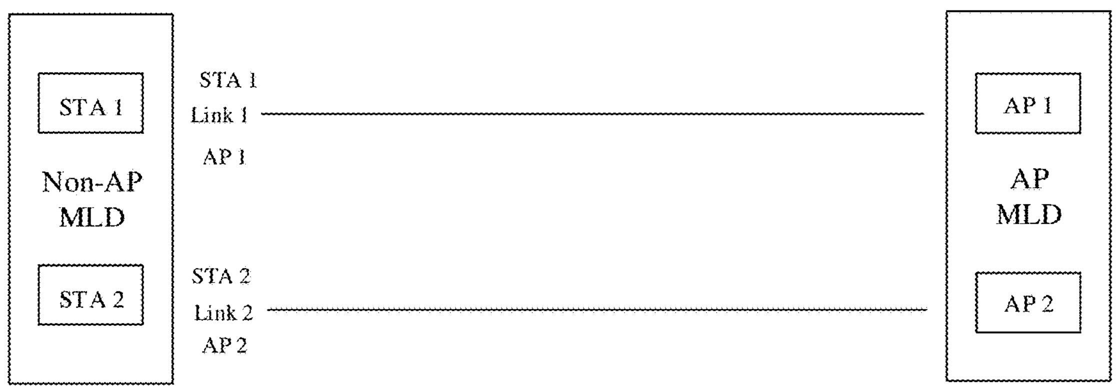
FIG. 12 is an optional system architecture diagram according to the embodiments of the present application.

With reference to specific application examples, the technical solutions of the embodiments of the present application will be illustrated in the following. The following application examples are described by taking the system architecture shown in FIG. 12 as an example. As shown in FIG. 12, affiliated STAs of a non-AP MLD include STA 1 and STA 2, and affiliated APs of an AP MLD include AP 1 and AP 2. STA 1 of the non-AP MLD and AP 1 of the AP MLD are on link 1, and STA 2 of the non-AP MLD and AP 2 of the AP MLD are on link 2. Both the non-AP MLD and the AP MLD support an EMLSR mode, and the non-AP MLD has enabled the EMLSR mode.

It should be noted that the solutions of the present application are based on the premise that the non-AP MLD and the AP MLD have exchanged parameters related to the EMLSR mode, such as a padding delay, a transition delay and other parameters.

It should be noted that a link being in a suspend state refers to that a STA operating on the link and affiliated with the non-AP MLD may not perform a listening operation, nor receive or send a frame, which is manifested as being in a media synchronization loss state.

It should be noted that each of the following application examples may be implemented individually, or any two or more application examples may be combined for implementation, or some technical features in any two or more application examples may be combined for implementation. The following application examples are used to illustrate the technical solutions of the embodiments of the present application, but do not limit the technical solutions of the embodiments of the present application. The technical solutions of the embodiments of the present application include but are not limited to the technical solutions described in the following application examples.

Figure 13:
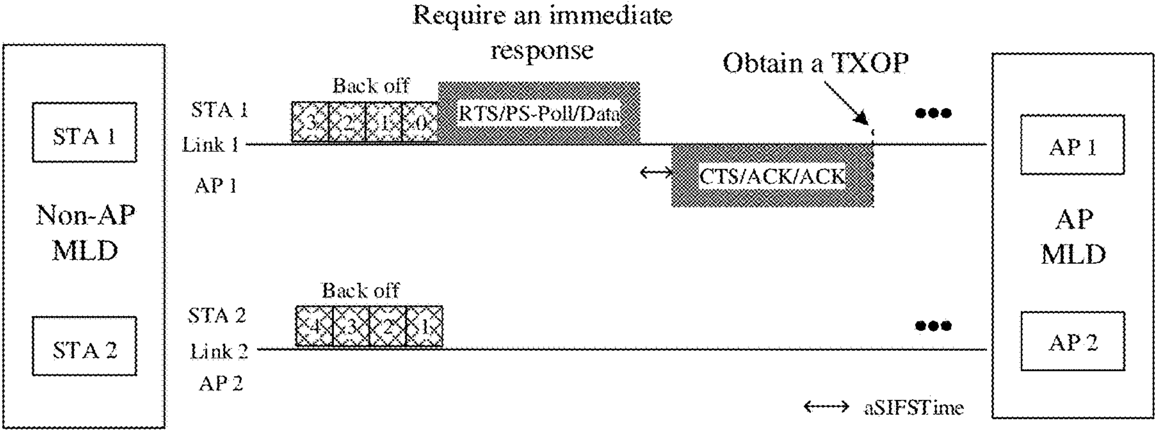
FIG. 13 is a fourth schematic diagram showing optional communication operations between a non-AP MLD and an AP MLD according to the embodiments of the present application.

As an application example, this application example is related to Rule 1 in the foregoing solutions and is applicable to a case where an initial PPDU requires an immediate response. As shown in FIG. 13, an initial PPDU sent by the non-AP MLD requires an immediate response, and thus, the non-AP MLD may obtain a TXOP only after successfully receiving a valid response frame. In this case, there are multiple implementations of the initial PPDU sent in order to obtain a TXOP, which include but not limited to the following implementations.

1) STA 1 of the non-AP MLD sends an RTS frame and successfully obtains a TXOP when it receives a corresponding CTS frame. The RTS frame may be sent by carrying it in an OFDM PPDU or a non-HT duplicate PPDU. A CTS frame includes 14 bytes and is transmitted at a rate of 6 Mbps. The time required to transmit only the CTS frame is $14\times8/(6\times1024\times1024)=19$ μs. Considering that a preamble transmission time of a PPDU carrying the CTS frame is 20 μs, it can be calculated that 39 μs are required to transmit a CTS frame.
2) STA 1 of the non-AP MLD sends a PS-Poll frame and successfully obtains a TXOP when it receives a corresponding acknowledgement (ACK) frame. The ACK frame includes 14 bytes and is transmitted at a rate of 6 Mbps. The time required to transmit an ACK frame is calculated in the same way as the CTS frame above.
3) STA 1 of the non-AP MLD sends a data frame and successfully obtains a TXOP when it receives a corresponding ACK frame. The ACK frame includes 14 bytes and is transmitted at a rate of 6 Mbps. The time required to transmit an ACK frame is calculated in the same way as the CTS frame above.

Figure 14:
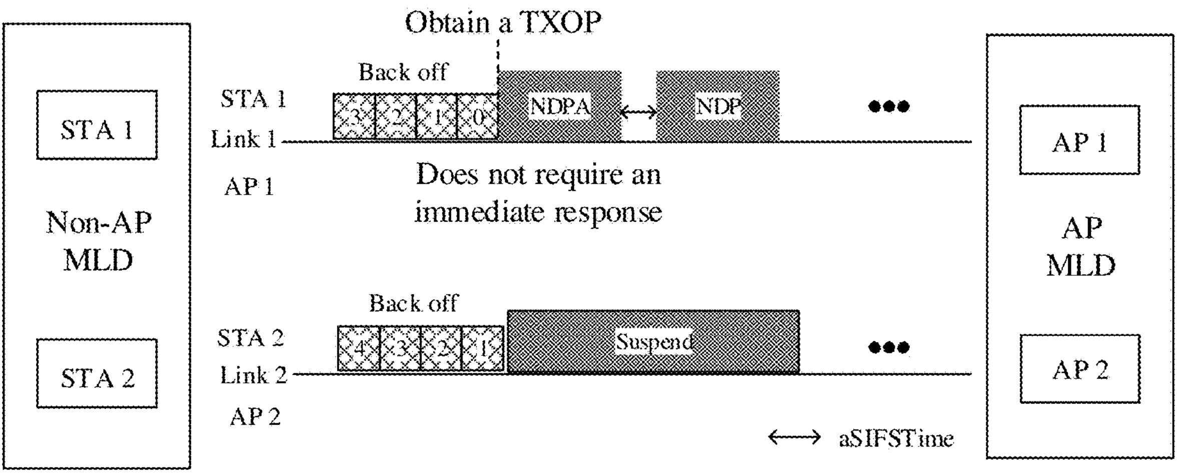
FIG. 14 is a fifth schematic diagram showing optional communication operations between a non-AP MLD and an AP MLD according to the embodiments of the present application.

As an application example, this application example is related to Rule 1 in the foregoing solutions and is applicable to a case where an initial PPDU does not require an immediate response. As shown in FIG. 14, an initial PPDU sent by STA 1 of the non-AP MLD does not require an immediate response, and thus, STA 1 of non-AP MLD may obtain a TXOP once it sends an initial PPDU. In this case, there are multiple implementations of the initial PPDU sent in order to obtain a TXOP, which include but not limited to sending frame sequences of an NDPA frame and an NDP frame (i.e., NDPA frame+NDP frame).

As an application example, this application example is related to Rule 1 in the foregoing solutions and is applicable to a case where the non-AP MLD fails to obtain a TXOP by sending an RTS frame.

Figure 15:
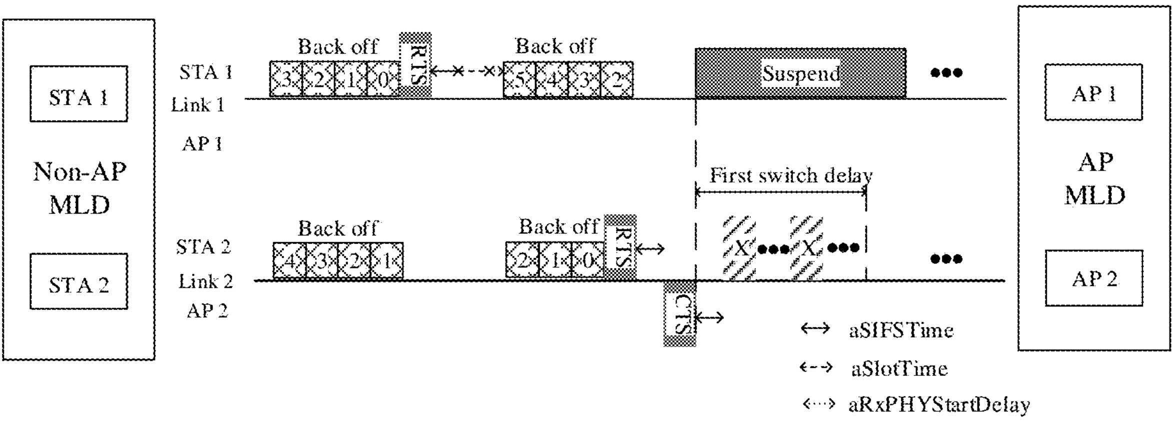
FIG. 15 is a sixth schematic diagram showing optional communication operations between a non-AP MLD and an AP MLD according to the embodiments of the present application.

After STA 1 of the non-AP MLD sends an RTS frame, it must wait for a timeout period of (aSIFSTime+aSlotTime+aRxPHYStartDelay). The timeout period starts at a time point when a MAC layer of STA 1 of the non-AP MLD receives a physical layer end reception confirmation (PHY-TXEND.comfirm) primitive. If the MAC layer of STA 1 of the non-AP MLD does not receive a physical start receiving indication primitive within the timeout period, STA 1 of the non-AP MLD determines that transmission of the RTS frame fails, and STA 1 of the non-AP MLD invokes its backoff procedure when the timeout period expires. As shown in FIG. 15, after sending an RTS frame, the MAC layer of STA 1 of the non-AP MLD does not receive a physical start receiving indication primitive within a timeout period of (aSIFSTime+aSlotTime+aRxPHYStartDelay), and the transmission of the RTS frame fails. When the timeout period expires, backoff is then performed. Backoff is performed on link 1 and link 2 in the figure at the same time. If STA 2 of the non-AP MLD backs off to 0 first, STA 2 of the non-AP MLD sends an RTS frame in order to obtain a TXOP. After receiving a CTS frame sent by AP 1 of the AP MLD, STA 2 initiates a first switch procedure, after which STA 2 performs transmission of an uplink PPDU.

As an application example, this application example is related to Rule 3 in the foregoing solutions. After STA 1 of the non-AP MLD successfully obtains the TXOP on link 1, STA 1 of the non-AP MLD sends a specific frame sequence within the first switch delay to preempt a channel on link 1. The specific frame has multiple implementations, which include but not limited to: an NDPA frame and an NDP frame (i.e, NDPA frame+NDP frame), a CTS-to-self frame, a QoS-null frame, a data frame, or the like.

Figure 16:
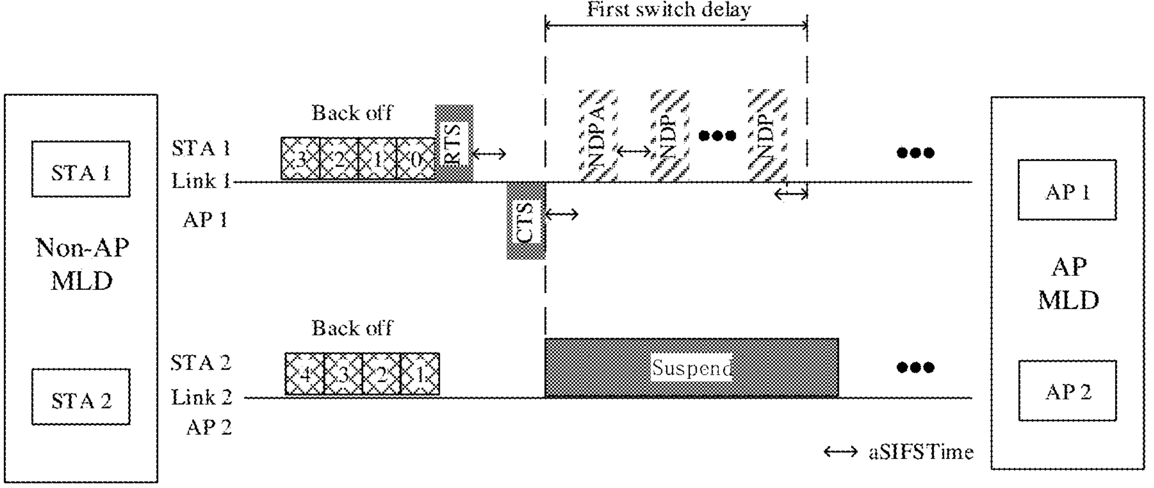
FIG. 16 is a seventh schematic diagram showing optional communication operations between a non-AP MLD and an AP MLD according to the embodiments of the present application.

As shown in FIG. 16, STA 1 of the non-AP MLD sends an RTS frame after backing off to 0 on link 1, and receives a CTS frame from the AP MLD. At this time, the non-AP MLD successfully obtains a TXOP on link 1 (the RTS frame is used as an example here, and for more implementations, see the application examples related to Rule 1), and then performs a first switch. In order to prevent the channel on link 1 from being preempted by other devices during the first switch, STA 1 of the non-AP MLD sends a frame sequence of an NDAP frame and several NDP frames to preempt the channel. The number of the NDP frames may be calculated by the non-AP MLD according to a specific value of a padding delay and a preemption termination condition. In the figure, preemption ends when the preemption termination condition in Rule 3 (i.e., the second condition in the foregoing solutions) is met, and STA 1 of the non-AP MLD stops sending the NDP frames. Subsequently, STA 1 of the non-AP MLD starts to transmit an uplink PPDU.

Figure 17:
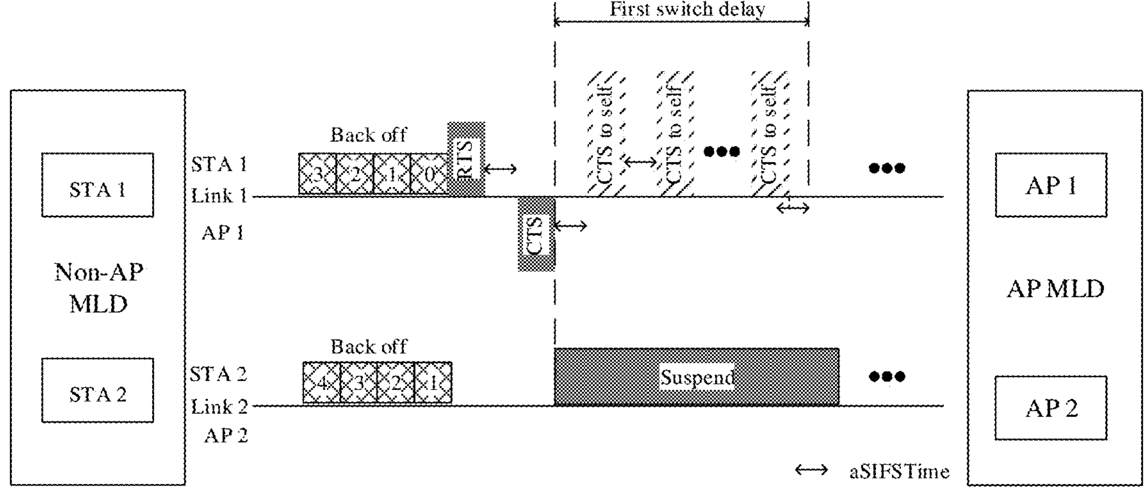
FIG. 17 is an eighth schematic diagram showing optional communication operations between a non-AP MLD and an AP MLD according to the embodiments of the present application.

As shown in FIG. 17, STA 1 of the non-AP MLD successfully obtains a TXOP on link 1 by sending an RTS frame (the RTS frame is used as an example for explanation here, and for more implementations, see the application examples related to Rule 1), and then performs a first switch. In order to prevent the channel on link 1 from being preempted by other devices during the first switch, STA 1 of the non-AP MLD sends a frame sequence of several CTS-to-self frames to preempt the channel. The number of the CTS-to-self frames may be calculated by the non-AP MLD according to a specific value of a padding delay and a preemption termination condition. In the figure, preemption ends when the preemption end condition in Rule 3 (i.e., the second condition in the foregoing solutions) is met, and STA 1 of the non-AP MLD stops sending the CTS-to-self frames. Subsequently, STA 1 of the non-AP MLD starts to transmit an uplink PPDU.

Figure 18:
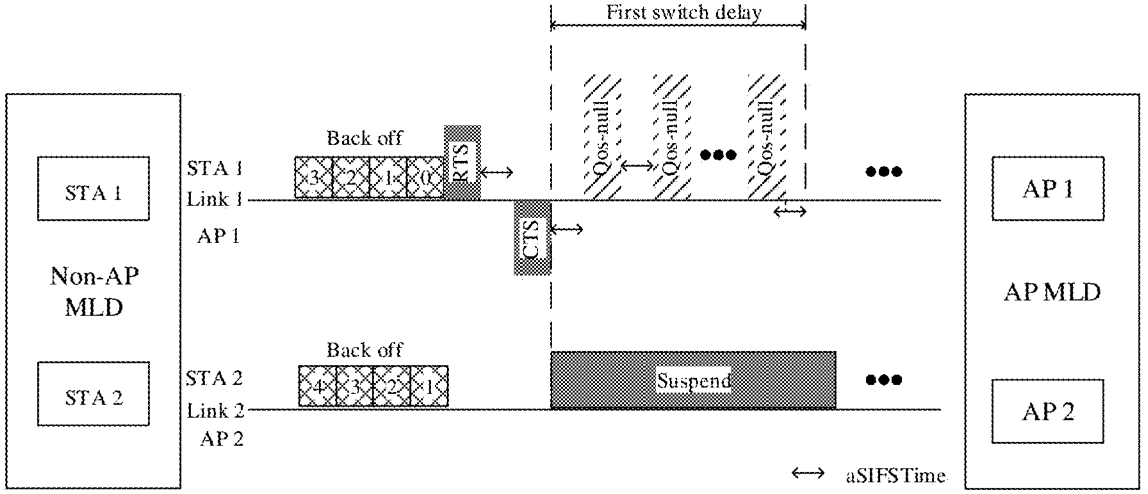
FIG. 18 is a ninth schematic diagram showing optional communication operations between a non-AP MLD and an AP MLD according to the embodiments of the present application.

As shown in FIG. 18, STA 1 of the non-AP MLD successfully obtains a TXOP on link 1 by sending an RTS frame (the RTS frame is used as an example for explanation here, and for more implementations, see the application examples related to Rule 1), and then performs a first switch. In order to prevent the channel on link 1 from being preempted by other devices during the first switch, STA 1 of the non-AP MLD sends a frame sequence of several QoS-null frames to preempt the channel. The number of the QoS-null frames may be calculated by the non-AP MLD according to a specific value of a padding delay and a preemption termination condition. An acknowledgement policy (Ack Policy) field in a QoS-null frame may be set to 10 to not request an immediate response. In the figure, preemption ends when the preemption end condition in Rule 3 (i.e., the second condition in the foregoing solutions) is met, and STA 1 of the non-AP MLD stops sending the QoS-null frames. Subsequently, STA 1 of the non-AP MLD starts to transmit an uplink PPDU.

Figure 19:
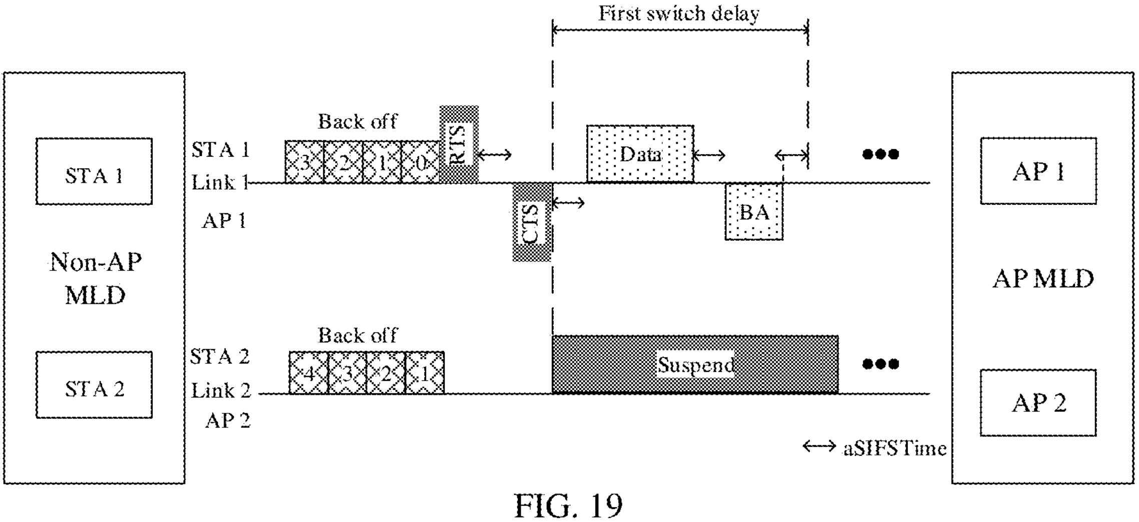
FIG. 19 is a tenth schematic diagram showing optional communication operations between a non-AP MLD and an AP MLD according to the embodiments of the present application.

As shown in FIG. 19, STA 1 of the non-AP MLD successfully obtains a TXOP on link 1 by sending an RTS frame (the RTS frame is used as an example for explanation here, and for more implementations, see the application examples related to Rule 1), and then performs a first switch. In order to prevent the channel on link 1 from being preempted by other devices during the first switch, STA 1 of the non-AP MLD sends a frame sequence of several data frames to preempt the channel. The number of the data frames may be calculated by the non-AP MLD according to a specific value of a padding delay and a preemption termination condition. In the figure, preemption ends when the preemption end condition in Rule 3 (i.e., the second condition in the foregoing solutions) is met, and STA 1 of the non-AP MLD stops sending the data frames. Subsequently, STA 1 of the non-AP MLD starts to transmit an uplink PPDU. Here, it should be noted that, limited by Rule 2 in the foregoing solutions, when transmitting the data frames within an interval of the padding delay, multiple spatial streams on a single link may not be used for transmission, and only a single spatial stream on the single link may be used for transmission.

Figure 20:
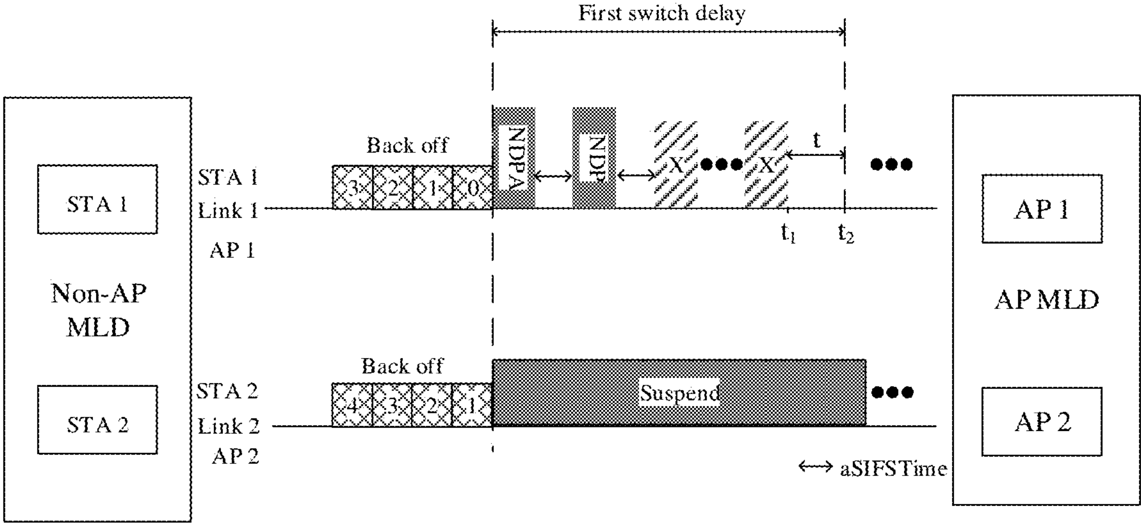
FIG. 20 is a eleventh schematic diagram showing optional communication operations between a non-AP MLD and an AP MLD according to the embodiments of the present application.

As an application example, this application example is related to Rule 1 and Rule 3 in the foregoing solutions. As shown in FIG. 20, after STA 1 of the non-AP MLD backs off to 0, STA 1 immediately sends an NDPA frame. At the time point when sending the NDPA frame, STA 1 obtains a TXOP (here, the NDPA frame and the NDP frame is taken as an example to obtain the TXOP, and for more implementations, see the application examples related to Rule 1). Within a first switch delay thereafter, a specific frame sequence needs to be sent to occupy the channel (here, an X frame is taken as an example to occupy the channel, and for more implementations, see the application examples related to Rule 3).

As an application example, this application example is related to Rule 3 in the foregoing solutions. There is a relationship between the specific frame sequence sent by STA 1 of the non-AP MLD in order to preempt a channel and the first switch. Specifically, since the specific frame sequence needs to be sent during duration of a padding delay to preempt the channel, the number of specific frame sequences sent is directly related to a length of the padding delay. The padding delay is indicated by an EMLSR padding delay subfield of an EML capability field in a basic variant multilink element. A specific coding of the field may be seen in FIG. 5, which may indicate 0 μs, 32 μs, 64 μs, 128 μs, or 256 μs. The followings are examples of how many specific frames should be sent for different EMLSR Padding Dealy subfields.

Figure 21:
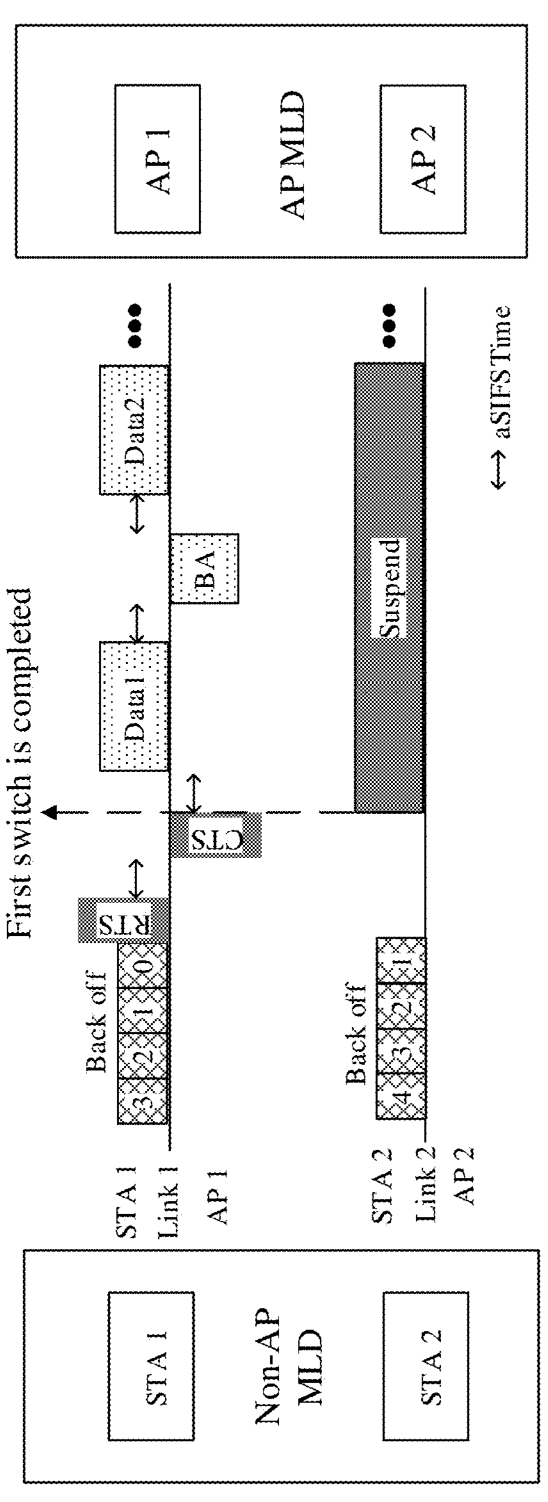
FIG. 21 is a twelfth schematic diagram showing optional communication operations between a non-AP MLD and an AP MLD according to the embodiments of the present application.

As shown in FIG. 21, when the EMLSR padding delay subfield indicates 0 μs (i.e., the padding delay is 0), it is indicated that the current device is able to perform a first switch without delay. That is, once the non-AP MLD successfully obtains a TXOP, the non-AP MLD may immediately switch from a first operation mode to a second operation mode, and immediately performing transmission of an uplink PPDU after that. In this case, STA 1 of the non-AP MLD does not need to send a specific frame sequence.

Figure 22:
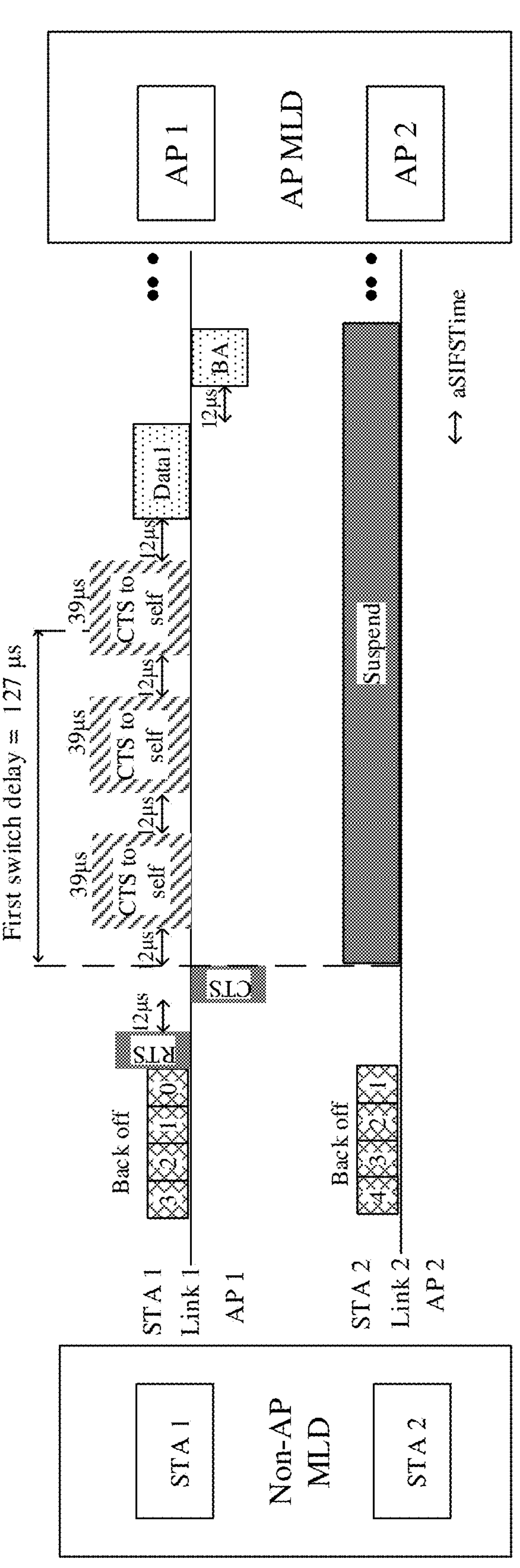
FIG. 22 is a thirteenth schematic diagram showing optional communication operations between a non-AP MLD and an AP MLD according to the embodiments of the present application.

As shown in FIG. 22, when the EMLSR padding delay subfield indicates a value other than 0 μs, transmission time of a specific frame needs to be considered. Because a modulation and coding scheme (MCS) and a transmission bandwidth when sending the specific frame will affect the transmission time of the specific frame, the specific frame is taken as an example of a CTS-to-self frame including 14 bytes. It takes 39 μs to transmit a CTS-to-self frame at a speed of 6 Mbps. At the same time, it is assumed that aSIFSTime duration is 12 μs, and a padding delay is 64 μs. Combined with the preemption termination condition in Rule 3 (i.e., the second condition in the foregoing solutions), the following calculation may be performed. According to the definition, a second switch delay of the non-AP MLD may be calculated, which is 127 μs. For example, when the transmission of the second CTS-to-self frame is completed, it has already taken transmission time of two CTS-to-self frames and two of aSIFSTime duration, therefore the channel has been occupied for 102 μs, and there are 25 μs left until the first switch delay arrives, which is greater than aSIFSTime duration. Therefore, another CTS-to-self frame needs to be sent. When the transmission of the third CTS-to-self frame is completed, according to the preemption termination condition (i.e., the second condition in the foregoing solutions), the preemption is completed, and a total of 3 CTS-to-self frames have been sent. The example herein also applies to cases including but not limited to a padding delay of 32 μs, 128 μs, or 256 μs and specific frames such as an NDPA frame and an NDP frame (i.e., NDPA frame+NDP frame), a QoS-null frame, or a data frame.

Figure 23:
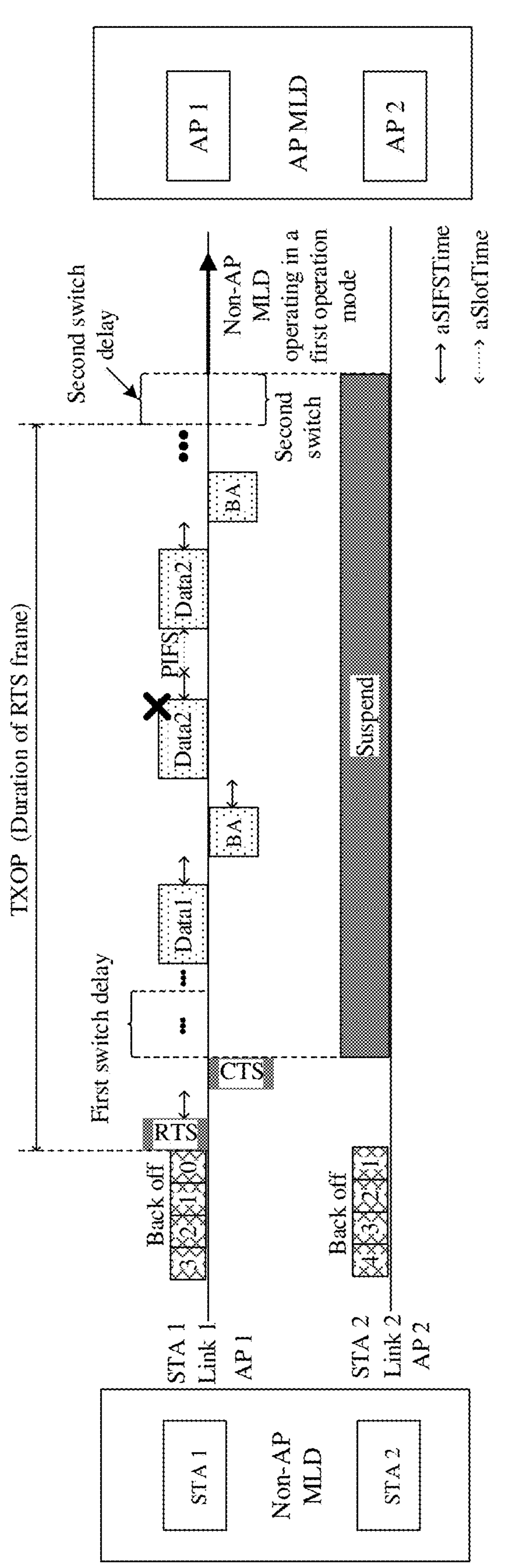
FIG. 23 is a fourteenth schematic diagram showing optional communication operations between a non-AP MLD and an AP MLD according to the embodiments of the present application.

As an application example, this application example is related to Rule 5 in the foregoing solutions, and is applicable to a case where the non-AP MLD is allowed to perform the second switch only after a TXOP ends. As shown in FIG. 23, the non-AP MLD may perform the second switch only after the TXOP obtained by the non-AP MLD ends. Within the TXOP, once the non-AP MLD fails to transmit a non-initial PPDU, the non-AP MLD performs PIFS recovery (or perform backoff directly, PIFS recovery is used as an example here to illustrate an error recovery). After the TXOP ends, the non-AP MLD performs the second switch and completes the second switch within a second switch delay. At this time, the AP MLD also determines that the non-AP MLD has completed the second switch.

Figure 24:
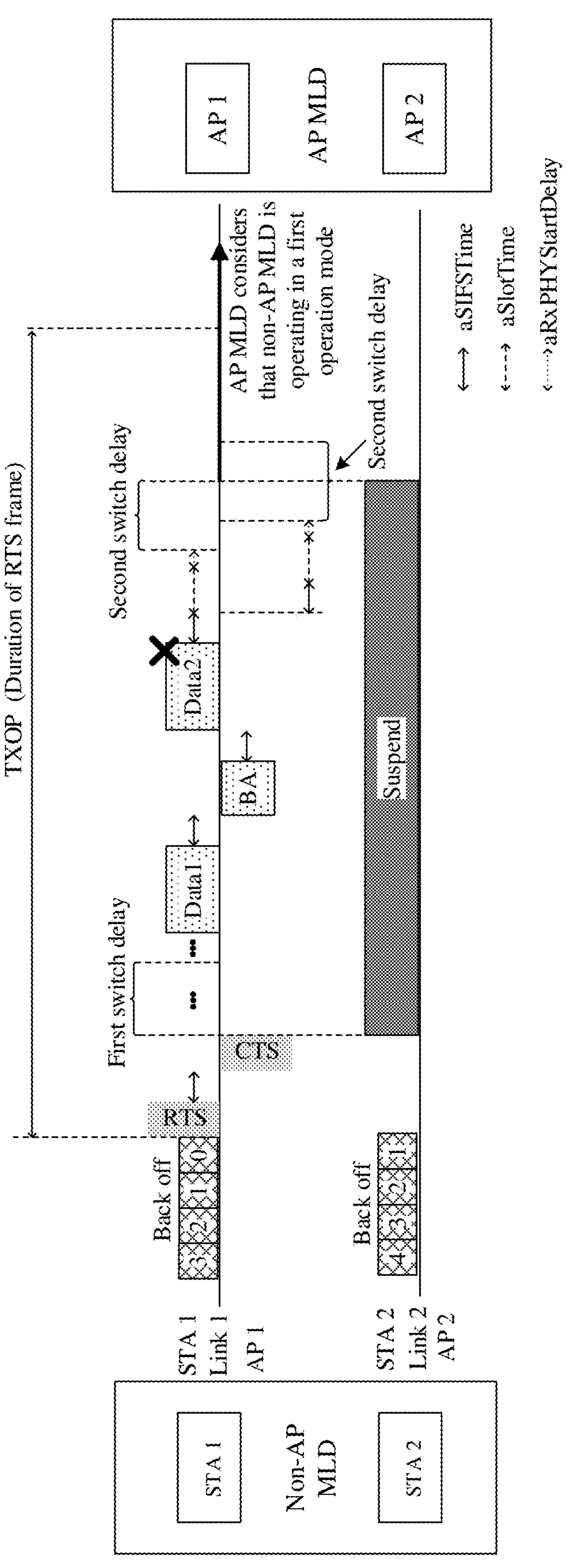
FIG. 24 is a fifteenth schematic diagram showing optional communication operations between a non-AP MLD and an AP MLD according to the embodiments of the present application.

As an application example, this application example is related to Rule 5 in the foregoing solutions, and is applicable to a case where the non-AP MLD is allowed to perform a second switch within a TXOP and a data frame transmission error occurs. As shown in FIG. 24, if a MAC layer of STA 1 of the non-AP MLD does not receive a physical start receiving indication primitive within a timeout period of aSIFSTime+aSlotTime+aRxPHYStartDelay after sending the Data2 frame, the non-AP MLD determines that a transmission failure occurs and immediately performs the second switch and an error recovery operation. After completing the second switch, the non-AP MLD may not continue sending an uplink PPDU within the remaining time of the current TXOP.

If a MAC layer of AP 1 of the AP MLD does not receive a physical start receiving indication primitive within a timeout period of aSIFSTime+aSlotTime+aRxPHYStartDelay after receiving the last symbol of an erroneous PPDU, the AP MLD determines that transmission performed by the non-AP MLD fails. Because transmission of the erroneous PPDU requires passage of radio time and analysis by the AP MLD, a time point at which the AP MLD receives the last symbol of the PPDU is no later than an interval of aSIFSTime duration starting at an end of the transmission of the PPDU. After the timeout period expires, the AP MLD waits for a second switch delay, after which the AP MLD determines that the non-AP MLD has completed the second switch. The AP MLD does not need to wait for a second switch delay after the current TXOP ends before attempting to send an initial control frame to the non-AP MLD to initialize downlink PPDU transmission.

Figure 25:
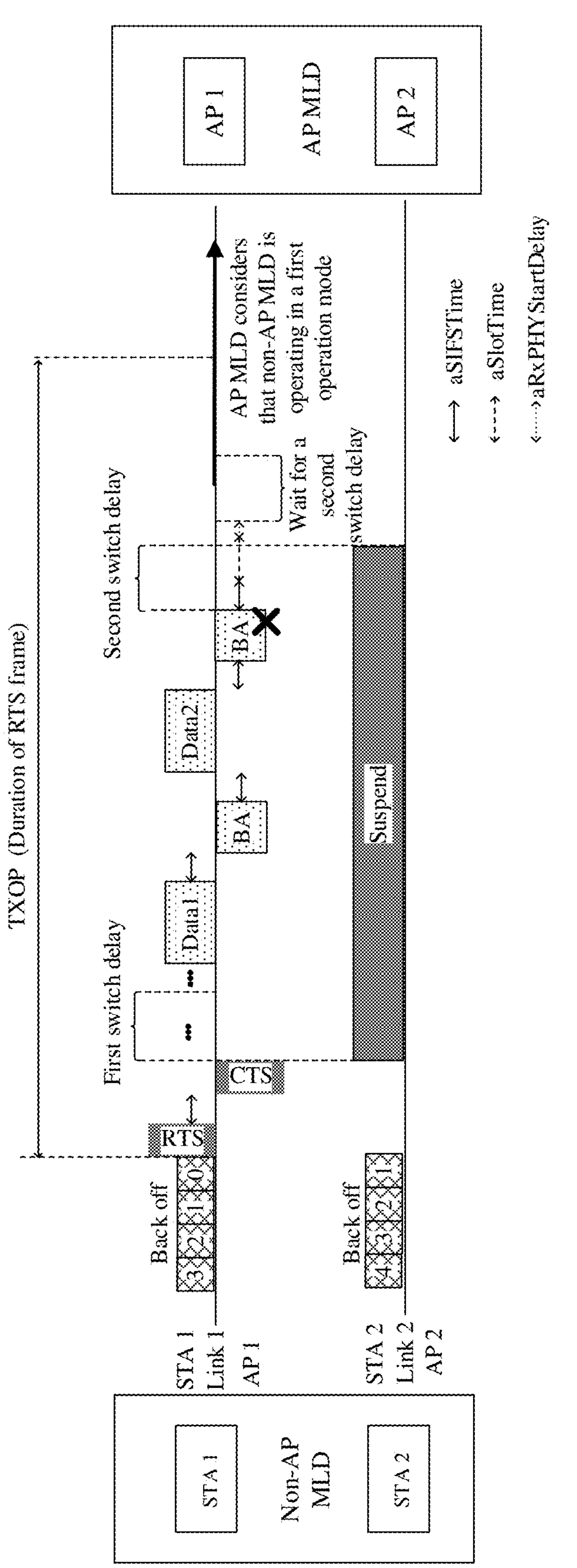
FIG. 25 is a sixteenth schematic diagram showing optional communication operations between a non-AP MLD and an AP MLD according to the embodiments of the present application.

As an application example, this application example is related to Rule 5 in the foregoing solutions, and is applicable to a case where the non-AP MLD is allowed to perform a second switch within a TXOP and a BA frame transmission error occurs. As shown in FIG. 25, if a MAC layer of AP 1 of the AP MLD receives a physical start receiving indication primitive within a timeout period of aSIFSTime+aSlotTime+aRxPHYStartDelay after sending the Data2 frame, but a PPDU corresponding to the physical start receiving indication primitive is not a valid PPDU, the non-AP MLD performs a second switch at the same time the non-AP MLD performs an error recovery operation of performing backoff when the TXNAV timer is expired.

If a MAC layer of AP 1 of the AP MLD does not receive a physical start receiving indication primitive within a timeout period of aSIFSTime+aSlotTime+aRxPHYStartDelay, which starts at an end of transmission of a response PPDU sent by AP 1 of the AP MLD in response to the latest PPDU received from an affiliated STA of the non-AP MLD, the AP MLD determines that a transmission failure occurs. After the timeout period expires, the AP MLD waits for a second switch delay, after which the AP MLD determines that the non-AP MLD has completed the second switch. After the current TXOP ends, the AP MLD does not need to wait for a second switch delay before attempting to send an initial control frame on an EMLSR link to the non-AP MLD to initialize downlink PPDU transmission.

Figure 26:
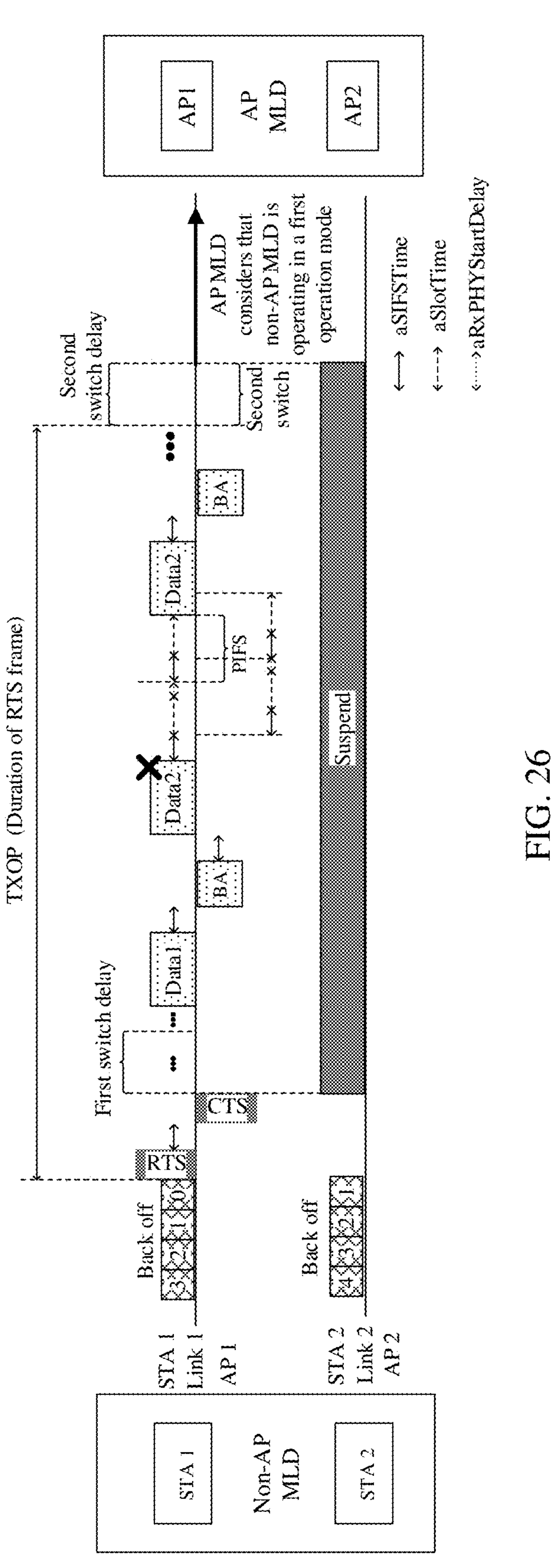
FIG. 26 is a seventeenth schematic diagram showing optional communication operations between a non-AP MLD and an AP MLD according to the embodiments of the present application.

As an application example, this application example is related to Rule 5 in the foregoing solutions, and is applicable to a case where PIFS recovery is performed due to a transmission failure without performing a second switch and a data frame transmission error occurs. As shown in FIG. 26, after a MAC layer of STA 1 of the non-AP MLD sends the Data2 frame, the MAC layer of STA 1 does not receive a physical start receiving indication primitive within a timeout period of aSIFSTime+aSlotTime+aRxPHYStartDelay. After the timeout period ends, the PIFS recovery is started and a second switch is not performed (the PIFS recovery is used as an example for illustration, which may be replaced with direct backoff or performing backoff when a TXNAV timer is expired. In this case, a link switch operation is performed).

Within a timeout period of aSIFSTime+aSlotTime+aRxPHYStartDelay after a MAC layer of AP 1 of the AP MLD receives the last symbol of an erroneous PPDU, if the MAC layer of AP 1 of the AP MLD does not receive a physical start receiving indication primitive, or receives a physical start receiving indication primitive but a PPDU corresponding to the primitive is not a valid PPDU, the AP MLD determines that transmission performed by the non-AP MLD fails. Because transmission of the erroneous PPDU requires passage of radio time and analysis by the AP MLD, a time point at which the AP MLD receives the last symbol of the PPDU is no later than an interval of aSIFSTime duration starting at an end of the transmission of the PPDU. After the timeout period of aSIFSTime+aSlotTime+aRxPHYStartDelay expires, the AP MLD waits for a timeout period of aSIFSTime+aSlotTime. If the AP MLD receives a physical start receiving indication primitive within the timeout period of aSIFSTime+aSlotTime and the PPDU corresponding to the physical start receiving indication primitive is a valid PPDU, the AP MLD determines that the non-AP MLD has performed a PIFS error recovery operation and does not perform a second switch. After the current TXOP ends, the AP MLD needs to wait for a second switch delay before attempting to send an initial control frame to the non-AP MLD to initialize downlink PPDU transmission.

Figure 27:
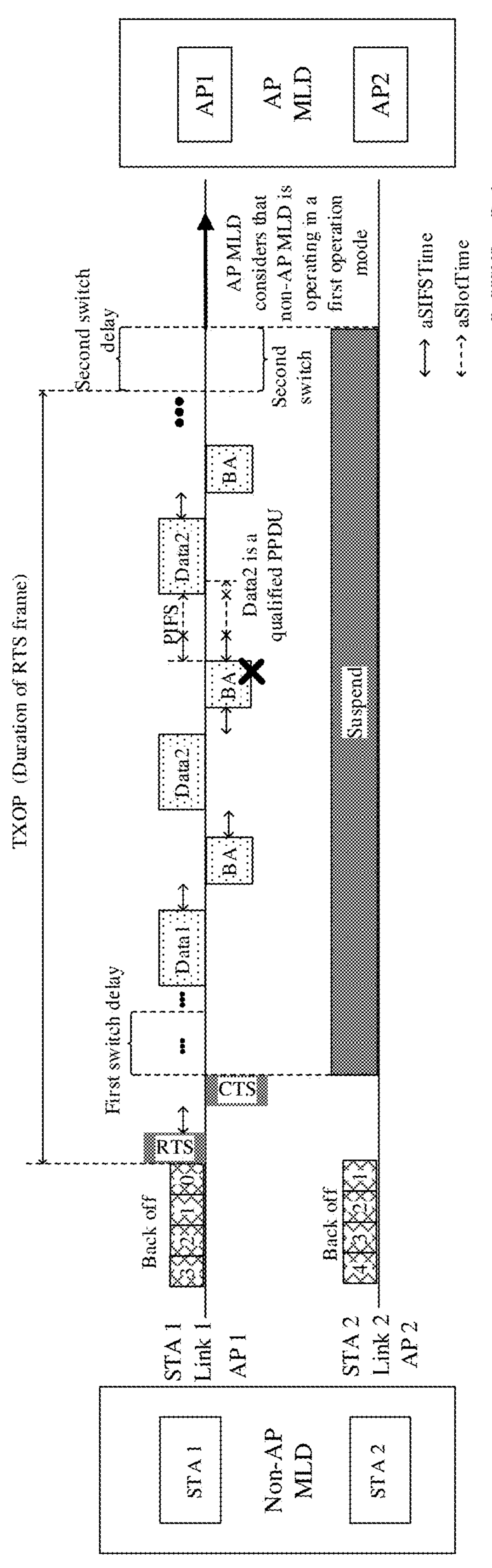
FIG. 27 is an eighteenth schematic diagram showing optional communication operations between a non-AP MLD and an AP MLD according to the embodiments of the present application.

As an application example, this application example is related to Rule 5 in the foregoing solutions, and is applicable to a case where PIFS recovery is performed due to transmission failure without performing a second switch and a BA frame transmission error occurs. As shown in FIG. 27, if a MAC layer of AP 1 of the AP MLD receives a physical start receiving indication primitive within a timeout period of aSIFSTime+aSlotTime+aRxPHYStartDelay after sending the Data2 frame, but a PPDU corresponding to the physical start receiving indication primitive is not a valid PPDU, the non-AP MLD performs PIFS recovery and does not perform the second switch (the PIFS recovery is used as an example for illustration, which may be replaced with direct backoff or performing backoff when a TXNAV timer is expired. In this case, a link switch operation is performed).

Within a timeout period of aSIFSTime+aSlotTime+aRxPHYStartDelay after a MAC layer of AP 1 of the AP MLD receives the last symbol of an erroneous PPDU, if the MAC layer of AP 1 of the AP MLD does not receive a physical start receiving indication primitive, or receives a physical start receiving indication primitive but a PPDU corresponding to the primitive is not a valid PPDU, the AP MLD determines that transmission performed by the non-AP MLD fails. After the timeout period of aSIFSTime+aSlotTime+aRxPHYStartDelay expires, the AP MLD waits for a timeout period of aSIFSTime+aSlotTime. If the AP MLD receives a physical start receiving indication primitive within the timeout period of aSIFSTime+aSlotTime, and the PPDU corresponding to the physical start receiving indication primitive is a valid PPDU, the AP MLD determines that the non-AP MLD has performed a PIFS error recovery operation and does not perform a second switch. After the current TXOP ends, the AP MLD needs to wait for a second switch delay before attempting to send an initial control frame to the non-AP MLD to initialize downlink PPDU transmission.

Figure 28:
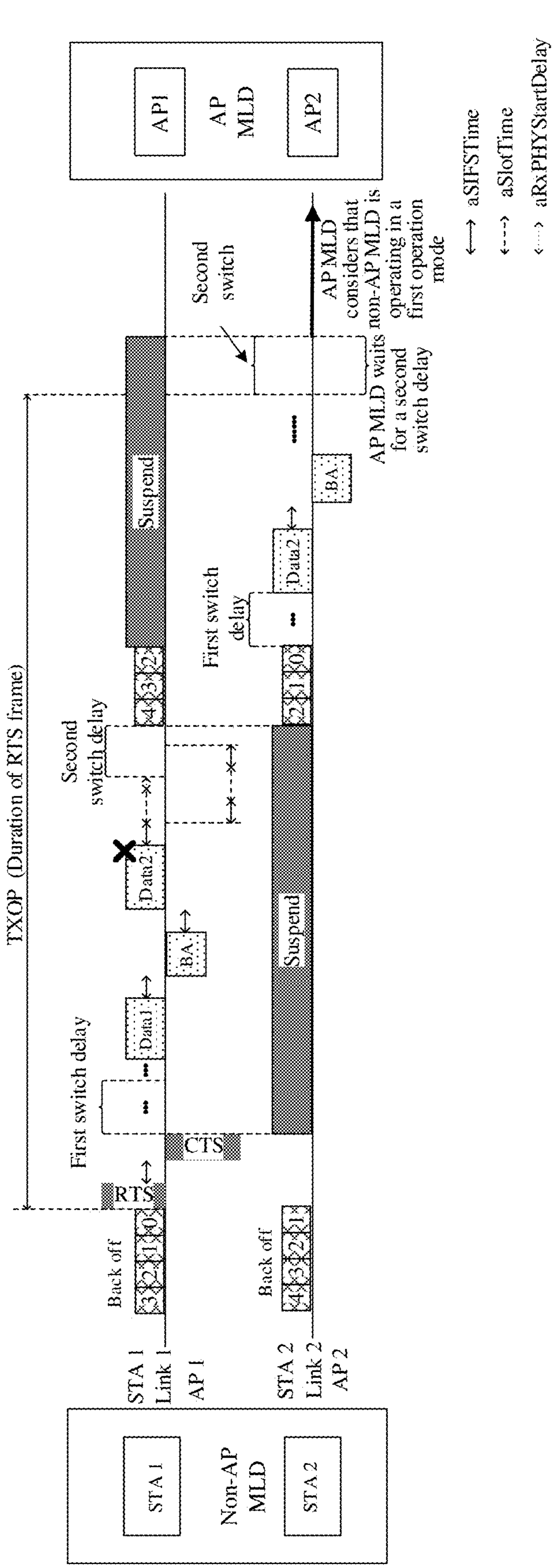
FIG. 28 is a nineteenth schematic diagram showing optional communication operations between a non-AP MLD and an AP MLD according to the embodiments of the present application.

As an application example, this application example is related to solutions of performing an error recovery operation of direct backoff when a transmission failure occurs in the foregoing solutions, and is applicable to a case where a data frame transmission error occurs. As shown in FIG. 28, if a MAC layer of STA 1 of the non-AP MLD does not receive a physical start receiving indication primitive within a timeout period of aSIFSTime+aSlotTime+aRxPHYStartDelay after sending the Data2 frame, the non-AP MLD determines that a transmission failure occurs, and the non-AP MLD immediately performs a second switch. After completing the link switch, the non-AP MLD performs the error recovery operation of direct backoff on an EMLSR link after completing the second switch. If any affiliated STA (taking STA 2 in FIG. 28 as an example) of the non-AP MLD operating on the EMLSR link successfully obtains a TXOP, it performs a first switch on the link (taking link 2 in FIG. 28 as an example) and complies with the foregoing description, that is, performs a channel occupation procedure during the first switch. After the current TXOP ends, the non-AP MLD performs the second switch, and the non-AP MLD completes the second switch after a second switch delay.

Within a timeout period of aSIFSTime+aSlotTime+aRxPHYStartDelay after a MAC layer of AP 1 of the AP MLD receives the last symbol of an erroneous PPDU, if the MAC layer of AP 1 of the AP MLD does not receive a physical start receiving indication primitive, the AP MLD determines that a transmission failure occurs. Because transmission of the erroneous PPDU requires passage of radio time and analysis by the AP MLD, a time point at which the AP MLD receives the last symbol of the PPDU is no later than an interval of aSIFSTime duration starting at an end of the transmission of the PPDU. After the current TXOP expires, the AP MLD waits for a second switch delay, after which the AP MLD determines that the non-AP MLD has completed the second switch and may attempt to send an initial control frame on an EMLSR link to the non-AP MLD to initialize downlink PPDU transmission.

Figure 29:
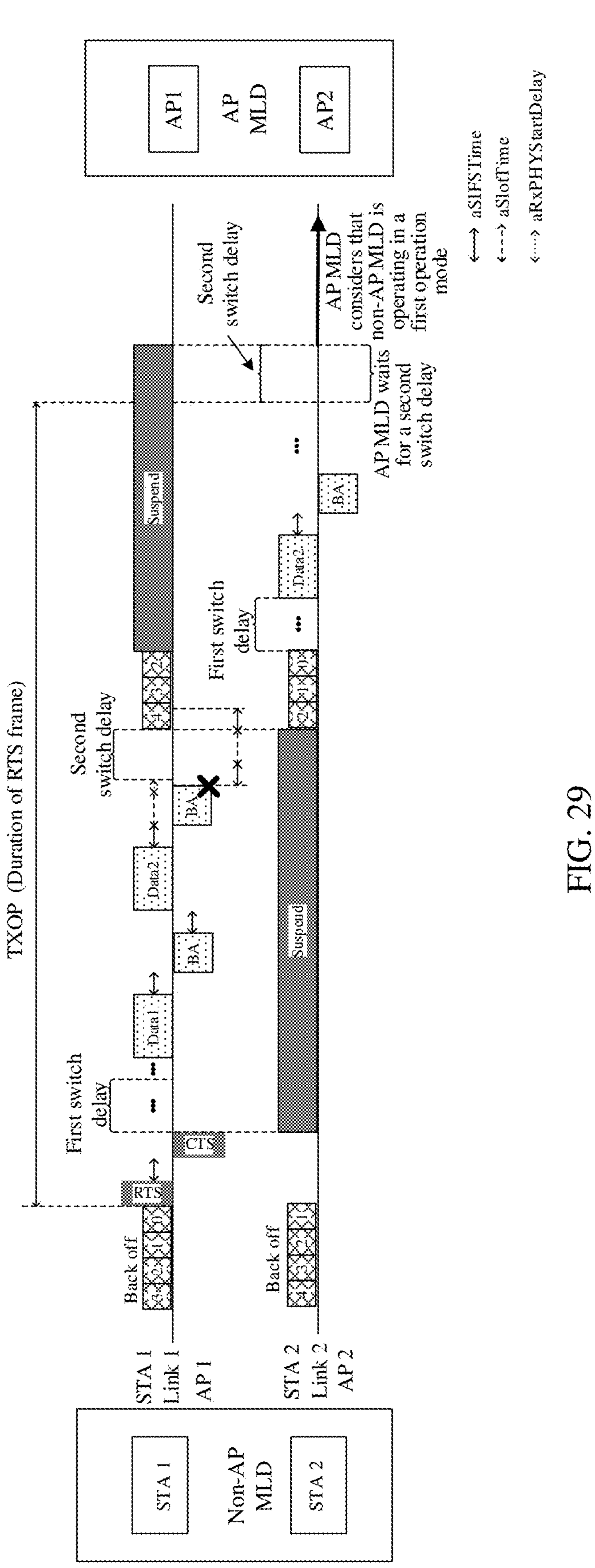
FIG. 29 is a twentieth schematic diagram showing optional communication operations between a non-AP MLD and an AP MLD according to the embodiments of the present application.

As an application example, this application example is related to solutions of performing an error recovery operation of direct backoff when a transmission failure occurs in the foregoing solutions, and is applicable to a case where a BA frame transmission error occurs. As shown in FIG. 29, if a MAC layer of STA 1 of the non-AP MLD receives a physical start receiving indication primitive within a timeout period of aSIFSTime+aSlotTime+aRxPHYStartDelay after an end of transmitting the latest PPDU, but a PPDU corresponding to the physical start receiving indication primitive is not a valid PPDU, the non-AP MLD determines that a transmission failure occurs, and the non-AP MLD immediately performs a second switch. After completing the link switch, the non-AP MLD performs an error recovery operation of direct backoff on an EMLSR link after completing the second switch. If any affiliated STA (taking STA 2 in FIG. 29 as an example) of the non-AP MLD operating on the EMLSR link successfully obtains a TXOP, it performs a first switch on the link (taking link 2 in FIG. 29 as an example) and complies with the foregoing description, that is, performs a channel occupation procedure during the first switch. After the current TXOP ends, the non-AP MLD performs the second switch, and the non-AP MLD completes the second switch after a second switch delay.

If the MAC layer of AP 1 of the AP MLD does not receive a physical start receiving indication primitive within a timeout period of aSIFSTime+aSlotTime+aRxPHYStartDelay after transmitting a BA frame (i.e., a response frame), the AP MLD determines that a transmission failure occurs. After the current TXOP expires, the AP MLD waits for a second switch delay, after which the AP MLD determines that the non-AP MLD has completed the second switch and may attempt to send an initial control frame on an EMLSR link to the non-AP MLD to initialize downlink PPDU transmission.

The preferred embodiments of the present application are described in detail above in conjunction with the accompanying drawings. However, the present application is not limited to the specific details in the above embodiments. Within the technical concept of the present application, a variety of simple modifications can be made to the technical solutions of the present application, and these simple modifications all fall within the protection scope of the present application. For example, the various specific technical features described in the above specific embodiments can be combined in any suitable manner without contradiction. In order to avoid unnecessary repetition, this application will not further explain various possible combinations. In another example, the various implementations of the present application may be arbitrarily combined, and as long as they do not violate the concept of the present application, they should also be regarded as the contents disclosed in the present application. In yet another example, under the premise of no conflict, the various embodiments and/or the technical features in the various embodiments described in the present application may be arbitrarily combined with the prior art, and the technical solutions obtained by such combination should also fall within the protection scope of the present application.

It should also be understood that in various method embodiments of the present application, sequence numbers of the above processes do not mean the order of execution of the processes. The order of execution of each process should be determined by its functions and internal logic, and should not constitute any limitation on implementation of the embodiments of the present application. Furthermore, in the embodiments of the present application, terms such as "downlink", "uplink" and "sidelink" are intended to indicate transmission directions of signals or data, "downlink" is intended to indicate that a transmission direction of signals or data is a first direction of sending signals or data from a station to UE in a cell, "uplink" is intended to indicate that a transmission direction of signals or data is a second direction of sending signals or data from UE in a cell to a station, and "sidelink" is intended to indicate that a transmission direction of signals or data is a third direction of sending signals or data from UE 1 to UE 2. For example, "downlink signal" indicates that a transmission direction of the signal is the first direction. In addition, in the embodiments of the present application, the term "and/or" refers to an association relationship describing associated objects, which indicates that there may be three kinds of relationships. For example, "A and/or B" may indicate three cases that: A exists alone, both A and B exist, and B exists alone. The character "/" herein generally indicates that associated objects before and after this character have an "or" relationship.

Figure 30:
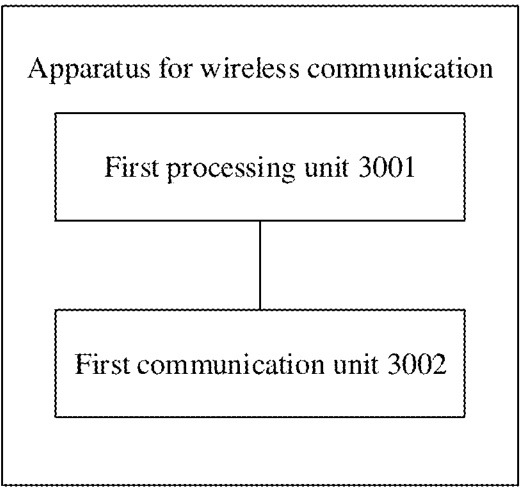
FIG. 30 is a first schematic diagram showing structural composition of an optional apparatus for wireless communication provided by the embodiments of the present application.

FIG. 30 is a first schematic diagram showing structural composition of an optional apparatus for wireless communication provided by the embodiments of the present application, which is applied to a non-AP MLD. As shown in FIG. 30, the apparatus for wireless communication includes a first processing unit 3001 and a first communication unit 3002.

The first processing unit 3001 is configured to initiate a first switch procedure of a first link in a case where a TXOP is initiated or successfully obtained on the first link of EMLSR links through a first affiliated STA; the TXOP being used for the first affiliated STA of the non-AP MLD to transmit an uplink PPDU; the first affiliated STA being a STA affiliated with the non-AP MLD, and a link where the first affiliated STA is located is the first link;

where a first switch refers to that the non-AP MLD operating in an EMLSR mode switches from a first operation mode to a second operation mode, the first operation mode refers to performing a listening operation on multiple links of the EMLSR links, and the second operation mode refers to performing a frame exchange operation on one of the EMLSR links and the frame exchange operation has a frame exchange capability of using multiple spatial streams.

In some optional embodiments, the communication unit 3002 is configured to send an initial PPDU on the first link through the first affiliated STA; in response that the initial PPDU requires an immediate response, the first processing unit 3001 determines that a time point when the TXOP is successfully obtained is: a time point when a response frame corresponding to the initial PPDU is received; in response that the initial PPDU does not require an immediate response, the first processing unit 3001 determines that a time point when the TXOP is successfully obtained is: a time point when transmission of the initial PPDU is started or a time point when transmission of the initial PPDU is completed.

In some optional implementations, the first affiliated STA of the non-AP MLD completes the first switch procedure within a first switch delay after initiating or successfully obtaining the TXOP, and time required from a start to an end of the first switch procedure is greater than or equal to a padding delay.

In some optional implementations, the padding delay is a padding delay used for the first switch and indicated by the non-AP MLD to an access point multi-link device (AP MLD).

In some optional implementations, the communication unit 3002 is configured to send a specific frame sequence through the first affiliated STA during the first switch, and the specific frame sequence is used to occupy a channel on the first link.

In some optional embodiments, the communication unit 3002 is configured to: send a specific frame from a first time point through the first affiliated STA during the first switch, and continue sending the specific frame in a case where a first condition is met, or stop sending the specific frame in a case where a second condition is met.

In some optional implementations, the first time point is determined based on a time point when the first affiliated STA of the non-AP MLD initiates or successfully obtains the TXOP.

In some optional implementations, the time point when the first affiliated STA of the non-AP MLD initiates or successfully obtains the TXOP is a second time point, and the first time is a time point after the second time point and spaced apart from the second time point by an interval of aSIFSTime duration.

In some optional implementations, a time point when the first affiliated STA of the non-AP MLD initiates or successfully obtains the TXOP is a second time point, a time point after the second time point and spaced apart from the second time point by an interval of a first switch delay is a third time point, and a time point when the first affiliated STA of the non-AP MLD last sent a specific frame is a fourth time point;

where the first condition is related to the third time point and the fourth time point, and the second condition is related to the third time point and the fourth time point.

In some optional implementations, the first condition is that the third time point minus the fourth time point is greater than aSIFSTime duration; and the second condition is that the third time point minus the fourth time point is less than or equal to 0, or the third time point minus the fourth time point is greater than 0 and less than or equal to the aSIFSTime duration.

In some optional implementations, the communication unit 3002 is configured to send an uplink PPDU to a first affiliated AP of an AP MLD on the first link after sending the specific frame.

In some optional implementations, a time point to send the uplink PPDU is a time point spaced apart from a time point when the first affiliated STA of the non-AP MLD last sent the specific frame by an interval of aSIFSTime duration.

In some optional embodiments, the specific frame sequence includes an NDPA frame and at least one NDP frame; alternatively, the specific frame sequence includes at least one CTS-to-self frame; alternatively, the specific frame sequence includes at least one QoS-null frame; alternatively, the specific frame sequence includes at least one data frame.

In some optional embodiments, the first processing unit 3001 is configured to perform, in response to determining that transmission of a second PPDU within the TXOP fails, an error recovery operation and/or a second switch, and the second PPDU is a non-initial PPDU. The second switch refers to that the non-AP MLD operating in the EMLSR mode switches from the second operation mode to the first operation mode.

In some optional embodiments, the first processing unit 3001 is configured to: perform, in response to determining that the transmission of the second PPDU within the TXOP fails, PIFS recovery and/or backoff, in a case where the non-AP MLD is allowed to perform the second switch only after a TXOP ends; and perform the second switch after the TXOP ends.

In some optional implementations, the first processing unit 3001 is configured to perform, in response to determining that the transmission of the second PPDU within the TXOP fails, an error recovery operation and/or a second switch in a specific manner, in a case where the non-AP MLD is allowed to perform the second switch within a TXOP.

In some optional implementations, the first processing unit 3001 is configured to: immediately perform the second switch in response to determining that the transmission of the second PPDU within the TXOP fails; and perform backoff after the TXNAV timer expires.

In some optional implementations, the communication unit 3002 is not allowed to continue transmitting an uplink PPDU within the TXOP after the second switch is completed.

In some optional implementations, the first processing unit 3001 is configured to perform an error recovery operation in response to determining that the transmission of the second PPDU within the TXOP fails, where

- if the error recovery operation is an error recovery operation of performing backoff when a TXNAV timer is expired, the second switch is performed when the TXNAV timer expires;
- if the error recovery operation is an error recovery operation of performing PIFS recovery, after waiting for aPIFStime after a first timeout period expires, the second PPDU is retransmitted, and the second switch is not performed;
- if the error recovery operation is an error recovery operation of performing backoff, after the first timeout period expires, a backoff procedure is performed, and the second switch is not performed;
- where the first timeout period starts at a time point when the non-AP MLD completes the transmission of the second PPDU.

In some optional implementations, the first processing unit 3001 is configured to: perform a second switch the second switch in response to determining that the transmission of the second PPDU within the TXOP fails; and perform an error recovery operation of performing backoff on a plurality of EMLSR links after completing the second switch.

In some optional implementations, the first processing unit 3001 is configured to initiate a first switch procedure of a second link if a second affiliated STA of the non-AP MLD backs off to 0 and initiates or successfully obtains a TXOP on the second link.

In some optional embodiments, the first processing unit 3001 is configured to: determine that the transmission of the second PPDU fails if a MAC layer of the first affiliated STA of the non-AP MLD does not receive a physical layer start receiving indication primitive within a first timeout period after a ninth time point; or determine that the transmission of the second PPDU fails if a MAC layer of the first affiliated STA of the non-AP MLD receives a physical layer start receiving indication primitive within the first timeout period after the ninth time point but does not receive a qualified PPDU corresponding to the physical layer start receiving indication primitive within the first timeout period after the ninth time point.

In some optional implementations, the ninth time point is a time point when the first affiliated STA of the non-AP MLD completes the transmission of the second PPDU.

In some optional embodiments, the qualified PPDU includes at least one of the following: an individually addressed frame, where the receiving address of the individually addressed frame is a MAC address of the first affiliated STA of the non-AP MLD; a trigger frame, where the trigger frame includes a user information field addressed to the first affiliated STA of the non-AP MLD; a CTS-to-self frame, where a receiving address of the CTS-to-self frame is a MAC address of a first affiliated AP of the AP MLD; a Multi-STA BlockACK frame, where the Multi-STA BlockACK frame includes a Per AID TID information field addressed to the first affiliated STA of the non-AP MLD; or an NDPA frame, where the NDPA frame includes a STA information field addressed to the first affiliated STA of the non-AP MLD.

In some optional implementations, the first timeout period includes aSIFSTime duration, aSlotTime duration, and a physical layer start receiving delay.

In some optional implementations, a frame exchange operation in the second operation mode includes a frame exchange operation of one or more spatial streams.

Those skilled in the art should understand that the relevant descriptions about the above-mentioned apparatus for wireless communication in the embodiments of the present application can be understood by referring to the relevant descriptions about the method for wireless communication in the embodiments of the present application.

Figure 31:
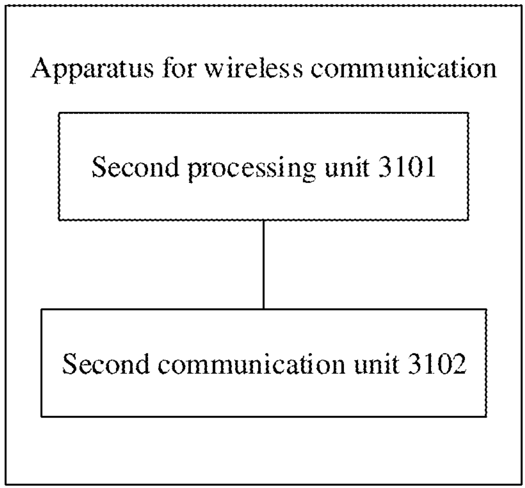
FIG. 31 is a second schematic diagram showing structural composition of an optional apparatus for wireless communication provided by the embodiments of the present application.

FIG. 31 is a second schematic diagram showing structural composition of an optional apparatus for wireless communication provided in the embodiments of the present application, which is applied to an AP MLD. As shown in FIG. 31, the apparatus for wireless communication includes a second processing unit 3101 and a second communication unit 3102.

The second processing unit 3101 is configured to determine that a time point when a non-AP MLD completes a second switch is a fifth time point; and the AP MLD is allowed to send an initial control frame on any of EMLSR links after the fifth time point, and the initial control frame is used to initiate downlink PPDU transmission;

where the second switch refers to that the non-AP MLD operating in an EMLSR mode switches from a second operation mode to a first operation mode, the second operation mode refers to performing a frame exchange operation on one of the EMLSR links and the frame exchange operation has a frame exchange capability of using multiple spatial streams, and the first operation mode refers to performing a listening operation on multiple links of the EMLSR links.

In some optional implementations, the second processing unit 3101 is configured to: determine a sixth time point; and determine a time point after the sixth time point and spaced apart from the sixth time point by an interval of a second switch delay as the fifth time point for the non-AP MLD to complete the second switch.

In some optional embodiments, the second processing unit 3101 is configured to: determine that an end time of a first timeout period is the sixth time point, if a MAC layer of a first affiliated AP of the AP MLD does not receive a physical layer start receiving indication primitive within the first timeout period after a seventh time point; or determine that an end time of the first timeout period is the sixth time point, if a MAC layer of the first affiliated AP of the AP MLD receives a physical layer start receiving indication primitive within the first timeout period after the seventh time point but does not receive a qualified PPDU corresponding to the physical layer start receiving indication primitive within the first timeout period after the seventh time point.

In some optional implementations, a latest uplink PPDU received by the first affiliated AP of the AP MLD from a first affiliated STA of the non-AP MLD is a first PPDU; and if the first PPDU requires an immediate response, the seventh time point is a time point when the first affiliated AP of the AP MLD completes transmission of a response frame corresponding to the first PPDU; or if the first PPDU does not require an immediate response, the seventh time point is a time point when the first affiliated AP of the AP MLD completes reception of the first PPDU.

In some optional implementations, the second processing unit 3101 is configured to determine, in response to determining that transmission of a second PPDU within a TXOP fails, that an end time of the TXOP is the sixth time point, in a case where the non-AP MLD is allowed to perform the second switch only after a TXOP ends;

where the TXOP is a TXOP obtained by the first affiliated STA of the non-AP MLD on a first link of the EMLSR links, and the TXOP is used for the first affiliated STA of the non-AP MLD to transmit an uplink PPDU; and the second PPDU is a non-initial PPDU.

In some optional implementations, the second processing unit 3101 is configured to determine, in response to determining that transmission of a second PPDU within a TXOP fails, that an end time of a first timeout period is the sixth time point, in a case where the non-AP MLD is allowed to perform the second switch within a TXOP;

where the TXOP is a TXOP obtained by the first affiliated STA of the non-AP MLD on a first link of the EMLSR links, and the TXOP is used for the first affiliated STA of the non-AP MLD to transmit an uplink PPDU; and the second PPDU is a non-initial PPDU.

In some optional implementations, the second processing unit 3101 is configured to wait for a second timeout period in response to determining that the second PPDU transmission within the TXOP fails;

if the second communication unit 3102 receives a physical layer start receiving indication primitive within the second timeout period and receives a qualified PPDU corresponding to the physical layer start receiving indication primitive, the second processing unit 3101 determines that the non-AP MLD has performed PIFS recovery and has not performed the second switch, and the second communication unit 3102 sends an initial control frame to the non-AP MLD after an interval of the second switch delay starting at an end of the TXOP;

if the second communication unit 3102 does not receive a physical layer start receiving indication primitive within the second timeout period and does not receive a valid PPDU within remaining time of the TXOP, the second processing unit 3101 determines that the non-AP MLD has performed an error recovery operation of performing backoff when a TXNAV timer is expired; and the second communication unit 3102 sends an initial control frame to the non-AP MLD after the TXOP ends; or if the second communication unit 3102 does not receive a physical layer start receiving indication primitive within the second timeout period and receives a valid PPDU within the remaining time of the TXOP, the second processing unit 3101 determines that the non-AP MLD has performed an error recovery operation of backoff; and the second communication unit 3102 sends an initial control frame to the non-AP MLD after an interval of the second switch delay starting at the end of the TXOP.

In some optional implementations, the second processing unit 3101 is configured to wait for a first timeout period after completing transmission of a response frame of the second PPDU;

if the second communication unit 3102 receives a physical layer start receiving indication primitive within the first timeout period and receives a qualified PPDU corresponding to the physical layer start receiving indication primitive, the second processing unit 3101 determines that the non-AP MLD has performed PIFS recovery and has not performed the second switch; and the second communication unit 3102 sends an initial control frame to the non-AP MLD after an interval of the second switch delay starting at an end of the TXOP;

if the second communication unit 3102 does not receive a physical layer start receiving indication primitive within the first timeout period and does not receive a valid PPDU in remaining time of the TXOP, the second processing unit 3101 determines that the non-AP MLD has performed an error recovery operation of performing backoff when a TXNAV timer is expired; and the second communication unit 3102 sends an initial control frame to the non-AP MLD after the TXOP ends;

if the second communication unit 3102 does not receive a physical layer start receiving indication primitive within the first timeout period and receives a valid PPDU in the remaining time of the TXOP, second processing unit 3101 determines that the non-AP MLD has performed an error recovery operation of backoff; and the second communication unit 3102 sends an initial control frame to the non-AP MLD after an interval of the second switch delay starting at the end of the TXOP.

In some optional embodiments, the second processing unit 3101 is configured to: determine that the transmission of the second PPDU fails if a MAC layer of the first affiliated AP of the AP MLD does not receive a physical layer start receiving indication primitive within a first timeout period after an eighth time point; or determine that the transmission of the second PPDU fails if a MAC layer of the first affiliated AP of the AP MLD receives a physical layer start receiving indication primitive within the first timeout period after the eighth time point but does not receive a qualified PPDU corresponding to the physical layer start receiving indication primitive within the first timeout period after the eighth time point.

In some optional embodiments, if the second PPDU requires an immediate response, the eighth time point is a time point when the first affiliated AP of the AP MLD completes transmission of a response frame corresponding to the second PPDU; if the second PPDU does not require an immediate response, the eighth time point is a time point when the first affiliated AP of the AP MLD completes reception of the second PPDU.

In some optional embodiments, the qualified PPDU includes at least one of the following: an individually addressed frame, where a receiving address of the individually addressed frame is a MAC address of the first affiliated AP of the AP MLD; a CTS-to-self frame, where a receiving address of the CTS-to-self frame is the MAC address of the first affiliated AP of the AP MLD; or an NDPA frame, where the NDPA frame includes a STA information field addressed to the first affiliated AP of the AP MLD.

In some optional implementations, the second timeout period includes aSIFSTime duration and aSlotTime duration.

In some optional implementations, the first timeout period includes aSIFSTime duration, aSlotTime duration, and a physical layer start receiving delay.

In some optional implementations, the second switch delay is a switch delay used for the second switch that is indicated by the non-AP MLD to the AP MLD.

In some optional implementations, a frame exchange operation in the second operation mode includes a frame exchange operation of one or more spatial streams.

Those skilled in the art should understand that the relevant descriptions about the above-mentioned apparatus for wireless communication in the embodiments of the present application can be understood by referring to the relevant descriptions about the method for wireless communication in the embodiments of the present application.

Figure 32:
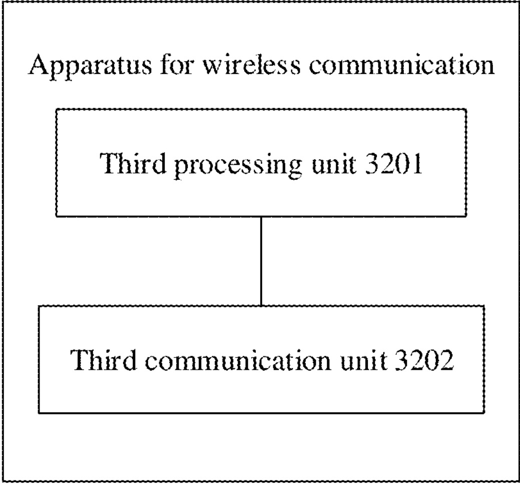
FIG. 32 is a third schematic diagram showing structural composition of an optional apparatus for wireless communication provided by the embodiments of the present application.

FIG. 32 is a third schematic diagram showing structural composition of an optional apparatus for wireless communication provided in the embodiments of the present application, which is applied to a non-AP MLD. As shown in FIG. 32, the apparatus for wireless communication device includes a third processing unit 3201 and a third communication unit 3202.

The third processing unit 3201 is configured to perform an error recovery operation and/or a second switch in response to determining that transmission of a second PPDU within a TXOP fails, The TXOP is a TXOP obtained by a first affiliated STA of the non-AP MLD on a first link of EMLSR links, and the TXOP is used for the first STA of the non-AP MLD to transmit an uplink PPDU. The second PPDU is a non-initial PPDU. The first affiliated STA is a STA affiliated with the non-AP MLD, and a link where the first affiliated STA is located is the first link. The second switch refers to that the non-AP MLD operating in an EMLSR mode switches from a second operation mode to a first operation mode, the second operation mode refers to performing a frame exchange operation on one of the EMLSR links and the frame exchange operation has a frame exchange capability of using multiple spatial streams, and the first operation mode refers to performing a listening operation on multiple links of the EMLSR links.

In some optional embodiments, the third processing unit 3201 is configured to: perform, in response to determining that the transmission of the second PPDU within the TXOP fails, PIFS recovery and/or backoff, in a case where the non-AP MLD is allowed to perform the second switch only after a TXOP ends; and perform the second switch after the TXOP ends.

In some optional implementations, the third processing unit 3201 is configured to perform, in response to determining that the transmission of the second PPDU within the TXOP fails, an error recovery operation and/or a second switch in a specific manner, in a case where the non-AP MLD is allowed to perform the second switch within a TXOP.

In some optional implementations, the third processing unit 3201 is configured to: immediately perform the second switch in response to determining that the transmission of the second PPDU within the TXOP fails; and perform backoff after the TXNAV timer expires.

In some optional implementations, the third communication unit 3202 is not allowed to continue transmitting an uplink PPDU within the TXOP after the second switch is completed.

In some optional implementations, the third processing unit 3201 is configured to perform an error recovery operation in response to determining that the transmission of the second PPDU within the TXOP fails, where

- if the error recovery operation is an error recovery operation of performing backoff when a TXNAV timer is expired, the second switch is performed when the TXNAV timer expires;
- if the error recovery operation is an error recovery operation of performing PIFS recovery, after waiting for aPIFStime after a first timeout period expires, the second PPDU is retransmitted, and the second switch is not performed;
- if the error recovery operation is an error recovery operation of performing backoff, after the first timeout period expires, a backoff procedure is performed, and the second switch is not performed;
- where the first timeout period starts at a time point when the non-AP MLD completes the transmission of the second PPDU.

In some optional implementations, the third processing unit 3201 is configured to: perform a second switch the second switch in response to determining that the transmission of the second PPDU within the TXOP fails; and perform an error recovery operation of performing backoff on a plurality of EMLSR links after completing the second switch.

In some optional implementations, the third processing unit 3201 is configured to initiate a first switch procedure of a second link if a second affiliated STA of the non-AP MLD backs off to 0 and initiates or successfully obtains a TXOP on the second link.

In some optional embodiments, the third processing unit 3201 is configured to: determine that the transmission of the second PPDU fails if a MAC layer of the first affiliated STA of the non-AP MLD does not receive a physical layer start receiving indication primitive within a first timeout period after a ninth time point; or determine that the transmission of the second PPDU fails if a MAC layer of the first affiliated STA of the non-AP MLD receives a physical layer start receiving indication primitive within the first timeout period after the ninth time point but does not receive a qualified PPDU corresponding to the physical layer start receiving indication primitive within the first timeout period after the ninth time point.

In some optional implementations, the ninth time point is a time point when the first affiliated STA of the non-AP MLD completes the transmission of the second PPDU.

In some optional embodiments, the qualified PPDU includes at least one of the following: an individually addressed frame, where the receiving address of the individually addressed frame is a MAC address of the first affiliated STA of the non-AP MLD; a trigger frame, where the trigger frame includes a user information field addressed to the first affiliated STA of the non-AP MLD; a CTS-to-self frame, where a receiving address of the CTS-to-self frame is a MAC address of a first affiliated AP of the AP MLD; a Multi-STA BlockACK frame, where the Multi-STA BlockACK frame includes a Per AID TID information field addressed to the first affiliated STA of the non-AP MLD; or an NDPA frame, where the NDPA frame includes a STA information field addressed to the first affiliated STA of the non-AP MLD.

In some optional implementations, the first timeout period includes aSIFSTime duration, aSlotTime duration, and a physical layer start receiving delay.

In some optional implementations, a frame exchange operation in the second operation mode includes a frame exchange operation of one or more spatial streams.

Those skilled in the art should understand that the relevant descriptions about the above-mentioned apparatus for wireless communication in the embodiments of the present application can be understood by referring to the relevant descriptions about the method for wireless communication in the embodiments of the present application.

Figure 33:
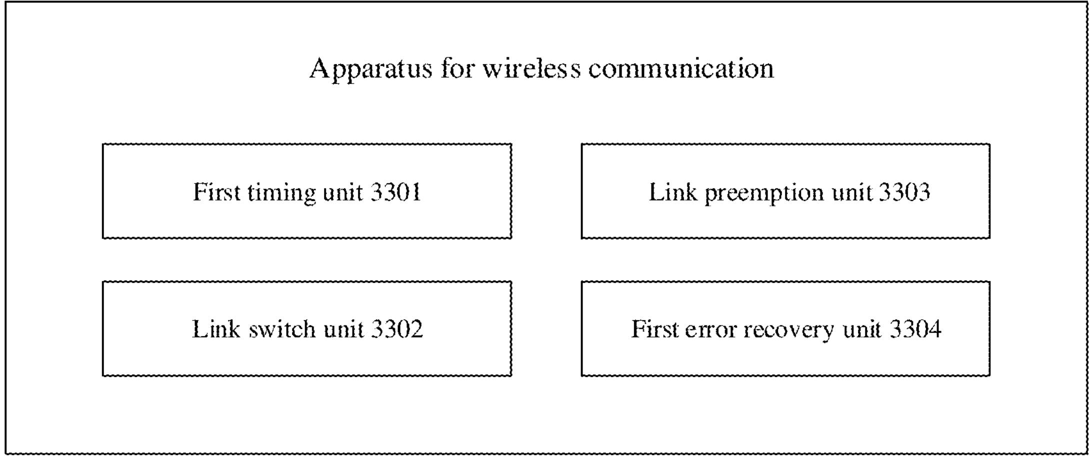
FIG. 33 is a third schematic diagram showing structural composition of an optional apparatus for wireless communication provided by the embodiments of the present application.

FIG. 33 is a third schematic diagram showing structural composition of an optional apparatus for wireless communication provided in the embodiments of the present application, which is applied to a non-AP MLD. As shown in FIG. 33, the apparatus for wireless communication device includes: a first timing unit 3301, a link switch unit 3302, a link preemption unit 3303 and a first error recovery unit 3304.

The first timing unit 3301 is configured for timing and notification. For example, a MAC layer of a first affiliated STA of the non-AP MLD does not receive a response frame within a timeout period of aSIFSTime duration+aSlotTime duration+aRxPHYStartDelay after transmission of the latest uplink PPDU is completed, and this period is timed and notified by the first timing unit.

The link switch unit 3302 is configured to perform a first switch and a second switch. The first switch starts after the non-AP MLD successfully obtains a TXOP. The second switch starts when the non-AP MLD fails to transmit or the current TXOP is about to terminate.

The link preemption unit 3303 is configured to send a specific frame to occupy a channel during a first switch performed by the non-AP MLD operating in an EMLSR mode so as to prevent the current channel from being preempted by other devices. At the same time, the link preemption unit 3303 is also responsible for calculating the number of specific frames that need to be sent to complete the preemption based on a channel occupancy end condition, a length of a padding delay, aSIFSTime duration, and time taken to transmit a specific frame.

The first error recovery unit 3304 is configured to perform an error recovery operation when the non-AP MLD operating in the EMLSR mode has an uplink transmission failure and send relevant instructions to the switch unit for switching.

Those skilled in the art should understand that the relevant descriptions about the above-mentioned apparatus for wireless communication in the embodiments of the present application can be understood by referring to the relevant descriptions about the method for wireless communication in the embodiments of the present application.

Figure 34:
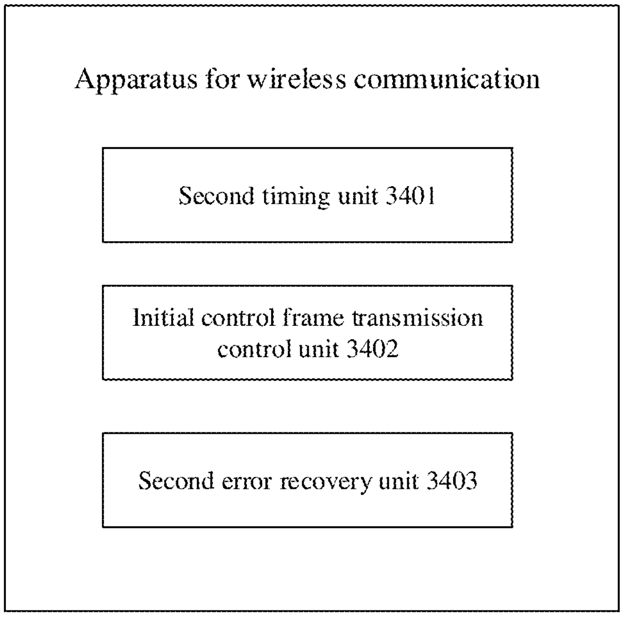
FIG. 34 is a fourth schematic diagram showing structural composition of an optional apparatus for wireless communication provided by the embodiments of the present application.

FIG. 34 is a fourth schematic diagram showing structural composition of an optional apparatus for wireless communication provided in the embodiments of the present application, which is applied to an AP MLD. As shown in FIG. 34, the apparatus for wireless communication includes: a second timing unit 3401, an initial control frame transmission control unit 3402 and a second error recovery unit 3403.

The second timing unit 3401 is configured for timing and notification. For example, in Rule 4, the AP MLD can send an initial control frame to the non-AP MLD only if no physical start receiving indication primitive is received within a timeout period of aSIFSTime+aSlotTime+aRxPHYStartDelay starting at the end of transmission of a response PPDU sent by a first affiliated AP of the AP MLD in response to the latest PPDU received from an affiliated STA of the non-AP MLD. This period is timed and notified by the first timing unit.

The initial control frame transmission control unit 3402 is configured to control when the AP MLD can send an initial control frame to the non-AP MLD, which includes a case that uplink transmission ends normally or a case that an error occurs in the uplink transmission.

The second error recovery unit 3403 is configured for the AP MLD to determine the current operation mode of the non-AP MLD when uplink transmission fails in the non-AP MLD operating in the EMLSR mode, that is, whether the non-AP MLD is in the first operation mode or the second operation mode.

Those skilled in the art should understand that the relevant descriptions about the above-mentioned apparatus for wireless communication in the embodiments of the present application can be understood by referring to the relevant descriptions about the method for wireless communication in the embodiments of the present application.

Figure 35:
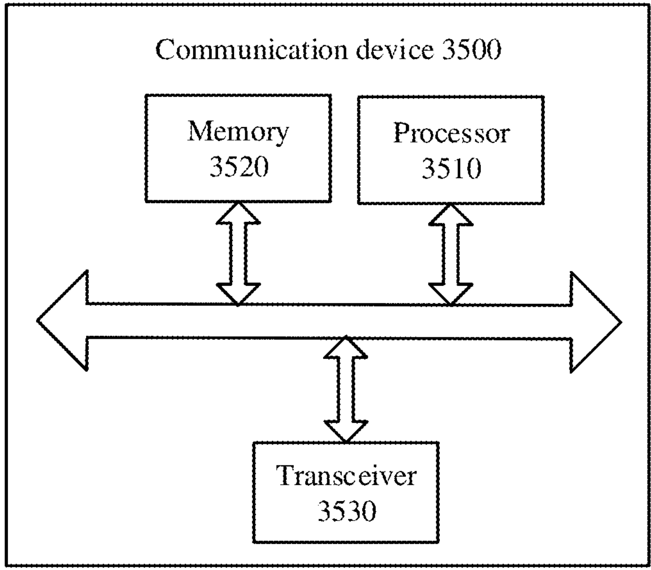
FIG. 35 is a schematic structural diagram of a communication device provided by the embodiments of the present application.

FIG. 35 is a schematic structure diagram of a communication device 3500 provided by the embodiments of the present application. The communication device may be an AP MLD or a non-AP MLD. The communication device 3500 shown in FIG. 35 includes a processor 3510, which may invoke and execute a computer program stored from a memory to implement the methods in the embodiments of the present application.

Optionally, as shown in FIG. 35, the communication device 3500 may further include a memory 3520. The processor 3510 may invoke and execute a computer program from the memory 3520 to implement the methods in the embodiments of the present application.

The memory 3520 may be a separate device independent of the processor 3510, or may be integrated in the processor 3510.

Optionally, as shown in FIG. 35, the communication device 3500 may further include a transceiver 3530, and the processor 3510 may control the transceiver 3530 to communicate with another device. Specifically, the transceiver 3530 may send information or data to another device or receive information or data sent by another device.

The transceiver 3530 may include a transmitter and a receiver. The transceiver 3530 may further include an antenna, and the antenna may be singular or plural in quantity.

Optionally, the communication device 3500 may specifically be the AP MLD according to the embodiments of the present application, and the communication device 3500 may implement corresponding processes implemented by the AP MLD in various methods in the embodiments of the present application, which will not be repeated here for brevity.

Optionally, the communication device 3500 may specifically be the non-AP MLD according to the embodiments of the present application, and the communication device 3500 may implement corresponding processes implemented by the non-AP MLD in various methods in the embodiments of the present application, which will not be repeated here for brevity.

Figure 36:
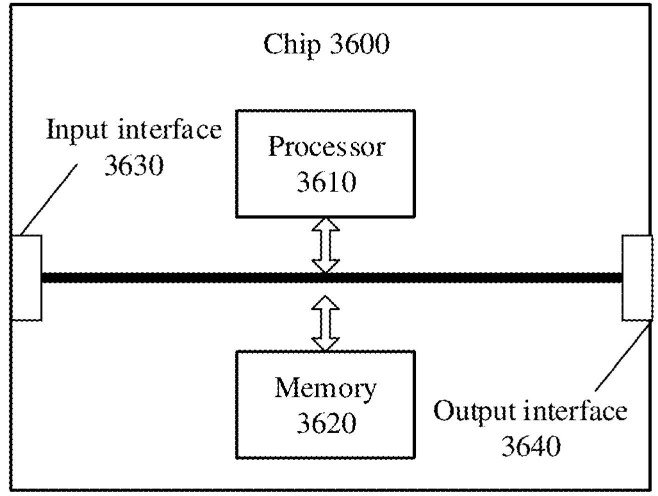
FIG. 36 is a schematic structural diagram of a chip according to the embodiments of the present application.

FIG. 36 is a schematic structural diagram of a chip according to the embodiments of the present application. The chip 3600 shown in FIG. 36 includes a processor 3610. The processor 3610 may invoke and execute a computer program stored from a memory to implement the methods in the embodiments of the present application.

Optionally, as shown in FIG. 36, the chip 3600 may further include a memory 3620. The processor 3610 may invoke and execute a computer program stored from the memory 3620 to implement the methods in the embodiments of the present application.

The memory 3620 may be a separate device independent of the processor 3610, or may be integrated in the processor 3610.

Optionally, the chip 3600 may further include an input interface 3630. The processor 3610 may communicate with another device or chip by controlling the input interface 3630. Specifically, the processor 3610 may acquire information or data sent by another device or chip.

Optionally, the chip 3600 may further include an output interface 3640. The processor 3610 may communicate with another device or chip by controlling the output interface 3640. Specifically, the processor 3610 may output information or data to another device or chip.

Optionally, the chip may be applied to the AP MLD in the embodiments of the present application, and the chip may implement corresponding processes implemented by the AP MLD in various methods in the embodiments of the present application, which will not be repeated here for brevity.

Optionally, the chip may be applied to the non-AP MLD in the embodiments of the present application, and the chip may implement corresponding processes implemented by the non-AP MLD in various methods in the embodiments of the present application, which will not be repeated here for brevity.

It should be understood that the chip mentioned in the embodiments of the present application may be also called a system-level chip, a system chip, a chip system, or a system on chip.

Figure 37:
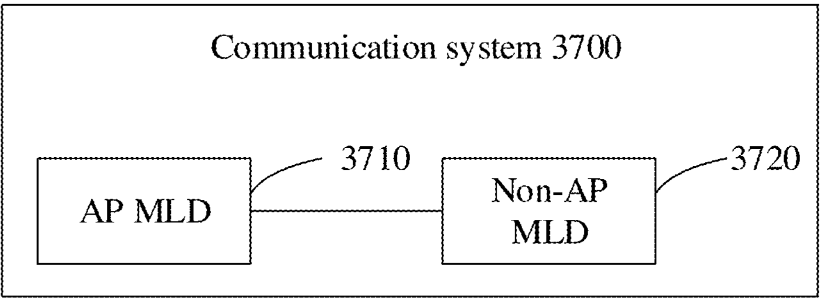
FIG. 37 is a schematic block diagram of a communication system provided by the embodiments of the present application.

FIG. 37 is a schematic block diagram of a communication system 3700 provided by the embodiments of the present application. As shown in FIG. 37, the communication system 3700 includes a non-AP MLD 3710 and an AP-MLD 3720.

The non-AP MLD 3710 may be configured to implement the corresponding functions implemented by the non-AP MLD in the above-mentioned methods, and the AP-MLD 3720 may be configured to implement the corresponding functions implemented by the AP-MLD in the above-mentioned methods, which will not be repeated herein for brevity.

It should be understood that the processor in the embodiments of the present application may be an integrated circuit chip with a capability for processing signals. In an implementation process, various steps of the method embodiments described above may be completed through an integrated logic circuit of hardware in a processor or instructions in a form of software. The above processor may be a general purpose processor, a digital signal processor (DSP), an application specific integrated circuit (ASIC), a field programmable gate array (FPGA), or another programmable logic device, a discrete gate or transistor logic device, or a discrete hardware component. The processor may implement various methods, steps, and logic block diagrams disclosed in the embodiments of the present application. The general purpose processor may be a microprocessor or the processor may be any conventional processor. The steps of the methods disclosed in connection with the embodiments of the present application may be directly embodied by execution of a hardware decoding processor, or by execution of a combination of hardware and software modules in a decoding processor. The software modules may be located in a storage medium commonly used in the art, such as a random access memory, a flash memory, a read-only memory, a programmable read-only memory or an electrically erasable programmable memory, or a register. The storage medium is located in a memory, and the processor reads information in the memory and completes the steps of the above methods in combination with hardware of the processor.

It will be appreciated that the memory in the embodiments of the present application may be a transitory memory or a non-transitory memory, or may include both transitory and non-transitory memories. The non-transitory memory may be a read-only memory (ROM), a programmable ROM (PROM), an erasable PROM (EPROM), an electrically EPROM (EEPROM), or a flash memory. The transitory memory may be a random access memory (RAM) which serves as an external cache. As an example, but not as a limitation, many forms of RAMs are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that the memories of the systems and methods described herein are intended to include, but are not limited to, these and any other suitable types of memories.

It should be understood that the above memories are described as examples rather than limitations. For example, the memory in the embodiments of the present application may be a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), or a direct Rambus RAM (DR RAM). That is to say, the memories in the embodiments of the present application are intended to include, but are not limited to, these and any other suitable types of memories.

The embodiments of the present application further provide a non-transitory computer-readable storage medium, configured to store a computer program.

Optionally, the non-transitory computer-readable storage medium may be applied to the AP MLD in the embodiments of the present application, and the computer program causes a computer to perform corresponding processes implemented by the AP MLD in various methods in the embodiments of the present application, which will not be repeated here for brevity.

Optionally, the non-transitory computer-readable storage medium may be applied in the non-AP MLD of the embodiments of the present application, and the computer program causes a computer to perform corresponding processes implemented by the non-AP MLD in various methods in the embodiments of the present application, which will not be repeated here for brevity.

The embodiments of the present application further provide a computer program product, including computer program instructions.

Optionally, the computer program product may be applied to the AP MLD in the embodiments of the present application, and the computer program instructions cause a computer to perform corresponding processes implemented by the AP MLD in various methods in the embodiments of the present application, which will not be repeated here for brevity.

Optionally, the computer program product may be applied to the non-AP MLD in the embodiments of the present application, and the computer program instructions cause a computer to perform corresponding processes implemented by the non-AP MLD in various methods in the embodiments of the present application, which will not be repeated here for brevity.

The embodiments of the present application further provide a computer program.

Optionally, the computer program may be applied to the AP MLD in the embodiments of the present application. When running on a computer, the computer program causes the computer to perform corresponding processes implemented by the AP MLD in various methods in the embodiments of the present application, which will not be repeated here for brevity.

Optionally, the computer program may be applied to the non-AP MLD in the embodiments of the present application. When running on a computer, the computer program causes the computer to perform corresponding processes implemented by the non-AP MLD in various methods in the embodiments of the present application, which will not be repeated here for brevity.

Those of ordinary skills in the art will recognize that units and algorithm steps of various examples described in connection with the embodiments disclosed herein may be implemented in electronic hardware, or a combination of computer software and electronic hardware. Whether these functions are implemented in a form of hardware or software depends on a specific application and a design constraint of a technical solution. Those skilled in the art may use different methods to implement the described functions for each specific application, but such implementation should not be considered to be beyond the scope of the present application.

Those skilled in the art may clearly understand that for convenience and conciseness of description, specific working processes of the systems, devices/apparatuses, and units described above may refer to corresponding processes in the aforementioned method embodiments, and details will not be repeated here.

In several embodiments according to the present application, it should be understood that the disclosed systems, devices/apparatuses, and methods may be implemented in other ways. For example, the device/apparatus embodiments described above are only illustrative, for example, the division of the units is only a logical function division, and there may be other division manners in actual implementation. For example, multiple units or components may be combined or integrated into another system, or some features may be ignored or not executed. In addition, coupling or direct coupling or communication connection shown or discussed between each other, which may be indirect coupling or communication connection between the devices or units via some interfaces, may be electrical, mechanical, or in other forms.

The units described as separate components may be or may be not physically separated, and the component shown as a unit may be or may be not a physical unit, i.e., it may be located in one place or may be distributed on multiple network units. Some or all of units may be selected according to actual needs to achieve purposes of technical solutions of the embodiments.

In addition, various functional units in various embodiments of the present application may be integrated in one processing unit, or various units may be physically present separately, or two or more units may be integrated in one unit.

The functions, if implemented in a form of software functional units and sold or used as an independent product, may be stored in a non-transitory computer-readable storage medium. For such understanding, the technical solutions of the present application, in essence, or the part which contributes to the prior art, or part of the technical solutions, may be embodied in the form of a software product, in which the computer software product is stored in one storage medium including a number of instructions for causing one computer device (which may be a personal computer, a server, or a network device) to perform all or some of the steps of the methods according to various embodiments of the present application. The aforementioned storage media includes various media capable of storing program codes, such as a U disk, a mobile hard disk, a read-only memory (ROM), a random access memory (RAM), a magnetic disk, an optical disk, and the like.

The foregoing are merely specific embodiments of the present application, but the protection scope of the present application is not limited thereto. Any person skilled in the art may readily conceive variations or substitutions within the technical scope disclosed by the present application, which should be included within the protection scope of the present application. Therefore, the protection scope of the present application shall be subject to the protection scope of the claims.

What is claimed is:

1. A non-access point multi-link device (non-AP MLD), comprising:

a memory, configured to store a computer program; and a processor, configured to invoke and execute the computer program stored in the memory; wherein the processor is configured to perform:

initiating a first switch procedure of a first link, in a case where a transmission opportunity (TXOP) is initiated by a first affiliated station (STA) of the non-AP MLD on the first link of enhanced multi-link single radio (EMLSR) links, the TXOP being used for the first affiliated STA of the non-AP MLD to transmit an uplink physical layer protocol data unit (PPDU); wherein a first switch refers to that the non-AP MLD operating in an EMLSR mode switches from a first operation mode to a second operation mode, the first operation mode refers to performing a listening operation on multiple links of the EMLSR links, and the second operation mode refers to performing a frame exchange operation on one of the EMLSR links and the frame exchange operation has a frame exchange capability of using multiple spatial streams.

2. The non-AP MLD according to claim 1, further comprising a transceiver, wherein the transceiver is further configured to perform:

sending a specific frame sequence during the first switch, wherein the specific frame sequence is used to occupy a channel on the first link.

3. The non-AP MLD according to claim 2, wherein sending the specific frame sequence during the first switch comprises:

during the first switch, sending a specific frame from a first time point; and continuing sending the specific frame in a case where a first condition is met, or stopping sending the specific frame in a case where a second condition is met.

4. The non-AP MLD according to claim 3, wherein the first time point is determined based on a time point when the first affiliated STA of the non-AP MLD initiates the TXOP.

5. The non-AP MLD according to claim 3, wherein the transceiver is further configured to perform:

sending an uplink PPDU to a first affiliated AP of an AP MLD on the first link after sending the specific frame.

6. The non-AP MLD according to claim 2, wherein the specific frame sequence comprises a null data packet announcement (NDPA) frame and at least one NDP frame;

the specific frame sequence comprises at least one clear to send (CTS) to self frame;

the specific frame sequence comprises at least one quality of service null (QoS-null) frame; or the specific frame sequence comprises at least one data frame.

7. The non-AP MLD according to claim 1, wherein the processor is further configured to perform:

performing an error recovery operation and/or a second switch, in response to determining that transmission of a second PPDU within the TXOP fails, the second PPDU being a non-initial PPDU; wherein the second switch refers to that the non-AP MLD operating in the EMLSR mode switches from the second operation mode to the first operation mode.

8. The non-AP MLD according to claim 7, wherein performing the error recovery operation and/or the second switch, in response to determining that the transmission of the second PPDU within the TXOP fails, comprises:

in response to determining that the transmission of the second PPDU within the TXOP fails, performing PIFS recovery and/or backoff, in a case where the non-AP MLD is allowed to perform the second switch only after a TXOP ends; and performing the second switch after the TXOP ends.

9. The non-AP MLD according to claim 7, wherein in response to determining that the transmission of the second PPDU within the TXOP fails, performing the error recovery operation and/or the second switch comprises:

in response to determining that the transmission of the second PPDU within the TXOP fails, performing the error recovery operation and/or the second switch in a specific manner, in a case where the non-AP MLD is allowed to perform the second switch within a TXOP.

10. The non-AP MLD according to claim 9, wherein in response to determining that the transmission of the second PPDU within the TXOP fails, performing the error recovery operation and/or the second switch in the specific manner comprises:

in response to determining that the transmission of the second PPDU within the TXOP fails, performing the error recovery operation; wherein if the error recovery operation is an error recovery operation of performing backofff when a TXNAV timer is expired, the second switch is performed when the TXNAV timer expires;

if the error recovery operation is an error recovery operation of performing PIFS recovery, after waiting for aPIFStime after a first timeout period expires, the second PPDU is retransmitted, and the second switch is not performed;

if the error recovery operation is an error recovery operation of performing backoff, after the first timeout period expires, a backoff procedure is performed, and the second switch is not performed; wherein the first timeout period starts at a time point when the non-AP MLD completes the transmission of the second PPDU.

11. The non-AP MLD according to claim 9, wherein in response to determining that the transmission of the second PPDU within the TXOP fails, performing the error recovery operation and/or the second switch in the specific manner comprises:

performing the second switch in response to determining that the transmission of the second PPDU within the TXOP fails; and performing an error recovery operation of performing backoff on a plurality of EMLSR links after completing the second switch.

12. The non-AP MLD according to claim 1, wherein a frame exchange operation in the second operation mode comprises a frame exchange operation of one or more spatial streams.

13. A method for wireless communication, applied to a non-access point multi-link device (non-AP MLD) and comprising:

initiating, by a first affiliated station (STA) of the non-AP MLD, a first switch procedure of a first link, in a case where a transmission opportunity (TXOP) is initiated by the first STA of the non-AP MLD on the first link of enhanced multi-link single radio (EMLSR) links, the TXOP being used for the first affiliated STA of the non-AP MLD to transmit an uplink physical layer protocol data unit (PPDU); wherein a first switch refers to that the non-AP MLD operating in an EMLSR mode switches from a first operation mode to a second operation mode, the first operation mode refers to performing a listening operation on multiple links of the EMLSR links, and the second operation mode refers to performing a frame exchange operation on one of the EMLSR links and the frame exchange operation has a frame exchange capability of using multiple spatial streams.

14. The method according to claim 13, further comprising:

sending, by the first affiliated STA of the non-AP MLD, a specific frame sequence during the first switch, wherein the specific frame sequence is used to occupy a channel on the first link.

15. The method according to claim 14, wherein sending, by the affiliated first STA of the non-AP MLD, the specific frame sequence during the first switch comprises:

during the first switch, sending, by the first affiliated STA of the non-AP MLD, a specific frame from a first time point; and continuing sending the specific frame in a case where a first condition is met, or stopping sending the specific frame in a case where a second condition is met.

16. The method according to claim 15, wherein the first time point is determined based on a time point when the first affiliated STA of the non-AP MLD initiates the TXOP.

17. The method according to claim 15, further comprising:

sending, by the first affiliated STA of the non-AP MLD, an uplink PPDU to a first affiliated AP of an AP MLD on the first link after sending the specific frame.

18. The non-AP MLD according to claim 14, wherein the specific frame sequence comprises a null data packet announcement (NDPA) frame and at least one NDP frame;

the specific frame sequence comprises at least one clear to send (CTS) to self frame;

the specific frame sequence comprises at least one quality of service null (QoS-null) frame; or the specific frame sequence comprises at least one data frame.

19. The method according to claim 13, further comprising:

performing, by the first affiliated STA of the non-AP MLD, an error recovery operation and/or a second switch, in response to determining that transmission of a second PPDU within the TXOP fails, the second PPDU being a non-initial PPDU; wherein the second switch refers to that the non-AP MLD operating in the EMLSR mode switches from the second operation mode to the first operation mode.

20. The method according to claim 19, wherein performing, by the first affiliated STA of the non-AP MLD, the error recovery operation and/or the second switch, in response to determining that the transmission of the second PPDU within the TXOP fails, comprises:

in response to determining that the transmission of the second PPDU within the TXOP fails, performing, by the first STA of the non-AP MLD, PIFS recovery and/or backoff, in a case where the non-AP MLD is allowed to perform the second switch only after a TXOP ends; and performing, by the first affiliated STA of the non-AP MLD, the second switch after the TXOP ends.

* * * * *